United States Patent
Inglis et al.

(10) Patent No.: US 10,809,397 B2
(45) Date of Patent: *Oct. 20, 2020

(54) FISSILE NEUTRON DETECTOR

(71) Applicant: Silverside Detectors Inc., Cambridge, MA (US)

(72) Inventors: Andrew Inglis, Brookline, MA (US); Zachary S. Hartwig, Jamaica Plain, MA (US); Philip C. Taber, Arlington, MA (US); Timothy Teal, Brighton, MA (US)

(73) Assignee: Silverside Detectors Inc., Boston, MA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/379,682

(22) Filed: Apr. 9, 2019

(65) Prior Publication Data

US 2019/0243011 A1    Aug. 8, 2019

Related U.S. Application Data

(63) Continuation of application No. 15/039,842, filed as application No. PCT/US2015/056093 on Oct. 16, 2015, now Pat. No. 10,302,780.

(Continued)

(51) Int. Cl.
*G01T 3/00* (2006.01)
*G01T 1/185* (2006.01)
(Continued)

(52) U.S. Cl.
CPC .............. *G01T 3/008* (2013.01); *G01T 1/185* (2013.01); *H01J 47/02* (2013.01); *H01J 47/1211* (2013.01); *H01J 47/1233* (2013.01)

(58) Field of Classification Search
CPC ...................................................... G01T 3/008
See application file for complete search history.

(56) References Cited

U.S. PATENT DOCUMENTS 2,440,167 A * 4/1948 Broxon .................. H01J 47/12
                                                              376/155
4,365,159 A   12/1982 Young
(Continued)

FOREIGN PATENT DOCUMENTS

| GB | 956555 A | 4/1964 |
| WO | 2016022232 A2 | 2/2016 |
| WO | 2016022232 A3 | 5/2016 |

OTHER PUBLICATIONS

N. Colonna, et al., Simulations of Neutron Transport at Low Energy: A Comparison Between Geant and MCNP, Health Phys. 82(6):840-846, 2002. (Note: Year of publication is sufficiently earlier than the effective date of the present application).

(Continued)

*Primary Examiner* — David P Porta
*Assistant Examiner* — Djura Malevic
(74) *Attorney, Agent, or Firm* — Pritzkau Patent Group, LLC

(57) ABSTRACT

A fissile neutron detection system includes a neutron moderator and a neutron detector disposed proximate such that a majority of the surface area of the neutron moderator is disposed proximate the neutron detector. Fissile neutrons impinge upon and enter the neutron moderator where the energy level of the fissile neutron is reduced to that of a thermal neutron. The thermal neutron may exit the moderator in any direction. Maximizing the surface area of the neutron moderator that is proximate the neutron detector beneficially improves the reliability and accuracy of the fissile neutron detection system by increasing the percentage (Continued)

FIG. 1B of thermal neutrons that exit the neutron moderator and enter the neutron detector.

24 Claims, 24 Drawing Sheets

Related U.S. Application Data

(60) Provisional application No. 62/065,029, filed on Oct. 17, 2014.

(51) Int. Cl.
*H01J 47/12* (2006.01)
*H01J 47/02* (2006.01)

(56) References Cited

U.S. PATENT DOCUMENTS

| | | | |
|---|---|---|---|
| 4,447,727 A | 5/1984 | Frieserihahn | |
| 4,543,483 A | 9/1985 | Genrich | |
| 4,560,864 A * | 12/1985 | Kinoshita | G02B 27/40 250/201.7 |
| 4,785,186 A * | 11/1988 | Street | G01T 1/24 250/370.01 |
| 5,192,490 A * | 3/1993 | Burel | G01T 3/00 376/154 |
| 5,796,110 A * | 8/1998 | An | H01J 47/02 250/385.1 |
| 7,078,705 B1 * | 7/2006 | Ianakiev | G01T 3/008 250/385.1 |
| 7,157,719 B2 * | 1/2007 | Martoff | G01T 1/2935 250/390.02 |
| 8,519,350 B2 | 8/2013 | McGregor et al. | |
| 8,569,710 B2 | 10/2013 | Lacy | |
| 8,907,293 B2 | 12/2014 | Lacy | |
| 9,018,594 B2 | 4/2015 | Ahlen et al. | |
| 9,817,138 B2 | 11/2017 | McGregor et al. | |
| 9,847,215 B2 * | 12/2017 | Degtiarenko | H01J 47/08 |
| 2002/0139935 A1 | 10/2002 | Klein et al. | |
| 2003/0213917 A1 * | 11/2003 | Menlove | G01T 3/00 250/390.01 |
| 2005/0220246 A1 * | 10/2005 | Masterov | G01T 1/185 376/154 |
| 2006/0138340 A1 | 6/2006 | Ianakiev et al. | |
| 2006/0267054 A1 * | 11/2006 | Martin | H01L 27/14632 257/291 |
| 2007/0018110 A1 * | 1/2007 | McGregor | G01T 1/167 250/391 |
| 2007/0122948 A1 * | 5/2007 | Wei | H01L 27/1214 438/151 |
| 2008/0128628 A1 * | 6/2008 | Moses | G01T 3/08 250/370.05 |
| 2008/0296506 A1 * | 12/2008 | Clarke | G01T 3/08 250/370.05 |
| 2008/0315109 A1 * | 12/2008 | Stephan | G01T 3/00 250/390.01 |
| 2010/0019164 A1 * | 1/2010 | Stephan | G01T 3/00 250/390.04 |
| 2010/0301226 A1 * | 12/2010 | Lacy | G01T 3/008 250/391 |
| 2011/0102620 A1 * | 5/2011 | Sakano | H01L 27/14609 348/222.1 |
| 2011/0108738 A1 * | 5/2011 | Doty | C09K 11/06 250/459.1 |
| 2011/0204243 A1 * | 8/2011 | Bendahan | G01T 1/167 250/367 |
| 2011/0266643 A1 * | 11/2011 | Engelmann | G01T 3/08 257/429 |
| 2012/0217406 A1 * | 8/2012 | McGregor | G01T 3/00 250/361 R |
| 2013/0020492 A1 * | 1/2013 | Derzon | H01J 47/02 250/390.01 |
| 2013/0068957 A1 | 3/2013 | Stephan et al. | |
| 2013/0228696 A1 * | 9/2013 | McGregor | G01T 3/008 250/382 |
| 2014/0042330 A1 * | 2/2014 | Gozani | G01T 1/203 250/367 |
| 2014/0077091 A1 | 3/2014 | Ahien et al. | |
| 2014/0097351 A1 | 4/2014 | Lacy | |
| 2014/0117246 A1 * | 5/2014 | Zhou | G01T 1/185 250/375 |
| 2014/0197321 A1 * | 7/2014 | Bendahan | G01T 1/20 250/366 |
| 2014/0252520 A1 * | 9/2014 | Dahal | G01T 3/00 257/429 |
| 2015/0355345 A1 | 12/2015 | Neyland | |
| 2016/0018538 A1 | 1/2016 | Bendahan et al. | |
| 2017/0023684 A1 | 1/2017 | Inglis et al. | |
| 2017/0176632 A1 | 6/2017 | Manclossi et al. | |

OTHER PUBLICATIONS

Prosecution History of Co-Pending U.S. Appl. No. 15/488,382, as of Dec. 7, 2018.

The International Search Report and the Written Opinion of the International Searching Authority for International Application No. PCT/US2015/056093 which is associated with U.S. Appl. No. 15/039,842, dated Mar. 17, 2016, Alexandria, VA.

The International Search Report and the Written Opinion of the International Searching Authority for International Application No. PCT/U82018/027592 which is assaciaied with U.S. Appl. No. 15/488,382, dated Sep. 20, 2018, Jerusalem, Israel.

W.J. Nellis, Slowing Down Distance and Times of 0.1- to 14-MeV Neutrons in Hydrogenous Materials, American Journal of Physics No. 5., May 5, 1977.

* cited by examiner

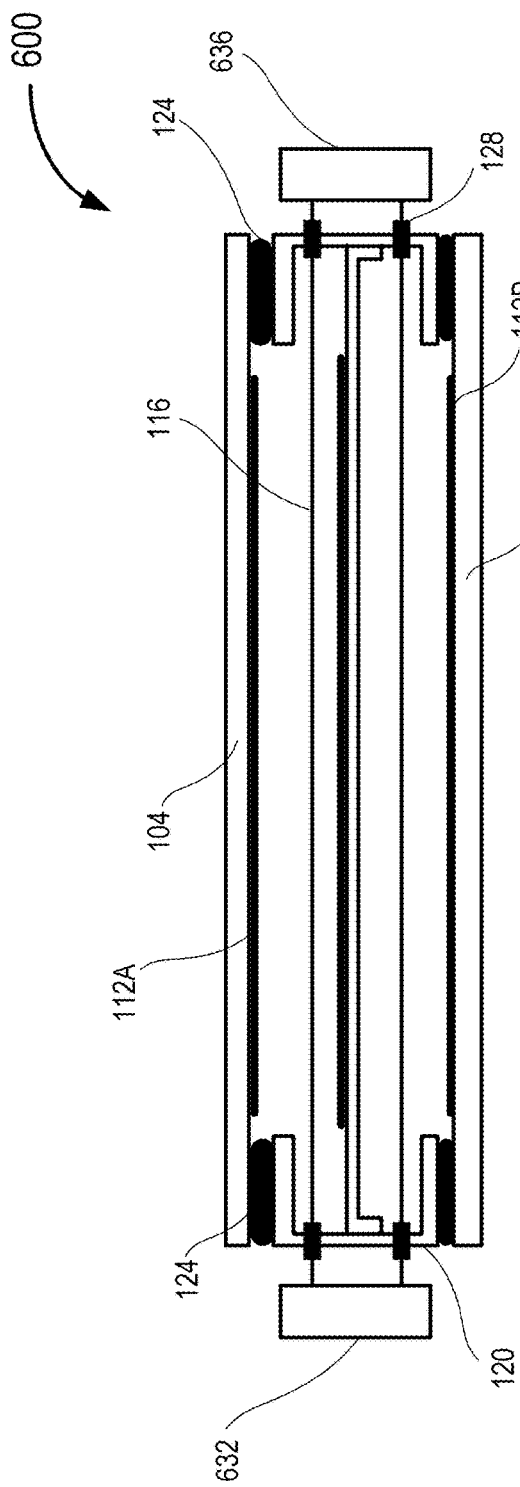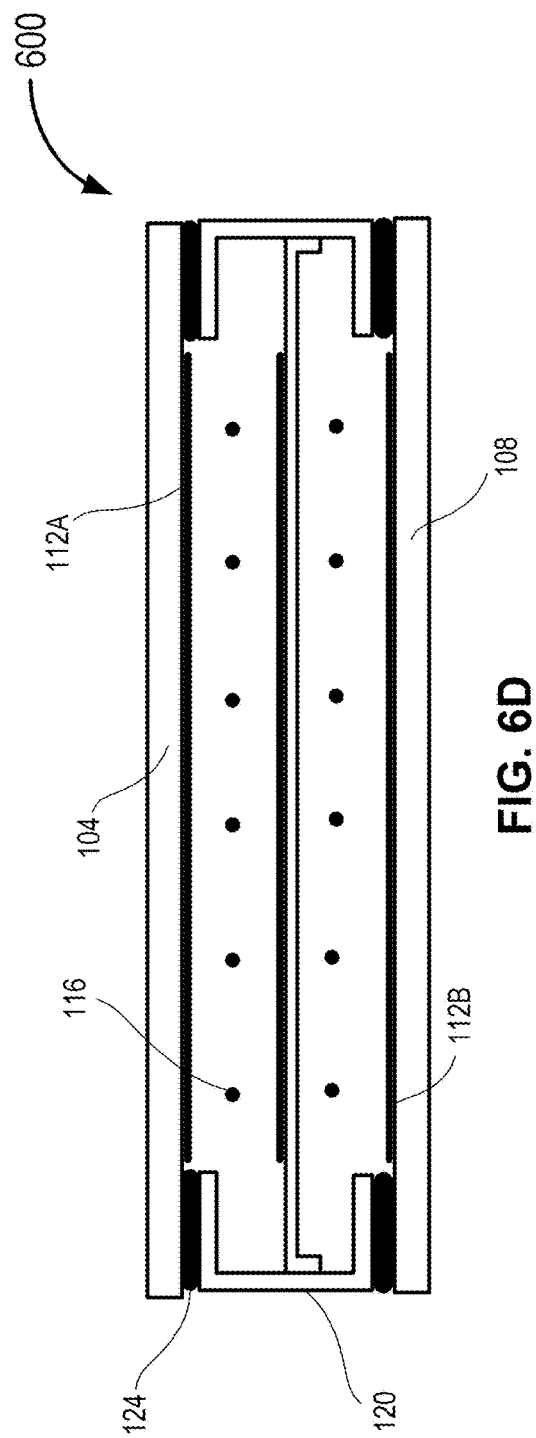

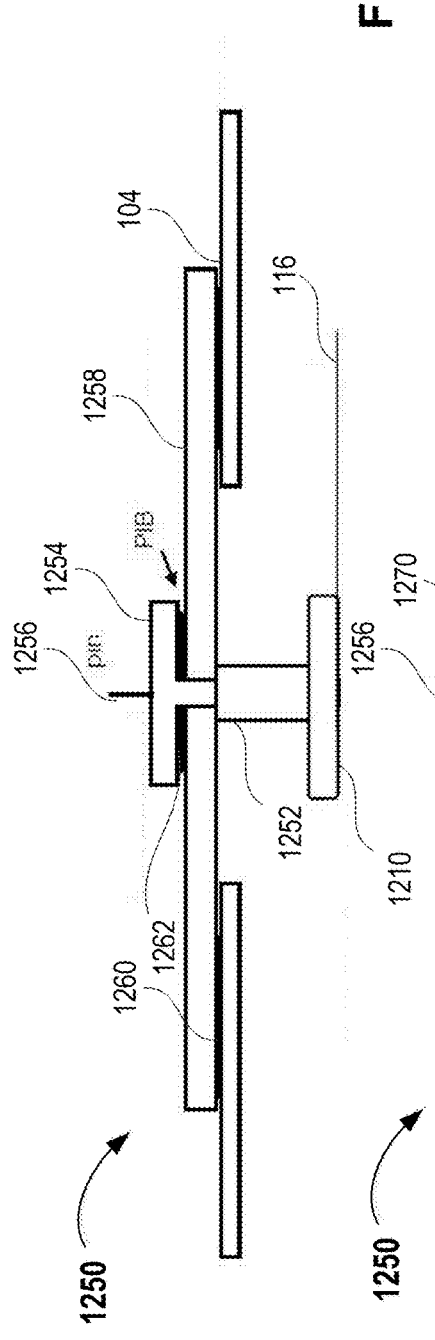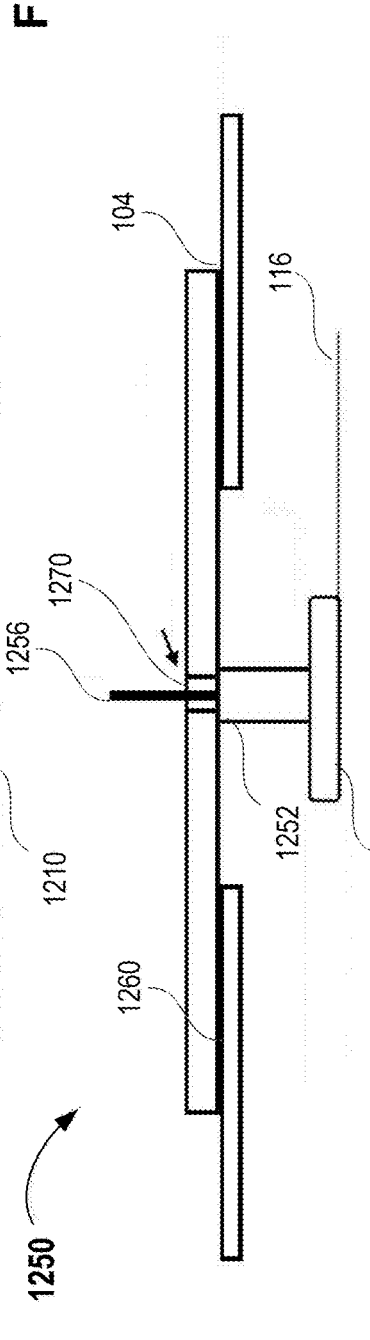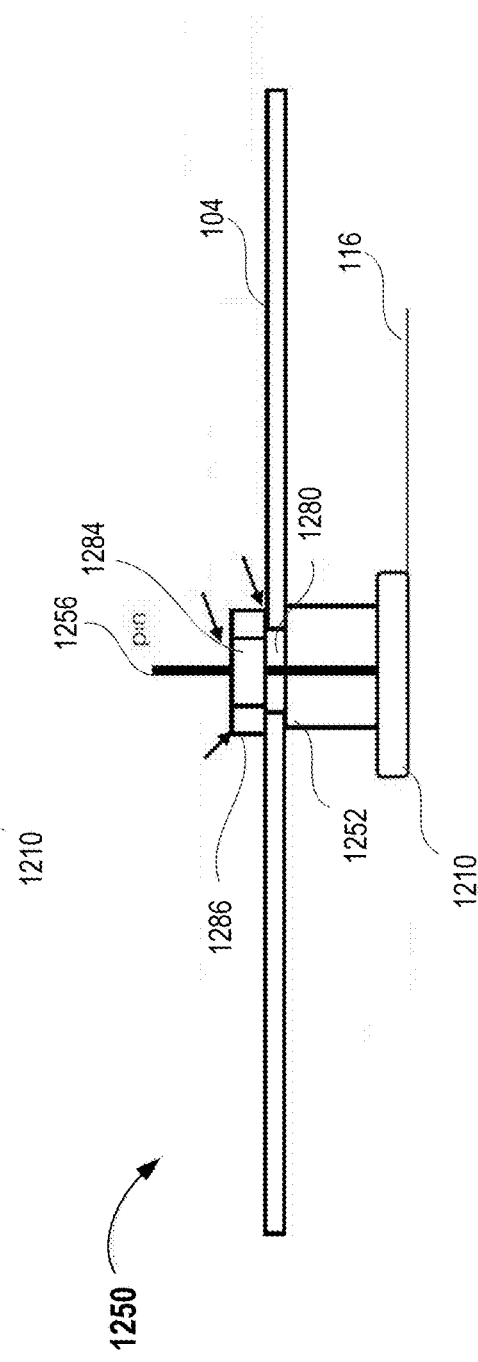

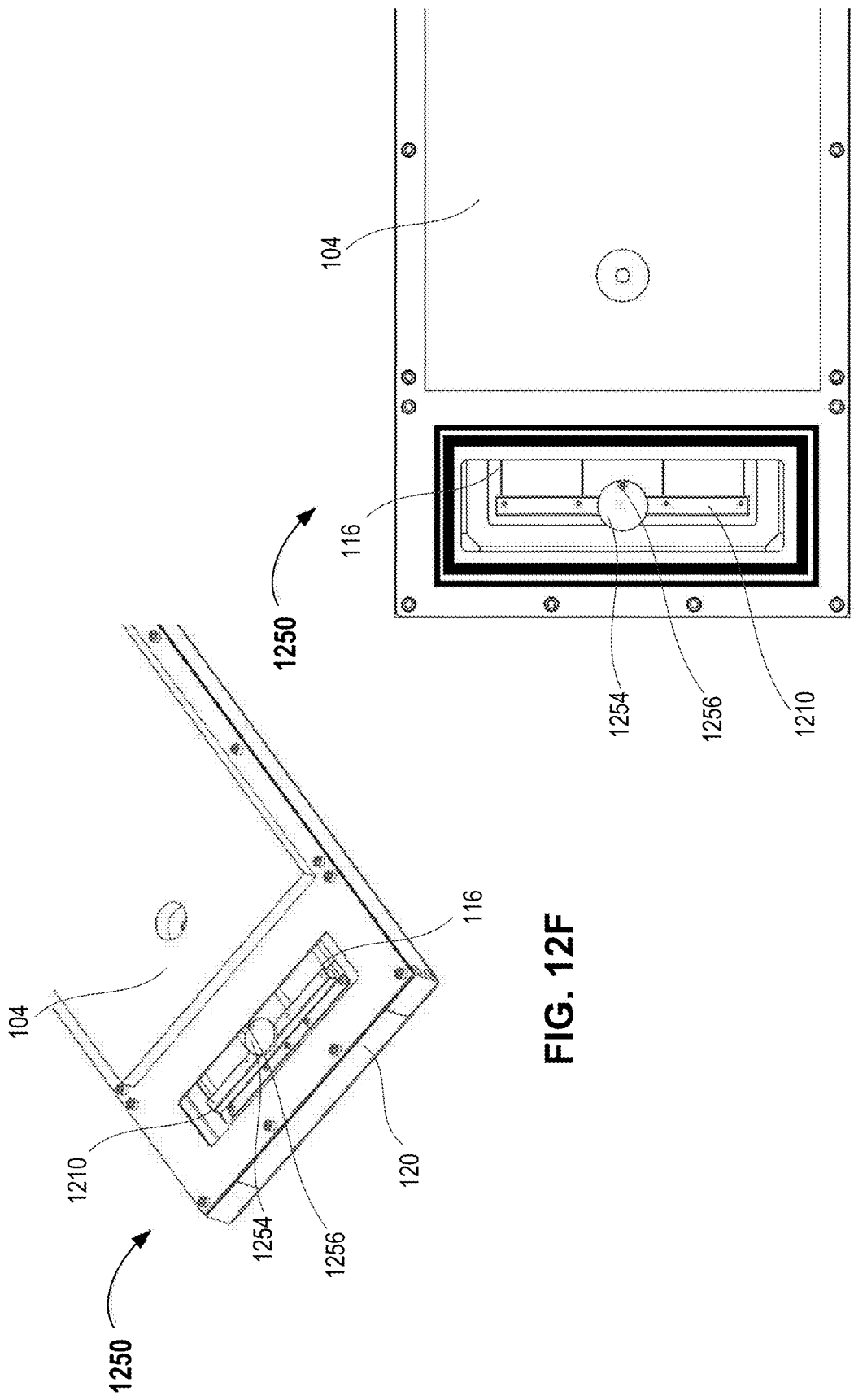

FISSILE NEUTRON DETECTOR

RELATED APPLICATIONS

This application is a continuation application of copending application Ser. No. 15/039,842, filed May 26, 2016; which is a National Stage entry of PCT application PCT/US2015/056093, filed on Oct. 16, 2015; which claims priority to U.S. Provisional Application No. 62/065,029, filed on Oct. 17, 2014; the disclosures of which are incorporated herein by reference.

TECHNICAL FIELD

The present disclosure relates to the detection of high energy neutrons such as those emitted by plutonium and highly enriched uranium.

BACKGROUND

Governments mobilize radiation detectors to stop the illicit movement of nuclear material such as plutonium and uranium. Previous approaches to neutron detection have relied upon an isotope of helium gas, helium 3 or $^3$He, a limited resource generated during the construction and/or decommissioning of nuclear weapons which is already showing signs of a global short supply. Due to increasing $^3$He shortages and the resulting increase in associated costs, neutron detectors utilizing $^3$He cannot be economically deployed at scales. Efforts to develop replacement technologies have been initiated however, none of these efforts have produced a cost effective, scalable solution.

The lack of scalable technology has limited the evolution of existing systems to meet evolving threats. Specifically, current modeling efforts show that the deployment of a large, networked array of detection technologies—where the detectors are placed at potential points of attack, material source locations, and discreetly at randomized points of transportation pathways-will lead to the greatest increase of overall security against nuclear threats.

Plutonium and highly enriched uranium (HEU)-materials that can be used in a nuclear weapon-emit both gamma rays and neutrons. After the attacks on Sep. 11, 2001, the U.S. government sought to strengthen border defenses against smuggled Special Nuclear Materials (SNM). To detect SNM, Federal, state, and local governments deployed detection units using on 3He gas in proportional counters wrapped in high-density polyethylene (HDPE)-a technology pulled from physics laboratories and the nuclear power industry. Polyvinyltoluene (PVT) plastics hooked up to photomultiplier tubes (PMT), pulled from the scrap-steel industry, were used to detect gamma rays emitted by HEU, as well as other dangerous radioactive sources that could be used to create a radiological dispersive device. Handheld devices, which have better gamma ray energy resolution than PVT, supported the main scanning capabilities of these larger $^3$He and PVT detectors.

This initial detection capability had challenges. The initial deployment of neutron detectors severely depleted the limited stockpile of $^3$He, driving costs sky-high and limiting scalability of deployment. Equally problematic were the number of false positive alarms that were due to the poor energy resolution of PVT, increasing overall scanning times and limited the usability of the systems. Multiple government R&D programs over the past ten years have invested in $^3$He alternatives for neutron detection, as well as improved energy resolution gamma ray detection units. However, while some alternative materials have emerged, none of the R&D programs succeeded in reducing the cost of these systems. Furthermore, low-cost, large-surface-area gamma ray detectors have not been realized at any reasonable price point, with most of the work still focusing on smaller surface area (around 200 cm$^2$ active regions) devices. The original desire to replace neutron detectors with large surface high-energy-resolution gamma-ray detection (which could detect the gamma ray signals from both Pu and HEU) has therefore faded. Given that 1.2 million kilograms of Pu has been produced since World War II, and its key signature is neutron emission, neutron detection is now considered a non-negotiable component of threat detection capability.

For these reasons, new neutron detection solutions are needed. The solution should:
  Be low cost and independent of $^3$He. This will enable scalable, affordable solutions;
  Have low probability for gamma-ray induced false positives by having high gamma ray rejection and secondary gamma ray isotope identification system;
  Be rugged and long lived for compatibility with military CONOPS; and
  Hit metrics of capture area and efficiency to detect the desired threats will be a major advance in the overall reduction of nuclear threats.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 6C is a sectional front elevation view of the illustrative neutron detector depicted in FIG. 6A, in accordance with at least one embodiment of the present disclosure;

FIG. 6D is a sectional side elevation view of the illustrative neutron detector depicted in FIG. 6A, in accordance with at least one embodiment of the present disclosure;

FIG. 12C is a detail drawing depicting an electrode connection devices for use with the illustrative neutron detector depicted in FIGS. 12A and 12B, in accordance with at least one embodiment of the present disclosure;

FIG. 12D is a detail drawing depicting another electrode connection device for use with the illustrative neutron detector depicted in FIGS. 12A and 12B, in accordance with at least one embodiment of the present disclosure;

FIG. 12E is a detail drawing depicting another electrode connection devices for use with the illustrative neutron detector depicted in FIGS. 12A and 12B, in accordance with at least one embodiment of the present disclosure;

FIG. 12F is a close up perspective view of the electrode connection device depicted in FIG. 12C, in accordance with at least one embodiment of the present disclosure;

FIG. 12G is a close up plan view of the electrode connection device depicted in FIG. 12C, in accordance with at least one embodiment of the present disclosure;

Figure 1A:
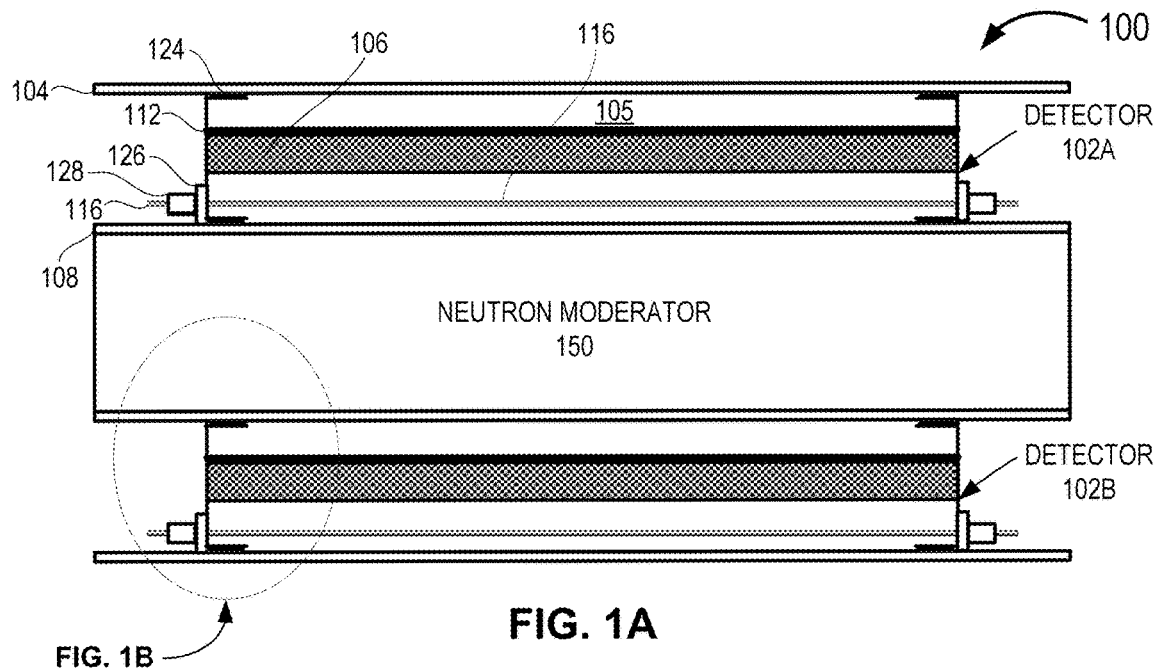
FIG. 1A is a front elevation view of an illustrative fissile neutron detector, in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

A fissile neutron detection system is provided. The fissile neutron detection system may include a first neutron detector and a second neutron detector. The first neutron detector and the second neutron detector may each include: a chamber containing at least one active material that emits at least one ionizing particle upon exposure to thermal neutrons and at least one electrode. The system may further include a neutron moderator disposed proximate the first neutron detector and the second neutron detector in a space between the first neutron detector and the second neutron detector. The neutron moderator may include a hydrogen-containing material that transitions at least a portion of high-energy incident fissile neutrons to low-energy thermal neutrons. In some implementations, the fissile neutron capture efficiency of such a system may exceed 60%. In some implementations, the active material may include one or more sheets of a solid material such as lithium-6 ($^6$Li) or boron-10 ($^{10}$B) that may emit a number of charged particle(s) upon capture of a thermal neutron. In some implementations, the neutron moderator may include one or more solid thermoplastic materials, such as high-density polyethylene (HDPE), which includes a high weight percentage of hydrogen.

A fissile neutron detection method is provided. The method may include transitioning at least some incident fissile neutrons to thermal neutrons by passing the incident fissile neutrons through at least one neutron moderator proximate a first neutron detector and a second neutron detector. The neutron moderator is located in a space between the first neutron detector and the second neutron detector. The neutron moderator includes a hydrogen containing material that causes the transition of the at least some incident fissile neutrons to thermal neutron. The method further includes impinging at least a portion of the thermal neutrons exiting the neutron moderator on either of: at least one active material disposed in a chamber of the first neutron detector or, at least one active material disposed in a chamber of the second neutron detector. The method also includes generating, by the first neutron detector and the second neutron detector, a current proportional to the number of thermal neutrons impinging on the active material in the first neutron detector and on the active material in the second neutron detector.

The relatively high-energy fissile neutron (energy level >100 keV) enters the neutron moderator and collides with hydrogen nuclei within the moderator. The collisions reduce the energy level of the fissile neutron to a relatively low-energy thermal neutron (energy level <0.1 eV). The collisions may also cause a portion of the incident fissile neutrons to exit the moderator along a vector that does not intersect the first neutron detector or the second neutron detector. Thus only a portion of the incident fissile neutrons may be captured by the neutron detectors. Using the detector/moderator/detector arrangement described herein offers a significant cross-sectional area for fissile neutron capture, providing capture efficiencies of greater than 60%. Such capture efficiency exceeds the capture efficiency of other neutron detection systems such as systems using $^{10}$B straw detectors placed in a moderator block which offer significantly less cross-sectional area for neutron capture.

At least some of the thermal neutrons exiting the neutron moderator enter the first neutron detector or the second neutron detector. Within the neutron detector, the thermal neutron impinges on an active material. In some instances, the active material may capture the thermal neutron and generate a number of daughter particles such as one or more alpha particles (two protons/two neutrons) and/or one or more tritons (one proton/two neutrons). At least some of the daughter particles may ionize a readout gas within the neutron detector. The drift electrons and ionized readout gas cause a charge flow within the neutron detector. The charge flow may be captured by an electrode as an electrical current. One or more properties of the electrical current may be indicative of a number of fissile neutrons detected by the neutron detector and/or the rate of fissile neutron detection by the neutron detector.

Another fissile neutron detection system is provided. The fissile neutron detection system may include at least one neutron detector. Each neutron detector may include a body having a length, a width, and a height defining a closed chamber; the length and the width of the chamber greater than the height of the chamber, at least one active material that emits at least one ionizing particle upon exposure to thermal neutrons, the active material disposed within the chamber and at least one electrode disposed in the chamber. The fissile neutron detection system may further include at least one neutron moderator disposed proximate the at least one neutron detector. Each neutron moderator may include a material that transitions at least a portion of high-energy incident fissile neutrons to low-energy thermal neutrons.

A fissile neutron detection method is also provided. The method may include transitioning at least some incident fissile neutrons to thermal neutrons by passing the incident fissile neutrons through at least one neutron moderator disposed proximate at least one neutron detector. Each neutron detector may include a body having a length, a width, and a height defining a closed chamber; the length and the width of the chamber greater than the height of the chamber. Each neutron detector may further include at least one active material that emits at least one ionizing particle upon exposure to thermal neutrons, the active material disposed within the chamber and at least one electrode disposed in the chamber. The method may additionally include impinging at least 60% of the thermal neutrons exiting the neutron moderator on the at least one active material disposed in the chamber of the at least one neutron detector. The method may further include generating, by the at least one neutron detector, a current at the at least one electrode, the current proportional to the number of thermal neutrons impinging on the at least one active material in the at least one neutron detector.

Another fissile neutron detection system is provided. The fissile neutron detection system may include a first neutron detector, a second neutron detector, and a neutron moderator. Each of the neutron detectors may include a body having a length, a width, and a height that define a hermetically sealed, continuous chamber, wherein the length and the width of the body exceed a height of the body. Each neutron detector may also include at least one active material disposed within the hermetically sealed chamber, the at least one active material to emit at least one charged particle upon exposure to a thermal neutron. Each neutron detector may additionally include at least one electrode disposed within the chamber and electrically isolated from the body. The neutron moderator may be disposed proximate the first neutron detector and the second neutron detector. The neutron moderator may be disposed in a space between the first neutron detector and the second neutron detector. The neutron moderator may include one or more hydrogen-containing materials that transition at least a portion of high-energy incident fissile neutrons to low-energy thermal neutrons that are detectible by the first neutron detector or the second neutron detector.

As used herein, the terms "top" and "bottom" are intended to provide a relative and not an absolute reference to a location. Thus, inverting an object having a "top cover" and a "bottom cover" may place the "bottom cover" on the top of the object and the "top cover" on the bottom of the object. Such configurations should be considered as included within the scope of this disclosure.

As used herein, the terms "first," "second," and other similar ordinals are intended to distinguish a number of similar or identical objects and not to denote a particular or absolute order of the objects. Thus, a "first object" and a "second object" may appear in any order—including an order in which the second object appears before or prior in space or time to the first object. Such configurations should be considered as included within the scope of this disclosure.

Figure 1B:
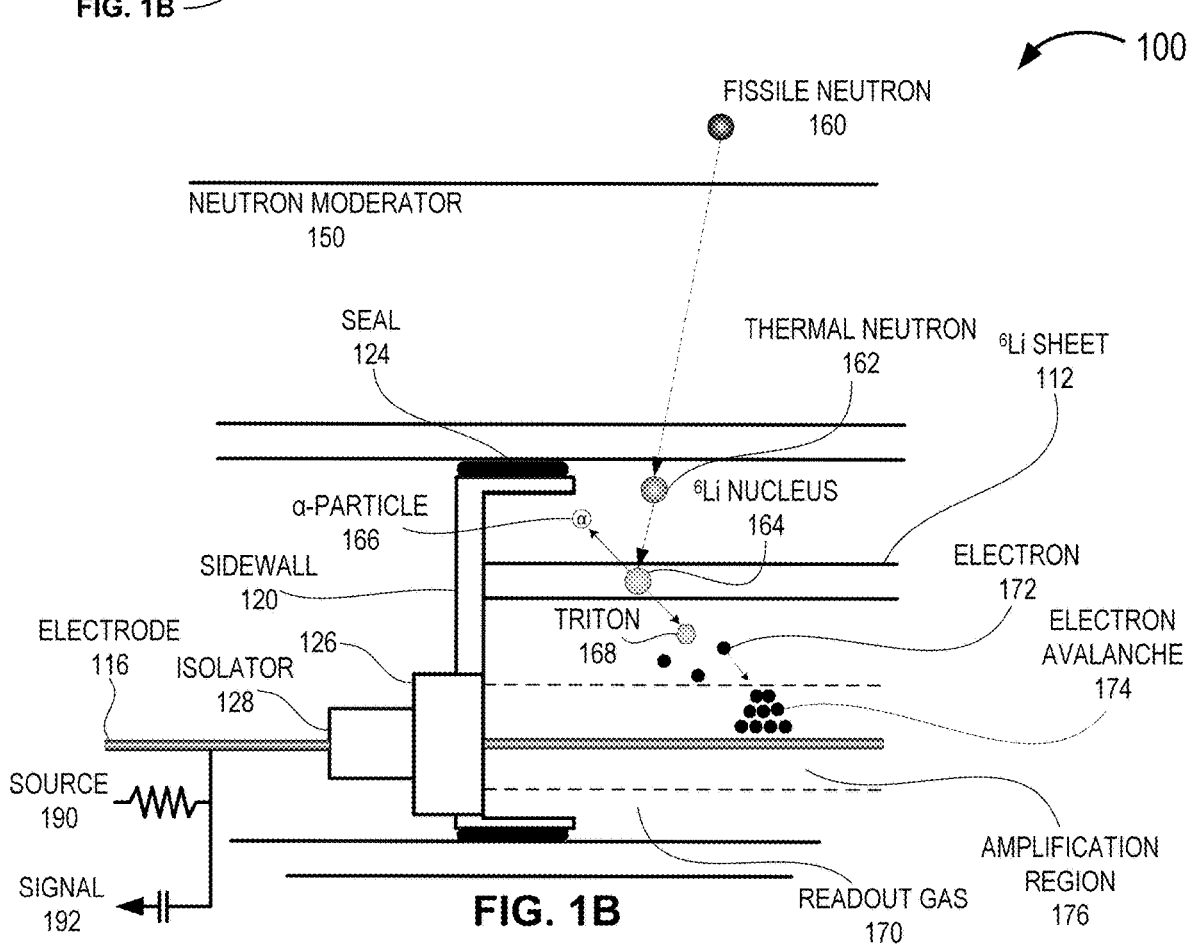
FIG. 1B is a partial cross sectional view of the illustrative fissile neutron detector depicted in FIG. 1A, in accordance with at least one embodiment of the present disclosure.
Figure 1C:
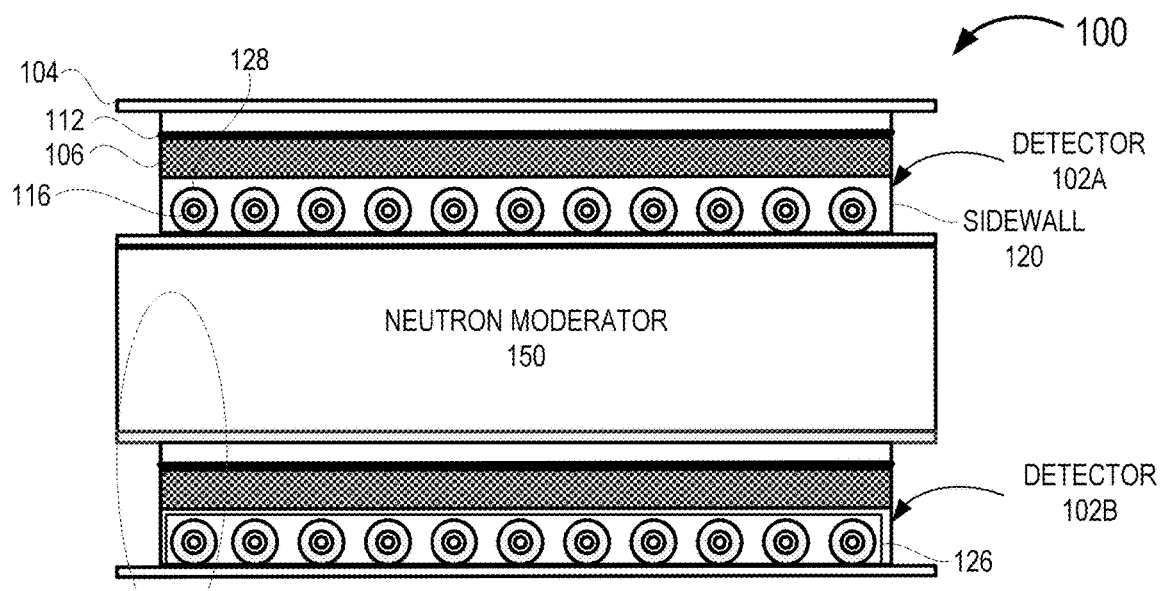
FIG. 1C is a side elevation view of the illustrative fissile neutron detector depicted in FIG. 1A, in accordance with at least one embodiment of the present disclosure.
Figure 1D:
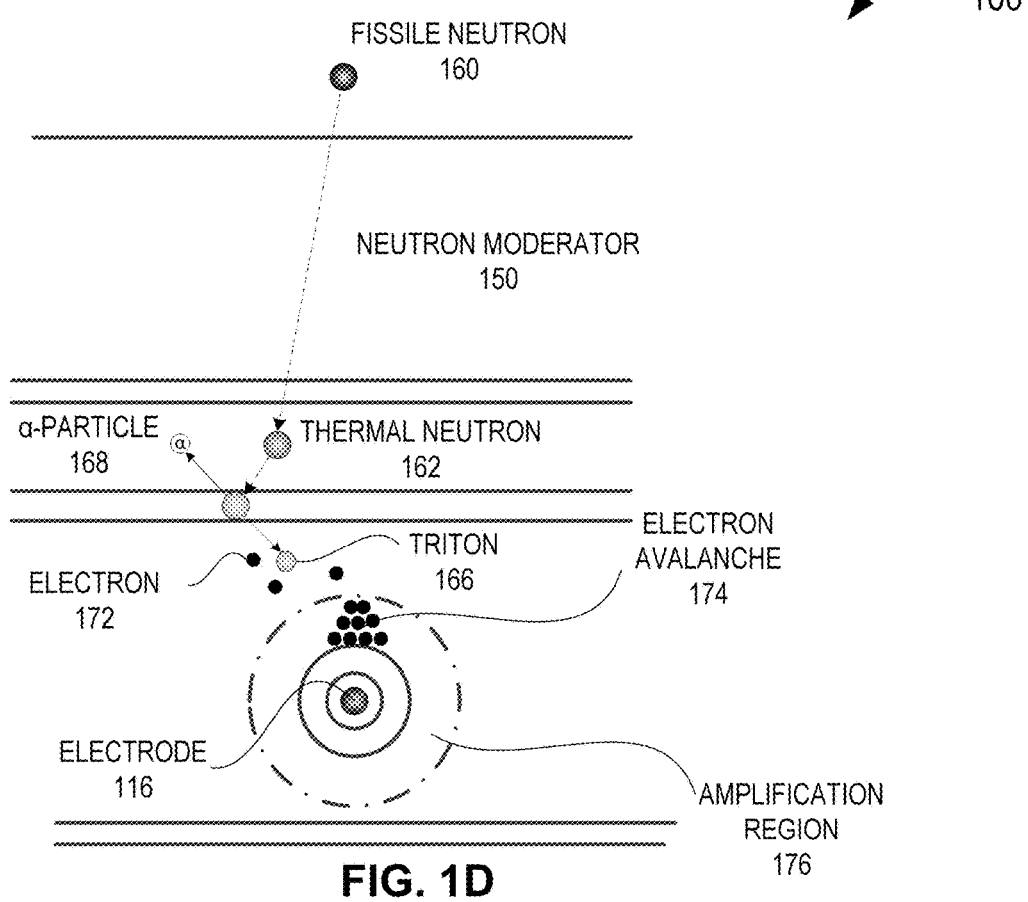
FIG. 1D is a partial cross-sectional view of the illustrative fissile neutron detector depicted in FIG. 1C, in accordance with at least one embodiment of the present disclosure.
Figure 1E:
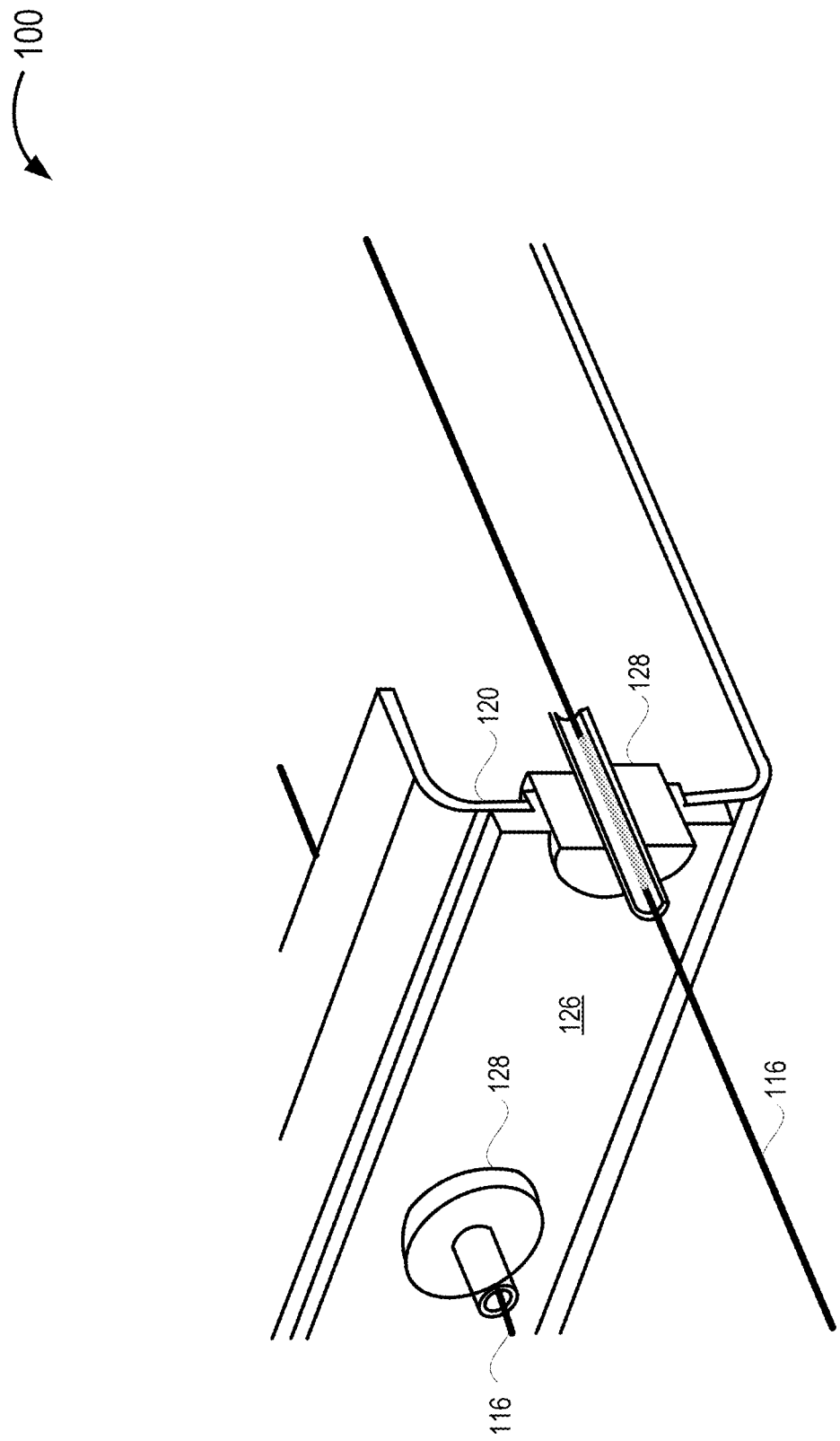
FIG. 1E is a partial sectional view of an illustrative isolator through which an electrode is introduced to an interior chamber in the neutron detector, in accordance with at least one embodiment of the present disclosure.

FIG. 1A is a front elevation of an illustrative fissile neutron detection system 100 that includes a first neutron detector 102A, a second neutron detector 102B (collectively, "neutron detectors 102") and a neutron moderator 150 that is at least partially disposed proximate the first neutron detector 102A and the second neutron detector 102B in the space formed between the first neutron detector 102A and the second neutron detector 102B, in accordance with at least one embodiment of the present disclosure. FIG. 1B is a partial sectional view of the illustrative neutron detection system 100 shown circled in FIG. 1A, in accordance with at least one embodiment of the present disclosure. FIG. 1B depicts operational level details of the fissile neutron detection system 100. FIG. 1C is a side elevation of the illustrative fissile neutron detection system 100 depicted in FIG. 1A, in accordance with at least one embodiment of the present disclosure. FIG. 1D is a partial sectional view of the illustrative neutron detection system 100 shown circled in FIG. 1C, in accordance with at least one embodiment of the present disclosure. FIG. 1D depicts operational level details of the fissile neutron detection system 100. FIG. 1E is a partial sectional view of an illustrative isolator 128 through which an electrode 116 is disposed within the neutron detector 102.

Although a first neutron detector 102A and a second neutron detector 102B are depicted and described in association with FIGS. 1A-1E, alternate arrangements that include only a single neutron detector 102 should be considered as alternate embodiments of the concepts described herein. For example, a single neutron detector 102 may be formed into a hollow ring or tube-like structure having one or more apertures therethrough. In such an implementation, the neutron moderator 150 may be disposed in whole or in part within some or all of the apertures.

The neutron moderator 150 may be a single or multi-piece member having any number or combination of shapes or configurations. Regardless of shape and/or configuration, the neutron moderator 150 has a surface area that may be defined by the external surfaces of the neutron moderator 150. Such surface area may include exposed (e.g., outwardly facing) exterior surfaces, hidden (e.g., inwardly facing) exterior surfaces, or any combination thereof. For example, the surface area of a planar neutron modulator 150 having an annulus therethrough would include the surface area of the plane, the "edges" of the plane, and the surface area about the perimeter of the annulus. A majority of the surface area of the neutron moderator 150 may be disposed proximate one or more neutron detectors 102. In various embodiments, the majority of the surface area of the neutron moderator 150 may include a surface area that is: greater than about 50% of the total moderator surface area; greater than about 60% of the total moderator surface area; greater than about 70% of the total moderator surface area; greater than about 80% of the total moderator surface area; greater than about 90% of the total moderator surface area; greater than about 95% of the total moderator surface area; or greater than about 99% of the total moderator surface area.

At least a portion of the fissile neutrons 160 impinging upon the neutron moderator 150 may enter, strike, or otherwise impinge upon the neutron moderator 150. Within the neutron moderator 150 energy may be stripped as the fissile neutrons collide with hydrogen nuclei within the moderator. As a result of these collisions, the energy level of the fissile neutron 160 is reduced to that of a thermal neutron. Also as a result of the random nature of these collisions, the low-energy thermal neutron 162 may exit the neutron moderator along the same or different vector than the incident fissile neutron 160. By placing the majority of the surface area of the neutron moderator 150 proximate a neutron detector 150, the probability of detecting such a thermal neutron 162 exiting the neutron moderator is increased. In various embodiments, the probability that an incident fissile neutron 160 will be detected upon exiting the neutron moderator 150 as a thermal neutron 162 may be: about 60% or greater; about 70% or greater; about 80% or greater; about 90% or greater; about 95% or greater; about 99% or greater.

Each of the neutron detectors 102 includes a top cover 104, a bottom cover 108, and sidewalls 120 that form a chamber 105. In some implementations, one or more gas tight or gas impervious seals 124 may be disposed in the joints formed by the sidewall 120 and the top cover 104 and the sidewall 120 and the bottom cover 108. In at least some implementations, the seals 124 may isolate or hermetically seal the chamber 105 to minimize or even prevent exchange of gases or fluids between the chamber 105 and the exterior environment. In some implementations, the chamber 105 may include a single, continuous (i.e., uninterrupted) chamber 105. In some implementations the chamber 105 may contain one or more gases or gas combinations. For example, the chamber 105 may contain a noble gas such as argon (Ar). In some implementations, at least one layer or sheet of active material 112, a support matrix 106 to support each layer or sheet of active material 112. A number of electrodes 116 may extend partially or completely through all or a portion of the chamber 105. Isolators 128 may be disposed at locations where the electrodes 116 extend through a wall or cover of the chamber 105 to electrically isolate the electrode 116 from the sidewall or cover of the chamber 105. Although not depicted in FIGS. 1A-1E, in some implementations, all or a portion of the number of electrodes 116 may penetrate the top cover 104 and/or bottom cover 108 to enter the chamber 105 of the neutron detector 102 rather than penetrating the sidewall 120. In such instances, one or more isolators 128 may be disposed about the electrodes 116 at the point the electrodes penetrate into the chamber 105. As depicted in FIGS. 1B and 1D, during operation, neutrons and gamma rays impinge upon the fissile neutron detection system 100. Fissile neutrons 160 may be produced, for example, by plutonium (Pu) or other highly enriched uranium (HEU) products such as may be found in a "dirty bomb" or other explosive device. Within the chamber 105 of each of the neutron detectors 102 a sheet of active material 112, such as lithium 6 ($^6$Li) may be disposed on a support structure such as an aluminum honeycomb matrix 106. Fissile neutrons impinging upon the fissile neutron detection system 100 may pass through a neutron moderator 150 where the energy level of at least a portion of the incident fissile neutrons 160 (e.g., 100 keV to 200 MeV) may be reduced to the energy level of a thermal neutron 162 (e.g., 0.025 electron volts (eV) to 0.50 electron volts (eV)).

The thermal neutron 162 may be captured by one of the $^6$Li atoms contained in the active material 112. The capture of the thermal neutron 162 by the $^6$Li atom forms a lithium 7 ($^7$Li) atom that may decay into two daughter particles, an alpha particle 166 and a triton 168. The triton 168 and alpha particle 166 travel in opposite directions, and dissipate energy as they travel through the active material 112. Upon exiting the active material 112, at least some of the tritons 168 or alpha particles 166 having sufficient kinetic energy will ionize atoms in the readout gas 170 disposed within the chamber 105. Electrons 172 produced by the ionization of the readout gas 170 may tend to drift towards the electrodes 116 in the chamber and the ionized gas generated by the ionization of readout gas 170 may tend to drift towards the active layer 112. Electrons 172 that drift within the amplification region 176 (i.e., the Townsend avalanche region—approximately 5 times the radius of the electrode 116) encounter an electric field that accelerates the drifting electrons 172 to a sufficient velocity that additional readout gas 170 may be ionized. The additional ionized readout gas may create additional electrons 172 that also tend to drift toward the electrodes 116 and cause additional ionization of the readout gas 170. This process that occurs within the Townsend avalanche may be referred to as "gas multiplication." Ionized atoms of the readout gas 170 within the Townsend avalanche region that move towards the active layer 112 induce a current flow along the electrode 116. In implementations, the current along the electrode 116 may be collected and amplified using a pulse-mode, charge-sensitive preamplifier to produce a voltage output signal 192. Pulse height discrimination circuitry may be used to compare the voltage output signal to a first defined threshold to determine whether a fissile neutron 160 has been detected (e.g., for a gas multiplication of roughly 100, and an amplification circuitry gain of about 1 fC/mV, pulse heights greater than about 250 keV may indicate the presence and/or detection of a fissile neutron 160).

In some embodiments, the false positive detection rate of fissile neutrons 160 based on the first predetermined threshold may be less than $1\times10^{-5}$ for a gamma ray exposure rate of 100 mR/hr. A second predetermined threshold may be selected and may be set at a value that is less than the first predetermined threshold. Voltage output signals 192 below the second predetermined threshold may be deemed as very low ionizing gamma ray events or movements of charge in the fissile neutron detection system 100 that were induced by another source (e.g., thermal heat, radio frequency electromagnetic radiation, and changes in the relative position of the electrodes 116 and active layer 112—known as microphonics). Voltage output signals 192 below the first predetermined threshold and above the second predetermined threshold may be indicative of gamma ray events. The detected rate of neutrons and gamma rays impinging upon the fissile neutron detection system 100 can be used in radiation detection methodologies (e.g., detect the presence of a nuclear weapon or unauthorized nuclear device).

In embodiments, the composition of the readout gas 170 may be maintained relatively constant over time to avoid deterioration of the gamma ray and neutron detection process. Change in readout gas 170 composition greater than 1% in the composition may affect the Townsend avalanche process. For example, nitrogen, oxygen, or water molecules that leak into the chamber 105 may not ionize as well as a readout gas 170, such as argon, in the amplification region 176 near the electrodes 116, and therefore may reduce the Townsend avalanche process near the electrodes 116 when introduced into the readout gas 170. This may reduce the ability of the readout electronics to distinguish between noise, gamma ray, and fissile neutron events, thereby decreasing the efficiency and/or accuracy of the fissile neutron detection system 100. A 1% change in the composition of the readout gas 170 may cause up to an 8% change in the voltage output signal 192. To maintain accuracy and responsiveness of the fissile neutron detection system, it is advantageous to limit the change in composition of the readout gas 170 by minimizing the following: (1) the egress of readout gas 170 from the chamber 105; and (2) the ingress of contaminants, including air constituents (nitrogen, oxygen, carbon dioxide), water, and other airborne molecules, into the chamber 105.

The top cover 104 and the bottom cover 108 may be fabricated from one or more materials that permit the passage of thermal neutrons 162 from a neutron moderator 150 to the chamber 105. In at least some implementation, the top cover 104 and the bottom cover 108 may be fabricated from one or more stainless steels, such as, an 18/8 stainless steel, a 304 stainless steel, a 304L stainless steel, a 316 stainless steel, or a 316L stainless steel. Other grades and materials may be substituted with equal efficiency. The top cover 104 and the bottom cover 108 define the overall configuration of the neutron detector 102. In one example, the top cover 104 and the bottom cover 108 may include generally planar members—in such embodiments, the neutron detector 102 may have a generally planar configuration, for example a square configuration having a side length of about 0.10 meters (m) or less; about 0.25 m or less, about 0.50 m or less, about 0.75 m or less, about 1 m or less, or about 2 m or less. The top cover 104 and the bottom cover 108 may have other shapes, such as triangular, octagonal, hexagonal, circular, elliptical, rectangular, or even irregular shapes to fit within designated areas. Similarly, the chamber 105 at least partially formed and/or bounded by the top cover 104 and/or the bottom cover 108 may have any shape, configuration, or regular/irregular perimeter. For example, the chamber 105 may be generally square, generally rectangular, generally oval, generally elliptical, generally circular, generally triangular, generally polygonal, generally trapezoidal, or any other regular or irregular configuration. In some implementations, all or a portion of the chamber 105 may be spherical or hemispherical and all or a portion of the neutron moderator 150 may be spherical and placed concentrically within the chamber 105 of the neutron detector 102.

The chamber 105 may have any dimensions. In some embodiments, the chamber 105 may be defined by three, mutually orthogonal, measurements, such as a length, a width, and a height. In such embodiments, the top cover 104 and/or the bottom cover 108 may define either or both the length and the width of the chamber 105. In such embodiments, the sidewall 120 may define the height of the chamber 105. The chamber 105 may have a length and width that greatly exceed the height of the chamber 105. In some embodiments, the length of the chamber 105 measured along a first axis may exceed the height of the chamber 105 measured along a second axis orthogonal to the first axis by a factor of: about 3 times or greater; about 5 times or greater; about 7 times or greater; about 10 times or greater; about 15 times or greater; about 20 times or greater; about 25 times or greater; about 30 times or greater; about 50 times or greater; about 75 times or greater; or about 100 times or greater. In some embodiments, the width of the chamber 105 measured along a third axis may exceed the height of the chamber 105 measured along the second axis orthogonal to the third axis by a factor of: about 3 times or greater; about 5 times or greater; about 7 times or greater; about 10 times or greater; about 15 times or greater; about 20 times or greater; about 25 times or greater; about 30 times or greater; about 50 times or greater; about 75 times or greater; or about 100 times or greater.

In embodiments, the chamber 105 may have a length, measured along a first axis, of about 10 centimeters (cm) or greater; about 20 cm or greater; about 30 cm or greater; about 50 cm or greater; about 75 cm or greater; about 100 cm or greater; about 200 cm or greater; about 500 cm or greater; about 700 cm or greater; or about 1000 cm or greater. In embodiments, the chamber 105 may have a height, measured along a second axis orthogonal to the first axis, of about 0.5 centimeters (cm) or less; about 1 cm or less; about 1.5 cm or less; about 2 cm or less; about 2.5 cm or less; about 3 cm or less; about 3.5 cm or less; about 4 cm or less; about 4.5 cm or less; or about 5 cm or less. In embodiments, the chamber 105 may have a width, measured along a third axis orthogonal to the first axis and the second axis, of about 10 centimeters (cm) or less; about 15 cm or less; about 20 cm or less; about 25 cm or less; about 30 cm or less; about 35 cm or less; about 40 cm or less; about 45 cm or less; about 50 cm or less; or about 100 cm or less.

In other embodiments, the top cover 104 and the bottom cover 108 may have configurations other than planar, for example the top cover 104 may include a simple or compound curved surface having a first radius while the bottom cover 108 may include a similar simple or compound curved surface having a second radius that is greater or less than the first radius. Such an implementation can provide a neutron detector that is curved, arced, or hemispherical.

In yet other embodiments, the top cover 104 and the bottom cover 108 may have generally similar irregular shapes that permit the construction of neutron detectors 102 having virtually any size, shape, and/or physical configuration. Such may, for example, advantageously permit the custom fitting of neutron detectors 102 within odd or irregular shaped housings. In at least some implementations, all or a portion of the top cover 104 and/or the bottom cover 108 may be integrally formed with all or a portion of the sidewall 120 to eliminate one or more joints between the respective cover 104, 108 and the sidewall 120. In some implementations, all or a portion of the top cover 104 and/or bottom cover 108 may be affixed to all or a portion of the sidewall 120 using one or more adhesives, by welding or brazing, or similar attachment or affixment techniques capable of providing a gas tight seal between the sidewall 120, the top cover 104, and the bottom cover 108. In some implementations, the top cover 104, the bottom cover 108, and at least a portion of the sidewall 120 may be integrally formed, for example using one or more casting, extrusion, injection molding, or similar processes in which all or a portion of the top cover 104, all or a portion of the bottom cover 108, and a portion of the sidewalls 120 are seamlessly formed.

In some embodiments, some or all of the seals 124 between the sidewall 120 and the top cover 104 and/or the sidewall 120 and the bottom cover 108 may be formed from an elastomeric compound that is compressed or otherwise formed to the mating surfaces of the sidewall 120 and the top cover 104 and/or the sidewall 120 and the bottom cover 108. In some implementations all or a portion of the seals 124 may include polyisobutylene or one or more polyisobutylene containing compounds to maintain the composition of the readout gas 170 over an extended timeframe (e.g., 30 years). Beneficially, the use of a flexible elastomeric seal 124 provides the ability for the seal 124 to conform to the mating surfaces of the sidewall 120, the top cover 104 and/or the bottom cover 108, filling any imperfections in the mating surfaces and minimizing the likelihood of readout gas 170 leakage through gaps formed by imperfections in the mating surfaces.

In some embodiments, the quality of the mating surfaces found on the top cover 104, bottom cover 108, and/or sidewalls 120 may be selected to generate uniform electric fields near the electrodes 116 of the fissile neutron detection system 100 (e.g., the variance in the finish on the mating surfaces of the top cover 104, bottom cover 108, and/or sidewall 120 may be equal to or less than 0.020" inches). Providing such a surface finish on the mating surfaces improves sealing of the chamber 105 and takes advantage of the sealing properties of an elastomeric seal 124 which may accommodate such fluctuations in the surface finish of the mating surfaces.

The use of an elastomeric seal 124 may also facilitate a low temperature manufacturing process that minimizes or even eliminates high temperature processes, such as welding or brazing, on the fissile neutron detection system 100 which reduces warping and bending of the components of the fissile neutron detection system 100. An elastomeric seal may also accommodate thermal expansion/contraction of the chamber components, thereby allowing a greater number of material choices for the top plate 104, bottom plate 108, and sidewalls 120 such as glass, aluminum, or stainless steel. The elastomeric seal 124 may have a thickness in the range of about 25 micrometers ($\mu$m) to about 1 centimeter (cm) and a width in the range of about 1 cm to about 5 cm. Such an elastomeric seal 124 may provide less than 1% leakage of an argon-methane readout gas 170 from the chamber 105, and less than 1% leakage of oxygen into the chamber 105 over a 30 year period for a chamber 105 having a length of about 0.5 m, a width of about 1 m, and a height of about 1 cm. In one implementation, the elastomeric seal 124 may include a polyisobutylene seal 124 having a width of about 1.5 cm, a total surface area of 30 square centimeters ($cm^2$), may maintain an oxygen leak rate into the chamber 105 of about $1.3 \times 10^{-10}$ $cm^3 \cdot cm/(s \cdot cm^2 \cdot cm\text{-}Hg)$. A leak rate of about $1.3 \times 10^{-10}$ $cm^3 \cdot cm/(s \cdot cm^2 \cdot cm\text{-}Hg)$ provides an oxygen concentration of about 0.75% by volume for a chamber 105 having a volume of approximately 5000 cubic centimeter ($cm^3$) after 30 years of operation.

In some embodiments, all or a portion of the sidewalls 120 may be fabricated using one or more metallic materials, such as stainless steel. In some embodiments, all or a portion of the sidewall 120 may be fabricated using aluminum or an aluminum containing alloy. In some embodiments, the sidewall 120 may have a mating surface or lip that, upon assembly, is disposed proximate the top cover 104, the bottom cover 108, or both the top cover 104 and the bottom cover 108. In some implementations, the mating surface may be machined or similarly finished to remove irregularities in the surface and provide a relatively smooth sealing surface.

In some embodiments, the readout gas 170 may include one or more pure or nearly pure noble gases, such as argon (Ar). In some embodiments, the readout gas 170 may include a gas mixture, for example a gas containing 90 percent by volume (vol %) argon and 10 vol % quenching gas such as carbon dioxide or methane. In some implementations, the voltage bias applied to the electrode 116 may be adjusted, controlled, or otherwise altered based at least in part on the composition of the readout gas 170. In such instances, a small (e.g., 1%) change in the bias voltage applied to an electrode 116 may cause a larger change (e.g., up to about 15%) in the voltage output signal provided by or generated by the electrode 116.

The active material 112 disposed in the chamber 105 may include one or more sheets of active material disposed within the chamber, one or more layers of active material disposed within the chamber, or in some implementations, an active gas disposed within the chamber 105. In some implementations, the active material may include lithium 6 ($^6$Li), boron 10 ($^{10}$B), or helium 3 ($^3$He). In some embodiments, the active material 112 may include a sheet of active material such as a sheet of $^6$Li foil that, in some embodiments, may be supported within the chamber 105 by a support matrix 106. In such implementations, the length and width of the sheet of active material 112 may greatly exceed the thickness of the layer of active material 112. In such implementations, the length and width of the sheet of active material 112 may greatly exceed the thickness of the neutron detector 102. In such implementations, the length and width of the sheet of active material 112 may greatly exceed the thickness of the chamber 105.

In embodiments using one or more sheets of $^6$Li foil as the active material 112, each sheet of $^6$Li foil may have a length and a with that greatly exceed the thickness of the foil. In embodiments, the sheet of $^6$Li foil may have a thickness of about 30 micrometers (μm) or less; about 40 μm or less; about 50 μm or less; about 60 μm or less; about 70 μm or less; about 80 μm or less; about 90 μm or less; about 100 μm or less; about 110 μm or less; or about 120 μm or less. In embodiments, the sheet of $^6$Li foil may have a width of about 10 centimeters (cm) or less; about 20 cm or less; about 30 cm or less; about 40 cm or less; about 50 cm or less; about 60 cm or less; about 70 cm or less; about 80 cm or less; about 90 cm or less; about 100 cm or less. In embodiments, the sheet of $^6$Li foil may have a length of about 10 centimeters (cm) or less; about 25 cm or less; about 50 cm or less; about 75 cm or less; about 100 cm or less; about 150 cm or less; about 200 cm or less; about 250 cm or less; about 500 cm or less; about 1000 cm or less.

Embodiments in which the active layer 112 is disposed at an intermediate point within the chamber may advantageously detect tritons 166 emitted from both sides of the active layer 112. In contrast, tritons 166 emitted from only one side of the active layer 112 may be detected in embodiments in which the active layer 112 is disposed proximate the top cover 104 and/or bottom cover 108 rather than disposed at an intermediate point in the chamber 105.

In some embodiments, the active material 112 may include a layer of active material such as a layer of $^{10}$B that may be disposed on substrate that is disposed within the chamber 105. In some embodiments, the active material 112 may include a layer of active material such as a layer of $^{10}$B that may be disposed (e.g., via chemical vapor deposition or similar processes) on all or a portion of an interior surface of the top cover 104, bottom cover 108, and/or sidewalls 120 forming the chamber 105. In such implementations, the length and width of the layer of active material 112 may greatly exceed the thickness of the layer of active material 112. In such implementations, the length and width of the layer of active material 112 may greatly exceed the thickness of the neutron detector 102. In such implementations, the length and width of the layer of active material 112 may greatly exceed the thickness of the chamber 105.

In some implementations, the active material 112 may include one or more active gas species, for example helium 3 ($^3$He). In such instances, the chamber 105 may be filled with one or more active gases or a mixture that includes one or more active gases. In some implementations, a combination of active sheets, active layers, and/or active gases may be disposed within the chamber 105.

In some implementations, all or a portion of the top cover 104 and/or the bottom cover 108 may be formed into a dished or tray-like form such that the top cover 104 and/or the bottom cover 108 form at least a portion of the sidewall 120, and may, on occasion, form the entire sidewall 120 of the chamber 105. In some implementations, the neutron detector 102 may have a thickness (that includes the top cover 104, the sidewall 120 (if present), and the bottom cover 108 of: about 0.5 centimeters (cm) or less; about 1 cm or less; about 1.5 cm or less; about 2.0 cm or less; about 2.5 cm or less; about 3.0 cm or less; about 3.5 cm or less; about 4.0 cm or less; about 4.5 cm or less; about 5.0 cm or less.

The top cover 104 and the bottom cover 108 may have any dimensions, geometry, and/or configuration to provide a neutron detector 102 having any shape or geometry. In some implementations, the neutron detector 102 may be in the physical configuration of a planar structure having a length and width that greatly exceeds the thickness of the detector 102. In some implementations the length of the neutron detector 120, measured along a first axis, may be from about 5 or more times the thickness of the detector 102 to about 100 or more times the thickness of the detector 102. In some implementations the width of the neutron detector 102, measured along a second axis that is orthogonal to the first axis, may be from about 3 or more times the thickness of the detector 102 to about 50 or more times the thickness of the detector 102. In some implementations, the neutron detector 102 may have a length, measured along a first axis, of from about 10 centimeters (cm) or greater to about 1000 cm or greater; a thickness, measured along a second axis orthogonal to the first axis, of from about 0.5 centimeters (cm) or less to about 5 cm or less; and a width, measured along a third axis orthogonal to the first axis and the second axis of from about 30 cm to about 500 cm. In such implementations, the top cover 104 and the bottom cover 108 may have a corresponding width of from about 30 cm to about 500 cm; and a corresponding length of from about 10 cm or less to about 100 cm or less.

Other neutron detector 102 physical configurations are possible. For example, the neutron detector 102 may be curved about a single axis to provide a neutron detector 102 having a chamber 105 that is arced or parabolic. In such an implementation, the top cover 104 and the bottom cover 108 may be arced or parabolic along the desired axis to provide the chamber 105. In another example, the neutron detected 102 may be curved about two axes to provide a neutron detector 102 having a chamber 105 that is a concave dish, a convex dish, or hemispherical. In such an implementation, the top cover 104 and the bottom cover 108 may be arced or dished along the respective axes to provide the arced or dished chamber 105. In some implementations, the top cover 104 and/or the bottom cover 108 may be fabricated using one or more stainless steels, aluminum, or one or more aluminum alloys. The top cover 104 and/or the bottom cover 108 can be made of glass such as soda-lime or borosilicate glass.

In some embodiments, some or all of the electrodes 116 may pass through the sidewall 120 of the neutron detector 102. In some embodiments, some or all of the electrodes 116 may pass through the top cover 104 and/or the bottom cover 108 of the neutron detector 102. Any number of electrodes 116 may be disposed within the chamber 105. Each of the electrodes 116 can have any profile or shape, for example, the electrodes 116 may include conductors having a round cross section with a diameter of from about 25 micrometers (μm) to about 150 μm. In embodiments, the electrodes 116 may be tensioned to about 33% to about 67% of the breaking or failure limit for the electrode material.

One or more isolators 128 may electrically isolate the electrodes 116 from the sidewall 120, top cover 104, and/or bottom cover 108 of the neutron detector 102. In some implementations, the one or more isolators 128 may hermetically seal about the electrode 116, thereby maintaining the hermetic integrity of the chamber 105. In some implementations, each of the one or more isolators 128 may permit the passage of an electrode 116 through an aperture extending through the isolator 128. After passing the electrode 116 through the isolator 128, the space around the isolator 128 may be filled using a material such as solder, conductive epoxy, brazing, or welding. The tube length through the isolator 128 and the inner diameter of the isolator 128 may be selected based on a variety of factors. For example, the shear strength of Sn-37Pb and Sn-3.5Ag solder may exceed 3000 pounds per square inch (psi). With a tension of approximately 450 grams or 1 pound on a 50 μm diameter tungsten rhenium wire, a solder length of approximately 7 millimeters (mm) would provide a safety factor of 5. The isolators 128 may include any current or future developed electrical insulator. Non-limiting examples of such electrical insulators may include, but are not limited to, glass isolators, ceramic isolators, Bakelite isolators, resin isolators, epoxy isolators, and similar.

In some implementations, the neutron detector 102 may include one or more isolator feedthrough inserts 126. Beneficially, the one or more isolator feedthrough inserts 126 may be manufactured separate from the neutron detector 102 using a separate process that provides a glass-to-metal or ceramic-to-metal feedthrough assembly process. Such construction permits the formation of a hermetic seal between the one or more isolator feedthrough inserts 126, the isolator 128 and the electrode 116 without requiring the one or more isolator feedthrough inserts 126 be incorporated during the manufacturing process of the neutron detector 102. The one or more isolator feedthrough inserts 126 may be modularly constructed and may contain any number of electrodes 116. The one or more isolator feedthrough inserts 126 may be affixed to the neutron detector 102 via one or more processes such as welding or brazing.

In some implementations, the electrodes 116 may be disposed generally parallel to each other and extending from a first side of the neutron detector 102 to a second side of the neutron detector 102. Other electrode configurations are possible, for example, implementations in which some or all of the electrodes 116 are arranged in a pattern such as a star pattern in which the electrodes 116 are not parallel to each other. In various embodiments, the electrodes 116 may be maintained at the same potential or different potentials. For example, in neutron detectors 102 using a sheet type active material 112, an electrical source 190 may maintain the electrodes 116 at a positive or negative potential measured with respect to the sheet-type active material 112. In some implementations, the electrodes 116 may be maintained at a potential of about +25 volts (V) greater than the active material 112; about +50 V greater than the active material 112; about +75 V greater than the active material 112; about +100 V greater than the active material 112; about +125 V greater than the active material 112; about +150 V greater than the active material 112; or about +200 V greater than the active material 112.

The moderator 150 includes one or more materials capable of reducing an energy level of a fissile neutron 160 to an energy level of a thermal neutron 162. Such reduction in energy level of the fissile neutron 160 occurs within the moderator 150 as the fissile neutron 160 impacts nuclei in the moderator 150. The moderator 150 may include one or more materials that include a minimum of about 30 weight percent hydrogen; about 35 weight percent hydrogen; about 40 weight percent hydrogen; about 45 weight percent hydrogen; about 50 weight percent hydrogen; or about 55 weight percent hydrogen. The moderator 150 may include one or more solids, one or more liquids, and/or one or more compressed gases, or combinations thereof. The use of moderators containing predominantly larger nuclei (e.g., carbon) may disadvantageously cause ricocheting (rather than the preferred slowing) of the incident fissile neutrons 160.

In at least some implementations, all or a portion of the moderator 150 may be disposed between a first neutron detector 102A and a second neutron detector 102B. In some implementations, no air gap or similar void may exist between the moderator 150 and the exterior surface of the top cover 104 and/or the exterior surface of the bottom cover 108 of the neutron detector 102. In some implementations, an air gap or similar void space may exist between the moderator 150 and the exterior surface of the top cover 104 and/or the exterior surface of the bottom cover 108 of the neutron detector 102. In some implementations, one or more hydrogenated gels or similar materials that improve the transport of thermal neutrons 162 from the moderator 150 to the neutron detector may be disposed between the moderator 150 and the exterior surface of the top cover 104 and/or the exterior surface of the bottom cover 108 of the neutron detector 102. In some implementations, one or more gel packs or similar devices containing one or more solid, semisolid, or liquid hydrogenated materials, fluids, gels, or liquids, may be disposed between the first neutron detector 102A and the second neutron detector 102B. In at least one implementation, the moderator 150 may include a solid thermoplastic material such as high-density polyethylene (HDPE).

In some implementations, the thickness of the moderator 150 disposed between the first neutron detector 102A and the second neutron detector 102B may have a constant thickness that is greater than the thickness of either the first neutron detector 102A and/or the second neutron detector 102B. In some implementations, the moderator 150 may have a length and a width that is about the same as the length and the width of the first neutron detector 102A and the second neutron detector 102B. In embodiments, the moderator 150 may have a length that is about 50 centimeters (cm) or more; about 75 cm or more; about 100 cm or more; about 125 cm or more; about 150 cm or more; about 200 cm or more; about 300 cm or more; about 400 cm or more; or about 500 cm or more. In embodiments, the moderator 150 may have a width that is about 50 centimeters (cm) or more; about 75 cm or more; about 100 cm or more; about 125 cm or more; about 150 cm or more; about 200 cm or more; about 300 cm or more; about 400 cm or more; or about 500 cm or more. In embodiments, the moderator 150 may have a thickness that is about 5 centimeters (cm) or less; about 4 cm or less; about 3 cm or less; about 2 cm or less; or about 1 cm or less. In some implementations, the thickness of the moderator 150 may be based in whole or in part on the thickness of either or both neutron detectors 102 adjacent to the moderator 150. In embodiments, the thickness of the moderator 150 may be about 1.0 to about 1.25 times the thickness of the adjacent neutron detector 102; about 1.0 to about 1.5 times the thickness of the adjacent neutron detector 102; about 1.0 to about 1.75 times the thickness of the adjacent neutron detector 102; about 1.0 to about 2.0 times the thickness of the adjacent neutron detector 102; or about 1.0 to about 5.0 times the thickness of the adjacent neutron detector 102. In some implementations, the moderator 150 may include one or more materials having a length and width that both greatly exceed the thickness of the moderator 150.

Figure 2A:
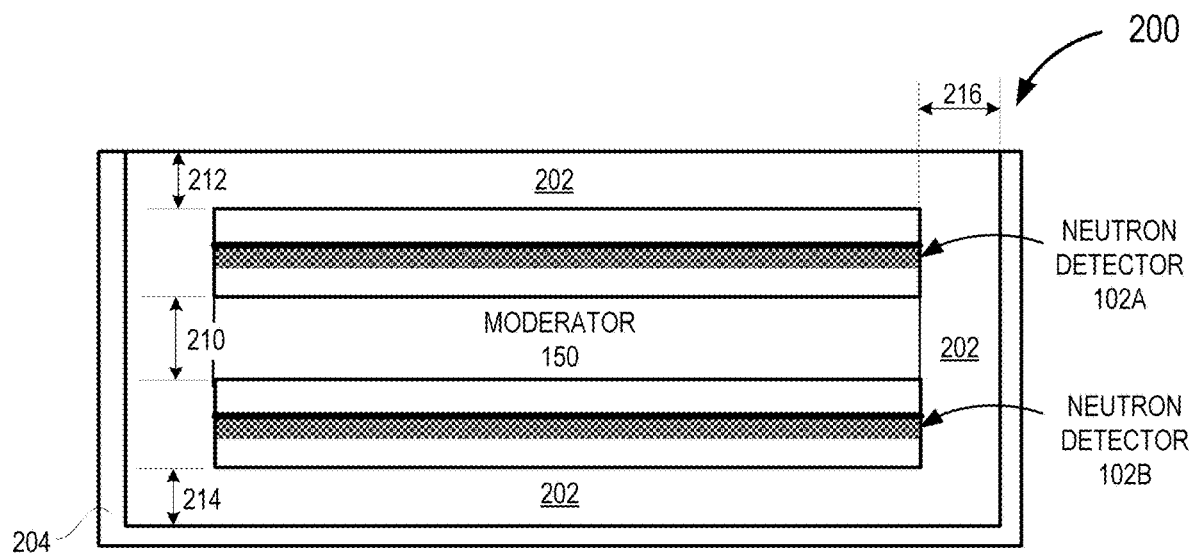
FIG. 2A is a cross-sectional view of an illustrative fissile neutron detector that includes two neutron detectors with an interposed neutron moderator, in accordance with at least one embodiment of the present disclosure.
Figure 2B:
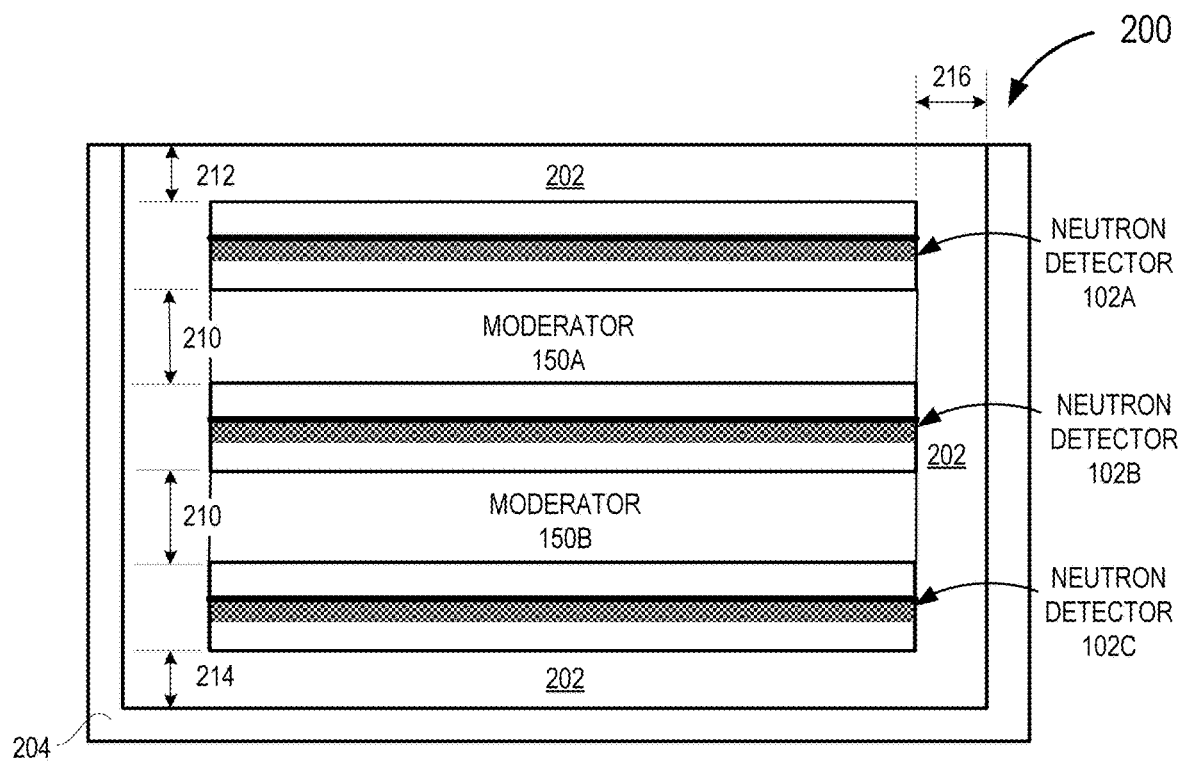
FIG. 2B is a cross-sectional view of an illustrative fissile neutron detector that includes three neutron detectors with interposed neutron moderators, in accordance with at least one embodiment of the present disclosure.

FIG. 2A is a cross-sectional view of an illustrative fissile neutron detector 200 that includes a first neutron detector 102A, a second neutron detector 102B, and a neutron moderator 150 disposed proximate the first neutron detector 102A and the second neutron detector 102B at least partially within a space formed between the first neutron detector 102A and the second neutron detector 102B, in accordance with at least one embodiment of the present disclosure. FIG. 2B is a cross-sectional view of another illustrative fissile neutron detector 200 that includes a first neutron detector 102A, a second neutron detector 102B, and a third neutron detector 102C, in accordance with at least one embodiment of the present disclosure. FIG. 2B depicts a first neutron moderator 150A disposed proximate the first neutron detector 102A and the second neutron detector 102B at least partially within a space formed between the first neutron detector 102A and the second neutron detector 102B and a second neutron moderator 150B disposed proximate the second neutron detector 102B and the third neutron detector 102C at least partially within a space formed between the second neutron detector 102B and the third neutron detector 102C.

As depicted in FIGS. 2A and 2B, the neutron detectors 102 and the neutron moderator(s) 150 may be at least partially enclosed by an external neutron moderator 202. In some implementations a housing or shell 204 may be disposed about all or a portion of the external neutron moderator 202. The thickness of the external moderator 202 may be the same or different in various areas of the neutron detectors 102. For example, the external neutron moderator 202 may have a first thickness 212 proximate at least a portion of the first neutron detector 102A (e.g., on the "top" or exposed portion of the fissile neutron detection system 200) and a second thickness 214 proximate at least a portion of the second neutron detector 102B (FIG. 2A) or third neutron detector 102C (FIG. 2B)—e.g., on the "bottom" or the portion of the fissile neutron detection system 200. In addition, the external neutron moderator 202 may have a third thickness 216 proximate the sides of the neutron detectors 102.

The external moderator 202 includes one or more materials capable of reducing an energy level of an incident fissile neutron 160. Such reduction in energy level of the incident fissile neutron 160 occurs within the external moderator 202 as the fissile neutron 160 impacts hydrogen nuclei in the material forming the external moderator 202. The external moderator 202 may include one or more materials that include a minimum of about 30 weight percent hydrogen; about 35 weight percent hydrogen; about 40 weight percent hydrogen; about 45 weight percent hydrogen; about 50 weight percent hydrogen; or about 55 weight percent hydrogen. The external moderator 202 may include one or more solids, one or more liquids, and/or one or more compressed gases, or combinations thereof. In some instances, the external moderator 202 may include one or more materials, such as one or more heavier molecular weight compounds, that cause the incident fissile neutrons 160 to enter or focus the incident fissile neutrons 160 on the neutron detectors 102 included in the fissile neutron detection system 200. In at least some implementations, the external moderator 202 may partially or completely include a hydrogen-containing, solid, thermoplastic, material such as high-density polyethylene (HDPE).

In implementations, the first thickness 212, the second thickness 214, and the third thickness 216 of the external moderator 202 may be the same or different. The external moderator 202 may have a first thickness 212 of about 1 centimeter (cm) or less; about 2 cm or less; about 3 cm or less; about 5 cm or less; about 7 cm or less; or about 10 cm or less. The external moderator 202 may have a second thickness 214 of about 1 centimeter (cm) or less; about 2 cm or less; about 3 cm or less; about 5 cm or less; about 7 cm or less; or about 10 cm or less. The external moderator 202 may have a third thickness 216 of about 1 centimeter (cm) or less; about 2 cm or less; about 3 cm or less; about 5 cm or less; about 7 cm or less; or about 10 cm or less.

In at least some implementations, all or a portion of the external moderator 202 may be disposed proximate the neutron detectors 102 forming the fissile neutron detection system 200. In some implementations, no air gap or similar void may exist between the external moderator 202 and the exterior surface of the neutron detectors 102 forming the fissile neutron detection system 200. In some implementations, an air gap or similar void space may exist between the external moderator 202 and the exterior surface of the neutron detectors 102. In some implementations, one or more hydrogenated gels or similar materials that improve the transport of fissile neutrons 160 and/or thermal neutrons 162 from the external moderator 202 to the neutron detectors 102 in the fissile neutron detection system 200 may be disposed between the external moderator 202 and the exterior surfaces of the neutron detectors 102.

As depicted in FIGS. 2A and 2B, each of the neutron detectors 102 is separated by a neutron moderator 150 having a thickness 210. In some implementations, each of the neutron detectors 102 may be separated by a neutron moderator 150 having a constant thickness 210. In some implementations, each of the neutron detectors 102 may be separated by a neutron moderator 150 having a variable thickness 210. In some implementations that include a plurality of neutron moderators 150A-150$n$ (e.g., FIG. 2B), each of the neutron moderators 150 may have the same or a different constant thickness 210. In some implementations that include a plurality of neutron moderators 150A-150$n$ (e.g., FIG. 2B), each of the neutron moderators 150 may have the same or a different variable thickness 210.

Figure 3:
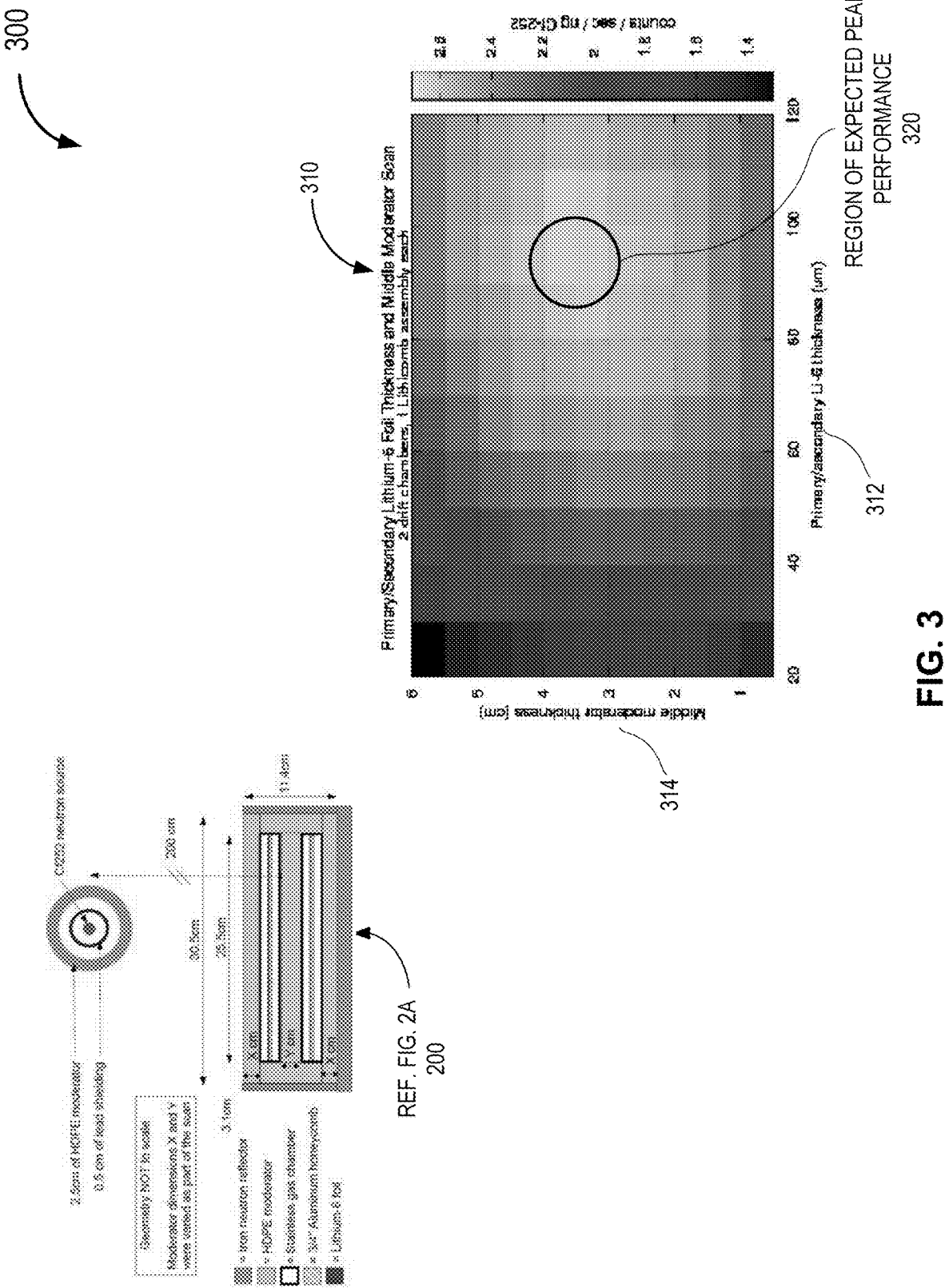
FIG. 3 is a chart depicting neutron detector performance as a function of operation parameters for an illustrative fissile neutron detector having two neutron detectors separated by an interposed moderator such as depicted in FIG. 2A, in accordance with at least one embodiment of the present disclosure.

FIG. 3 depicts a hypothetical performance 300 of an illustrative fissile neutron detection system 200 such as depicted and described in detail with regard to FIG. 2A in which a first neutron detector 102A and a second neutron detector 102B are separated by a neutron moderator 150, in accordance with at least one embodiment of the present disclosure. As depicted in FIG. 3, each of the neutron detectors 102 may include a stainless steel, hermetically sealed, chamber 105 that may have a thickness (i.e., a sidewall 120 height) of from about 1.5 centimeters (cm) to about 2.5 cm. Simulations were performed for various $^6$Li active material 112 sheet thicknesses and neutron moderator 150 thicknesses. Chart 310 shows the capture performance of the two neutron detector fissile neutron detection system 200 depicted in FIG. 2A as a density or color plot of $^6$Li active material sheet thickness 312 along the x-axis versus neutron moderator thickness 314 along the y-axis. In this embodiment, capture performance peaks in the region of 320, at a $^6$Li active material sheet thickness of from about 80 micrometers (μm) to about 100 μm in combination with a neutron moderator thickness of from about 3 centimeters (cm) to about 4 cm.

Figure 4:
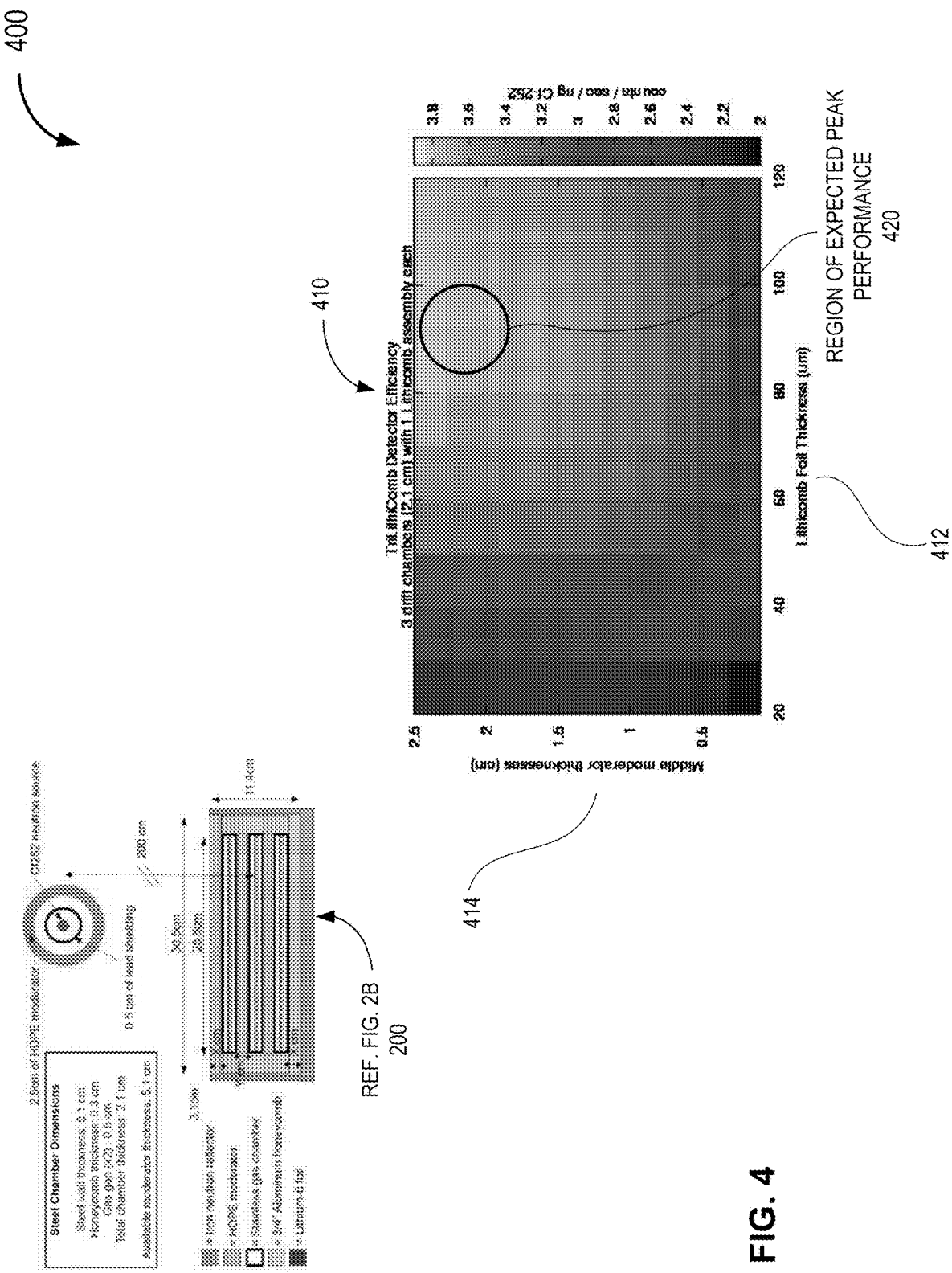
FIG. 4 is a chart depicting neutron detector performance as a function of operation parameters for an illustrative fissile neutron detector having three neutron detectors separated by interposed moderators such as depicted in FIG. 2B, in accordance with at least one embodiment of the present disclosure.

FIG. 4 depicts a hypothetical performance 400 of an illustrative fissile neutron detection system 200 such as depicted and described in detail with regard to FIG. 2B in which a first neutron detector 102A, a second neutron detector 102B, and a third neutron detector 102C are separated by respective neutron moderators 150A and 150B, in accordance with at least one embodiment of the present disclosure. As depicted in FIG. 4, each of the neutron detectors 102 may include a stainless steel, hermetically sealed, chamber 105 that may have a thickness (i.e., a sidewall 120 height) of from about 1.5 centimeters (cm) to about 2.5 cm. Simulations were performed for various $^6$Li active material 112 sheet thicknesses and neutron moderator 150 thicknesses. Chart 410 shows the capture performance of the two neutron detector fissile neutron detection system 200 depicted in FIG. 2B as a density or color plot of $^6$Li active material sheet thickness 412 along the x-axis versus neutron moderator thickness 414 along the y-axis. In this embodiment, capture performance peaks in the region of 420, at a $^6$Li active material sheet thickness of from about 80 micrometers (μm) to about 100 μm in combination with a neutron moderator thickness of from about 1.5 centimeters (cm) to about 2.5 cm.

Figure 5:
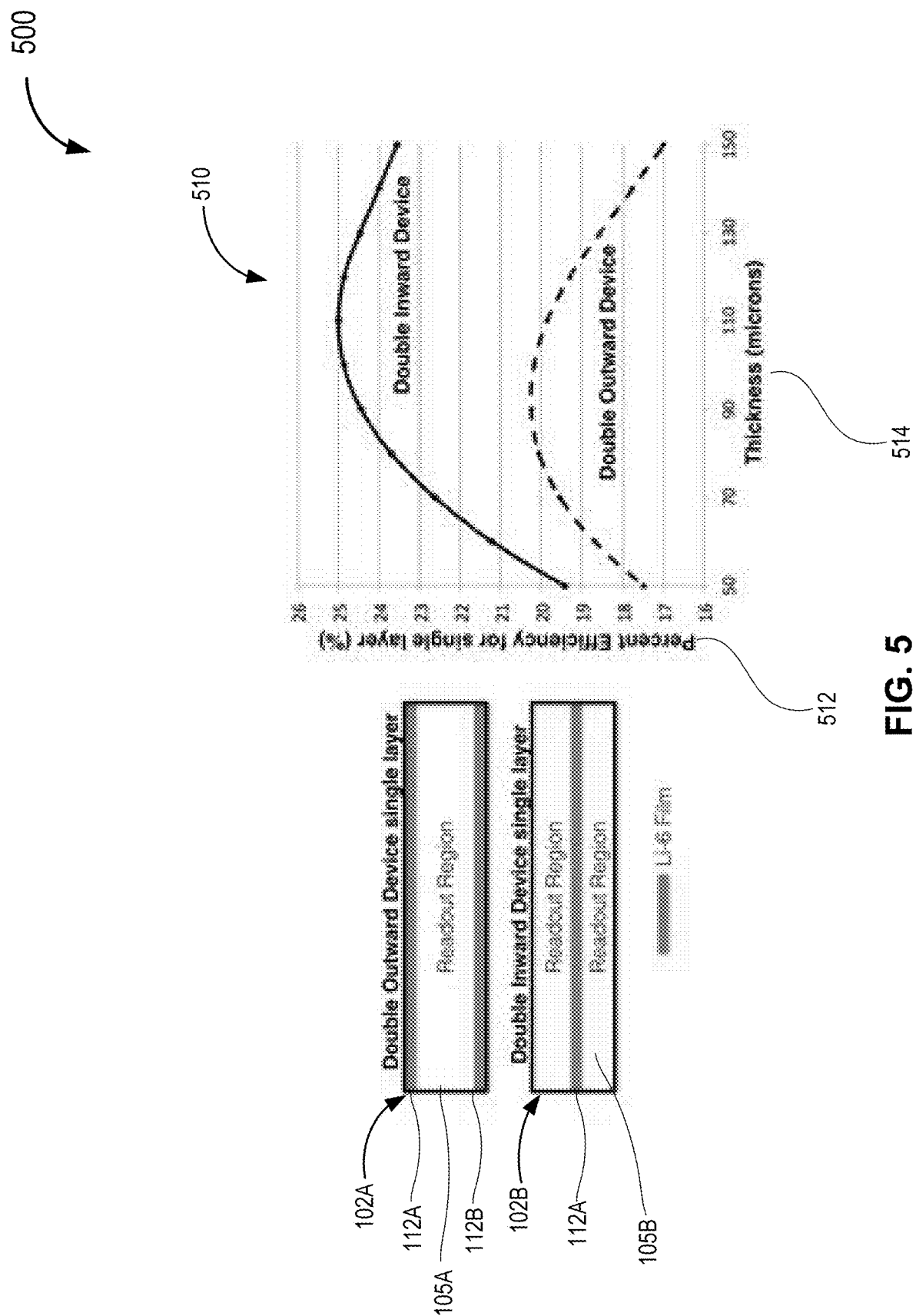
FIG. 5 is a chart depicting neutron detector performance as a function of detection sheet placement within the detector, in accordance with at least one embodiment of the present disclosure.

FIG. 5 is an illustrative chart 500 depicting the comparative performance of a first neutron detector 102A that includes a first $^6$Li active layer 112A disposed on an interior surface of the top cover 104 and a second $^6$Li active layer 112B disposed on an interior surface of the bottom cover 104 of the neutron detector 102A against a second neutron detector 102B that includes a first $^6$Li active layer 112A disposed at an intermediate point in the chamber 105 of the second neutron detector 102B, in accordance with at least one embodiment of the present disclosure. As depicted in FIG. 5, only those tritons 168 emitted from the lower surface of the first $^6$Li active layer 112A and those tritons 168 emitted from the upper surface of the second $^6$Li active layer 112B will enter the chamber 105A of the first neutron detector 102A. In contrast, tritons 168 emitted from the upper surface and the lower surface of the $^6$Li active layer 112A will enter the chamber 105B of the second neutron detector 102B.

Advantageously, devices that read daughter particles such as tritons 168 emitted by both sides of the $^6$Li active layer 112 may use less lithium per measure of intrinsic efficiency as compared to detectors with single-sided particle detection, and thus may provide a beneficial cost advantage. Chart 510 depicts efficiency 512 for a single layer of active material 112 versus a double layer of active material 112 (along the y-axis) against active layer thickness 514 (along the x-axis). As depicted in chart 510, the efficiency to detect thermal neutrons for a double outward neutron detector 102A that uses two layers of active material 112A and 112B is about 20%, whereas a double inward neutron detector 102B that uses only a single layer of active material 112A, and consumes about 50% less 6Li than the double outward neutron detector 102A, reaches about 25% efficiency. However, the increase in efficiency of the double inward neutron detector 102B is offset by the added construction complexity and cost of dual electrodes (one electrode on each side of the layer of active material 112) as well as a loss in operational ruggedness.

Figure 6A:
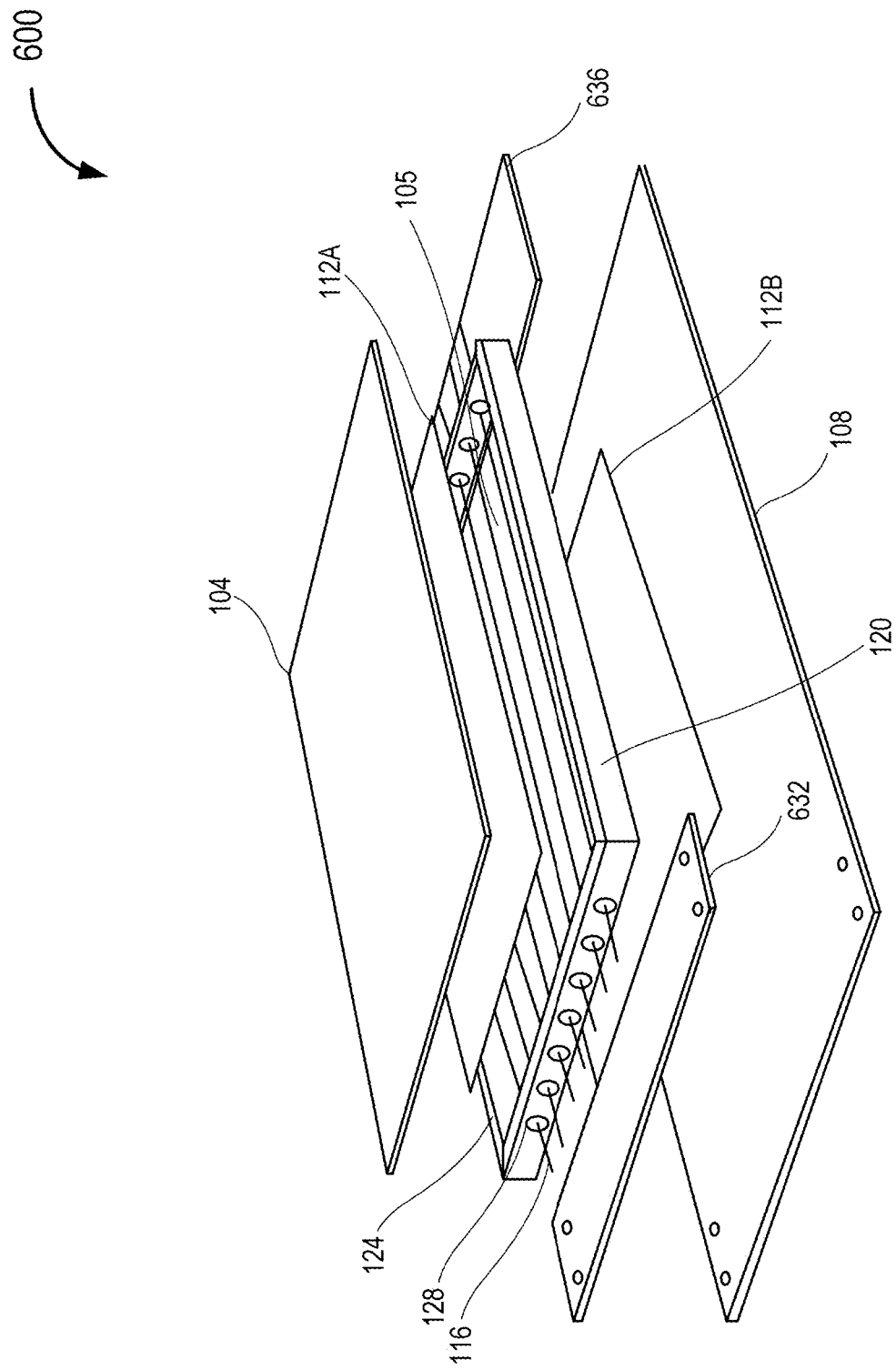
FIG. 6A is a perspective exploded view of an illustrative neutron detector, in accordance with at least one embodiment of the present disclosure.
Figure 6B:
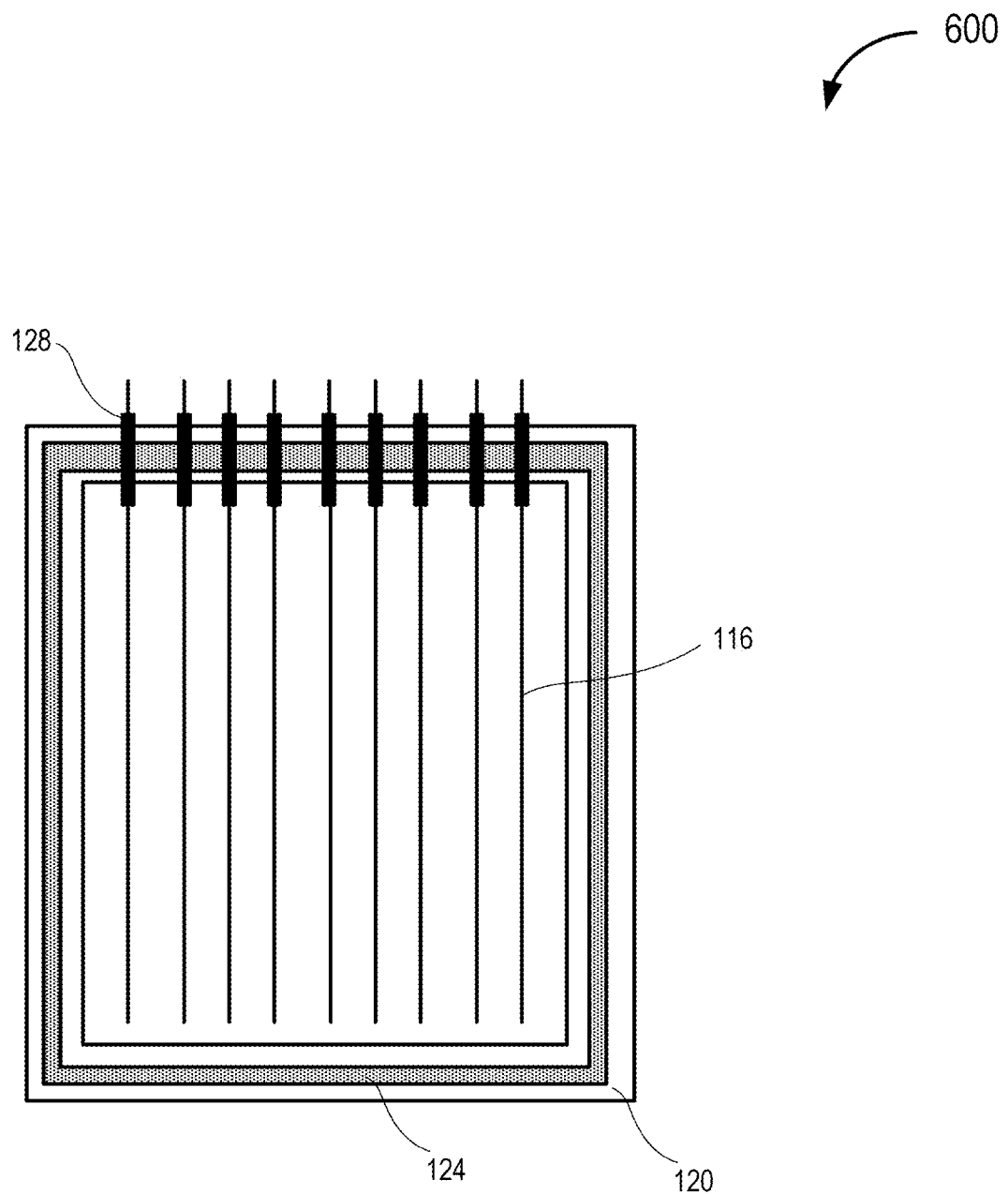
FIG. 6B is a cut away plan view of the illustrative neutron detector depicted in FIG. 6A, in accordance with at least one embodiment of the present disclosure.

FIGS. 6A, 6B, 6C, and 6D depict an illustrative neutron detector 600 suitable for use with the fissile neutron detection system 100 depicted in FIGS. 1A-1E, in accordance with one or more embodiments described herein. The neutron detector 600 may include a top cover 104, a bottom cover 108, lithium-6 ($^6$Li) foils 112A and 112B, a number of electrodes 116 (collectively "electrodes 616"), a sidewall 120, a seal 124, isolators 128, front electronics board 632, and back electronics board 636. The front electronics board 632 and back electronics board 636 may include communicably coupled readout electronics or similar devices. A first $^6$Li foil 112A may be disposed proximate the top cover 104 and a second $^6$Li foil 112B may be disposed proximate the bottom cover 108. The top cover 104 and the bottom cover 108 may be attached or otherwise disposed proximate to the sidewalls 120 as shown in FIG. 6A to form a chamber 105 that may, in operation, contain a readout gas. The seal 124 provides a seal between the top cover 104, sidewalls 120, and bottom cover 108 that may greatly reduce or even prevent the readout gas from escaping from the chamber 105. The seal 124 may also greatly reduce or prevent the entry of gases or fluids external to the chamber 105 from entering the chamber 105. The electrodes 116 are fed through isolators 128 that may be located on a front and back side of the sidewalls 120. The electrodes 116 may be electrically conductively coupled to the front electronics board 632 and may be conductively coupled to the back electronics board 636. The readout electronics may provide a voltage bias between the electrodes 116 and the $^6$Li foils 112A and 112B. In some embodiments, each of the $^6$Li foils 112A and 112B may have a thickness of about 20 micrometers (μm) or less; about 50 μm or less; about 75 μm or less; about 100 μm or less; about 125 μm or less; or about 150 μm or less. Additionally, the readout electronics may decouple the signals received from the electrodes 116, may amplify the signals received from the electrodes 116, and host post-digitization and further computer and wireless interfacing to share information relating to the collected signals with one or more user applications.

Upon exposure to fissile material such as plutonium and highly enriched uranium (HEU), neutrons and gamma rays may impinge upon the fissile neutron detector system 100. Neutrons impinging the fissile neutron detector system 100 may pass through one or more external moderators 202 and/or one or more neutron moderators 150 prior to impinging on the top plate 104 or the bottom plate 108 of the neutron detector 600. The external moderator 202 and/or the neutron moderators 150 may reduce the energy level of the incident fissile neutron 160 (e.g., 100 keV to 10 MeV) to the energy level of a thermal neutron 162 (e.g., 0.025 eV). The thermal neutron 162 may be captured by one of the $^6$Li atoms in the $^6$Li foils 112A and 112B. The capture of the thermal neutron by the $^6$Li atom results in a lithium 7 atom that decays into two daughter particles, an alpha particle 166 and a triton 168. The triton 168 and alpha particle 166 travel in opposite directions, and dissipate energy as they travel through the $^6$Li foil 112A and 112B.

Upon exiting the $^6$Li foil, the triton 168 and/or the alpha particle 166 may have sufficient kinetic energy to ionize atoms present in the readout gas within the chamber 105. Electrons 172 liberated during the ionization of readout gas may drift in the direction of the electrodes 116 and the ions produced during the ionization of readout gas atoms may drift in the direction of the $^6$Li foils 112A and 112B.

Electrons 172 that drift within a predetermined distance of roughly 5 times the radius of the electrode 116 (i.e., the Townsend avalanche region) may encounter an electric field that accelerates the electrons 172 at a rate sufficient to cause further ionization of the readout gas. The further ionization of the readout gas liberates additional electrons 172, which may drift toward the electrodes 116 and cause even further ionization of the readout gas. This process that occurs within the Townsend avalanche region 176 is called gas multiplication. Ionized readout gas atoms within the Townsend avalanche region that move towards the $^6$Li foils 112A and 112B cause a movement of charge along the electrode 116.

The charge moving along the electrode 116 is collected by the readout electronics 140 and amplified with a pulse-mode, charge-sensitive preamplifier to produce a voltage output signal 192. Pulse height discrimination circuitry included with in the readout electronics 140 then compares the voltage output signal to a first predetermined threshold and determines if a fissile neutron event has been detected (e.g., for a gas multiplication of roughly 100, and an amplification circuitry gain of 1fC/mV, pulse heights greater than 250 keV may indicate the occurrence of a fissile neutron event). In some embodiments, the false positive detection rate of fissile neutrons 160 based on the first predetermined threshold may be less than $1\times10^{-5}$ for a gamma ray exposure rate of 100 mR/hr. A second predetermined threshold, lower than the first predetermined threshold, may also be established. Voltage output signals below the second predetermined threshold may be deemed attributable to very low ionizing gamma ray events or movements of charge in the neutron detector 600 induced by one or more other sources (e.g., thermal heat, radio frequency electromagnetic radiation, and changes in the relative position of the electrodes 116 and the $^6$Li foils 112A and 112B. Voltage output signals below the first predetermined threshold and above the second predetermined threshold are indicative of gamma ray events. The detected rate of fissile neutrons 160 and gamma rays impinging upon the detector can be used in radiation detection methodologies (e.g., to detect the presence of plutonium or highly enriched uranium).

The composition of the readout gas may advantageously remain relatively constant over time to avoid deterioration of the gamma ray and neutron detection process. Changes greater than 1% in the composition of the readout gas can affect the Townsend avalanche process. For example, nitrogen, oxygen, or water molecules that leak into the chamber do not ionize as well as the argon gas in the amplification region near the electrodes 116, and therefore may reduce the Townsend avalanche process near the electrodes 116 when introduced into the readout gas. This reduces the ability of the readout electronics to distinguish between noise, gamma ray, and fissile neutron events, thereby decreasing the efficiency of the neutron detector 600.

In some embodiments, the seal 124 can be formed from one or more elastomeric materials, such as polyisobutylene, to maintain the readout gas composition within the chamber 105 over extended periods of time (e.g., 30 years). The seal 124 can conform to the region between the top cover 104 or bottom cover 108 and the sidewalls 120, filling any gaps due to imperfections in the surface quality of the top cover 104, the bottom cover 108, and the sidewalls 120. In some embodiments, the surface quality of the top cover 104, bottom cover 108, and sidewalls 120 may be selected to generate uniform electric fields near the electrodes 116 of the neutron detector 600, with no regard for sealing of the top cover 104, bottom cover 108, and sidewalls 120, since the elastomeric nature of the seal 124 can accommodate such fluctuations.

Figure 7A:
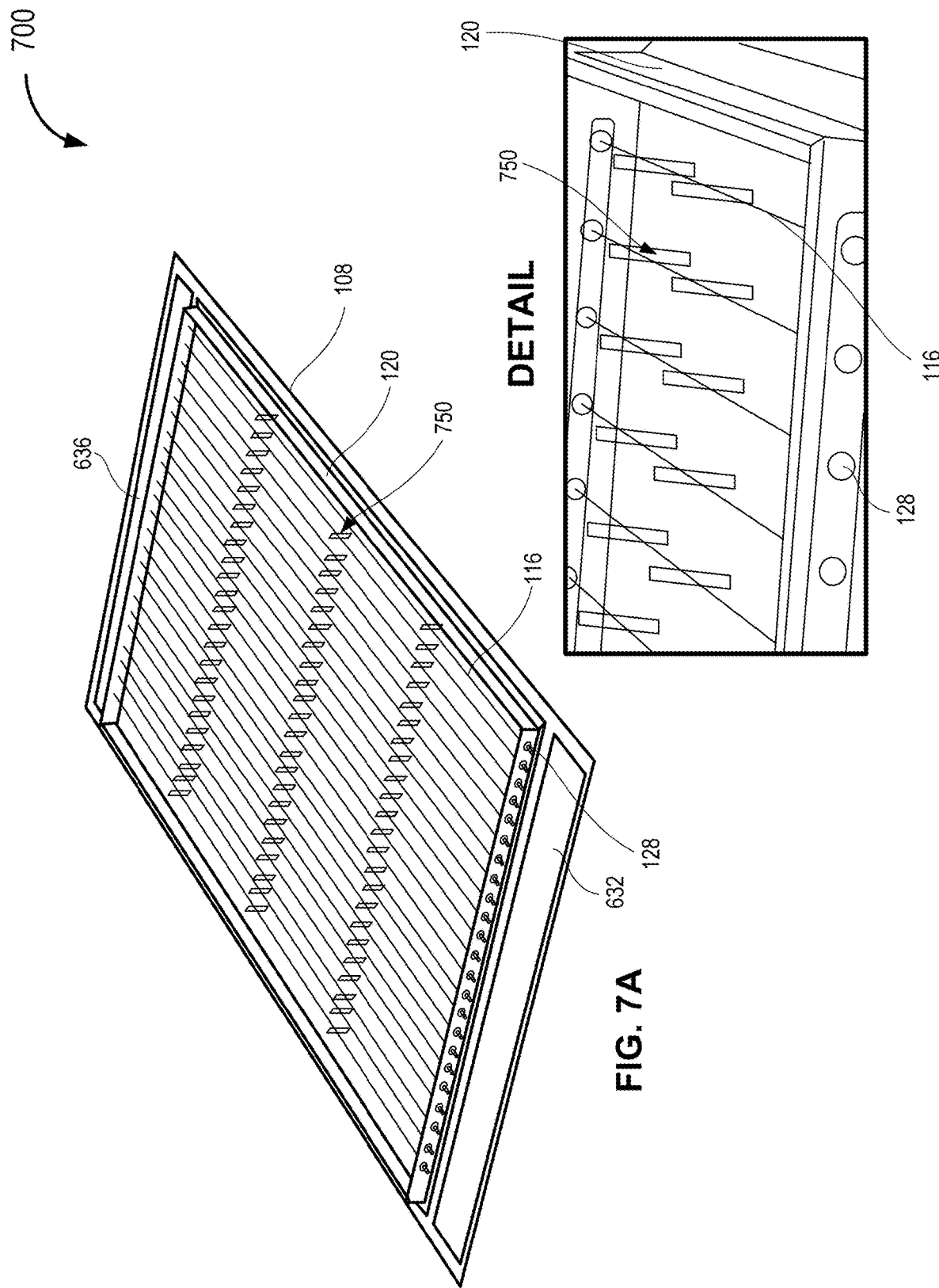
FIG. 7A is a perspective view of an illustrative neutron detector having a number of detector electrodes, in accordance with at least one embodiment of the present disclosure.
Figure 7B:
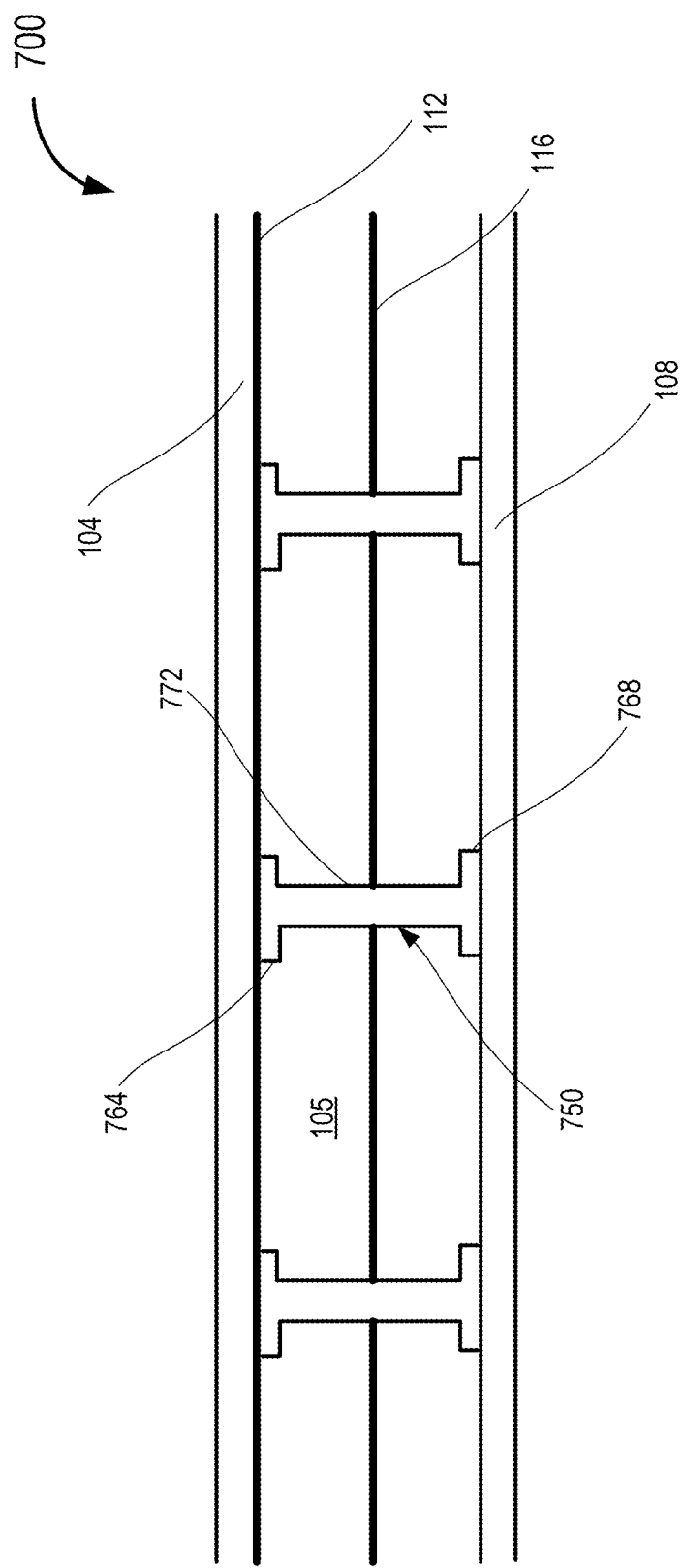
FIG. 7B is a partial elevation view of a neutron detector electrode that may be used in the illustrative neutron detector depicted in FIG. 7A, in accordance with at least one embodiment of the present disclosure.

FIGS. 7A and 7B depict another illustrative neutron detector 700 suitable for use with the fissile neutron detection system 100 depicted in FIGS. 1A-1E, in accordance with one or more embodiments described herein. The neutron detector 700 includes similar elements as the neutron detector 600 depicted in FIGS. 6A-6D. The neutron detector 700 may include an array of elongated structural members 750. The elongated structural members 750 may include a top side 764, a bottom side 768, and a web 772. In embodiments, the elongated structural members 750 may extend between the top cover 104 and the bottom cover 108. In some embodiments, the elongated structural members 750 may provide structural support that may reduce undesirable mechanical vibrations within the neutron detector 700. For example, a tungsten wire electrode 116 having a length of about 100 centimeters (cm) and a diameter of about 30 micrometer (μm), placed under approximately 250 g of tension has a first vibrational frequency of about 200 Hz, which corresponds to significant vibrations typically generated by motor vehicles. Placing a single structural support 750 near the middle of the tungsten wire electrode 116, increases the first vibrational frequency to about 420 Hz, thereby reducing vibrations induced by vehicular movement by a factor of 100 or more. Reducing vibrations in radiation detectors with surface areas greater than 1000 square centimeters ($cm^2$) is advantageous because as the surface area of the neutron detector 700 and the length of the electrodes 116 is increased, the increased dimensions can lead to vibrations that may cause changes in the relative position of the electrodes 116 and/or the active materials 112 disposed in the chamber 105. Relative changes in position between the electrodes 116 and the active materials 112 can cause movement of charge within the fissile neutron detection system 100. Such charge displacement within the fissile neutron detection system 100 may generate voltage output signals 192 that are indistinguishable from gamma ray or neutron signals.

The elongated structural members 750 can reduce mechanical vibrations of the top cover 104 and the bottom cover 108 by providing a mechanical connection therebetween. For example, adding an elongated structural support 750 at the center of a 1 square meter ($m^2$) neutron detector 750 may increases the resonance frequency of the electrodes 116 in the neutron detector 700 by a factor of two or greater and may reduce the amplitude of the vibrations by a factor of two compared to when the top cover 104 and/or bottom cover 108 are supported only at the edges by the sidewall 120. The shape of the elongated structural members 750 may be selected to minimize vibrations between the top cover 104 and the bottom cover 108 (e.g., the cross section of the elongate structural members 250 can be a "T", an "I", an "L", an "X", or a "C"). In some embodiments, the cross section of the elongated structural members 750 may be rectangular.

In embodiments, each of the electrodes 116 may pass through a slot or similar aperture that penetrates at least a portion of the elongated structural member 750 to reduce the vibration of the electrodes 116. The slots or apertures can provide mechanical support for the electrodes 116. In some embodiments, the slot or aperture may be located near a side or edge of the elongated structural member 750. An electrode 116 traversing the chamber 105 can pass through multiple slots or apertures. The elongated structural members 750 may be positioned within the chamber 105 such that the slots or apertures alternate sides of the elongated structural members 750 as the electrode 116 traverses the chamber 105. For example, the electrode 116 may pass through a first slot located on the right side of a first elongated structural member 750A, a second slot located on the left side of a second elongated structural member 750B, and a third slot located on the left side of a third elongated structural member 750C. In some embodiments, some or all of the elongated structural members 250 may be fabricated using an electrically non-conductive material. In some embodiments, the slot or aperture may be positioned to provide an upward or downward lateral force on the electrode 116. In some embodiments, the electrodes 116 may be supported by a structural member that attaches to the top cover 104 or the bottom cover 108, but not both. In some embodiments, the elongated structural members 750 may contact the top cover 104 and the bottom cover 108 but do not include a slot or aperture and are displaced from the electrodes 116 so as to not cause a mechanical interference.

Figure 8:
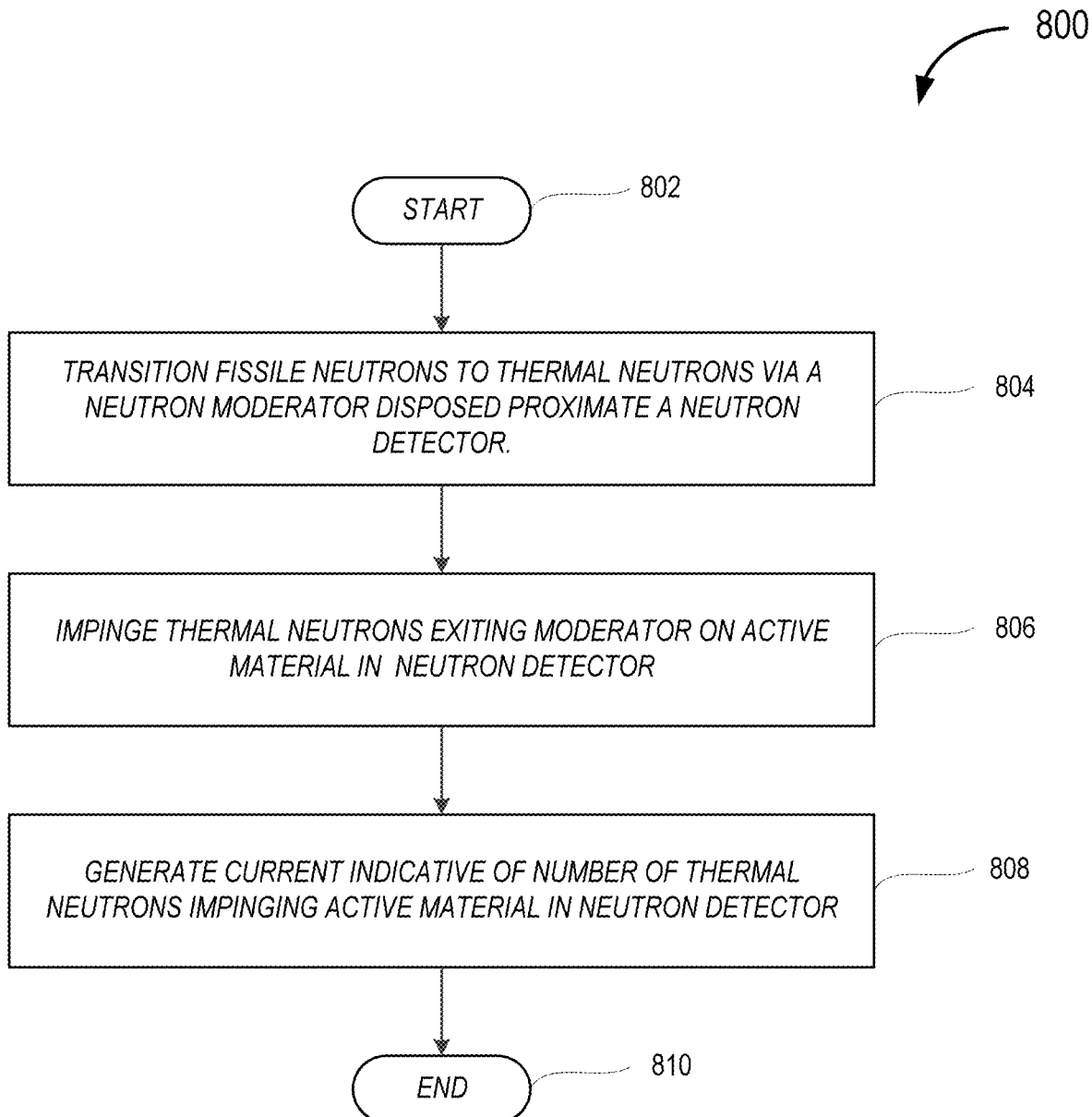
FIG. 8 is a high-level flow diagram of a method of detecting fissile neutrons using a fissile neutron detector, in accordance with at least one embodiment of the present disclosure.

FIG. 8 is a high-level flow diagram of a method 800 for detecting fissile neutrons 160 using a fissile neutron detector 100 that includes at least one neutron detector 102, and at least one neutron moderator 150 disposed proximate the at least one neutron detector 102, in accordance with at least one embodiment of the present disclosure. High-energy fissile neutrons such as those emitted by plutonium and highly enriched uranium (HEU) provide a tell-tale indicator of the presence of such materials. Fissile neutrons can have energy levels that exceed 100 keV. At such energy levels, a large percentage of fissile neutrons may pass undetected through the active material 112 typically found in neutron detectors 102, 600, and 700. The presence of a neutron moderator, such as the neutron moderator 150, can beneficially reduce the energy level of fissile neutrons to the energy level of thermal neutrons, about 0.025 eV. Such a reduction in energy level may be at least partially attributable to collisions between the fissile neutrons 160 and hydrogen nuclei in the moderator 150. Consequently, moderators having a high percentage of hydrogen by weight may be preferable. Thermal neutrons 162 may impact the active material 112, causing the spontaneous formation of charge-carrying daughter particles, such as alpha-particles 166 and tritons 168. The triton 168 can ionize a gas within the chamber 105 of the neutron detector 102, 600, 700. The presence of the ionized gas and dissociated electrons 172 within the chamber 105 can induce a current flow on an electrode in the chamber that is maintained at a potential. The current flow may be proportional to the number or rate at which fissile neutrons 160 are impacting the active material 112 within the chamber 105. The method 800 commences at 802.

At 804, the energy level of at least a portion of the fissile neutrons 160 incident upon the fissile neutron detection system 100 is reduced to the energy level of a thermal neutron 162. In some implementations, this reduction in energy level is accomplished using the at least one neutron moderator 150. Such neutron moderators 150 may include a number of interstitial neutron moderators 150 that are positioned proximate a first neutron detector 102A and second neutron detector 102B and within a space formed between the between the first neutron detector 102A and second neutron detector 102B. Such neutron moderators 150 may include one or more neutron moderators 150 having an exterior surface and in which at least a portion of the exterior surface is disposed proximate the at least one neutron detector 102. Such neutron moderators may additionally or alternatively include one or more external neutron moderators 202 positioned proximate an exterior surface of the first neutron detector 102A, the second neutron detector 102B, and/or the intermediate neutron detectors 150A-150n.

The one or more neutron moderators 150 reduce the energy level of the incident fissile neutrons 160 may include one or more solids, liquids, and/or compressed gases capable of reducing the energy level of at least some of the incident thermal neutrons 160. In some implementations, the one or more neutron moderators 150 may include materials, compounds, or substances having a significant hydrogen concentration—greater than about 30 weight percent hydrogen; greater than about 40 weight percent hydrogen; greater than about 50 weight percent hydrogen; or greater than about 60 weight percent hydrogen. It is believed the impact between the incident fissile neutrons 160 and the hydrogen nuclei within the one or more neutron moderators 150 may reduce the energy level of the incident fissile neutron 160 to that of a thermal neutron 162 which then exits the one or more neutron moderators 150.

Due to the random nature of the collisions within the one or more neutron moderators, a portion of the incident fissile neutrons 160 may flow as neutrons having an energy level at or above that of a thermal neutron 162 from the one or more neutron moderators 150 in a direction that precludes impingement on a neutron detector 102, 600, 700 disposed proximate at least a portion of the exterior surface of the neutron moderator 150. For example, an incident fissile neutron 160 may flow from the "side" or "edge" of the one or more neutron moderators 150 in a direction along a vector pointing away from a neutron detector 102, 600, 700 that is proximate at least a portion of the surface of the one or more neutron moderators 150. The geometry of the fissile neutron detection system 100, the geometry and composition of the neutron moderator 150, the geometry and composition of the external neutron moderator 202, and the construction and geometry of the neutron detector 102, 600, 700 all play a role in determining the capture rate of incident fissile neutrons 160. For example, planar neutron detectors such as the neutron detector 102 depicted in FIGS. 1A-1E, the neutron detector 600 depicted in FIGS. 6A-6D, and the neutron detector 700 depicted in FIGS. 7A-7B all present a significantly increased cross-sectional (or fissile neutron capture) area which provides a marked advantage and improvement in fissile neutron detection performance and accuracy over straw-type neutron detectors in which detector "straws" may be positioned within a block of neutron moderator.

In some implementations, the physical configuration of the one or more neutron moderators 150 and the one or more neutron detectors 102, 600, 700 may be such at a minimum of about 50% or more; about 55% or more; about 60% or more; about 65% or more; about 70% or more; about 75% or more; about 80% or more; about 85% or more; or about 90% or more of the thermal neutrons 162 exiting the one or more neutron moderators 150 impinge upon, strike, or otherwise enter the one or more neutron detectors 102, 600, 700.

At 806, at least some of the thermal neutrons 162 exiting the one or more neutron moderators 150 may pass through the top cover 104 or bottom cover 108 of the first neutron detector 102A and enter the chamber 105A or pass through the top cover 104 or bottom cover 108 of the second neutron detector 102B and enter the chamber 105B. Once inside of the chamber 105, the thermal neutron 162 may impinge on one or more active materials 112 disposed therein. An active material 112 may include any substance, isotope, element, compound, or mixture capable of generating charge-carrying particles upon exposure to thermal neutrons 162. Non-limiting examples of such active materials include, but are not limited to, lithium-6 ($^6$Li); boron-10 ($^{10}$B); and helium-3 ($^3$He). Such active materials 112 may be present in the chamber 105 in one or more forms. For example, in some implementations $^6$Li in the form of thin (50 µm to 150 µm) sheets may provide all or a portion of the active material 112 that are disposed either at one or more intermediate points (e.g., neutron detector 102) or proximate one or more interior surfaces (e.g., neutron detector 600) of the chamber 105. In some implementations, $^{10}$B in the form of a thin layer disposed on at least a portion of the interior surface of the chamber 105 may provide all or a portion of the active material 112. In some implementations, $^3$He in the form of a gas disposed in the chamber 105 may provide all or a portion of the active material 112.

The charge-carrying particle(s) emitted by the active material 112 in response to the impact of the thermal neutron 162 may travel into the readout gas 170 disposed within the chamber 105. The charge-carrying particles, such as a triton 168, may ionize a portion of the readout gas 170, creating a positively charged readout gas ion and an electron 172.

At 808, the neutron detector 102, 600, 700, in response to the charged particles generated by the impact of the thermal neutron 162 on the active material 112, generates a current indicative of a number of thermal neutrons 162 that impact the active material 112 or a rate at which thermal neutrons 162 impact the active material 112 in the respective neutron detector 102, 600, 700. The method 800 concludes at 810.

Figure 9:
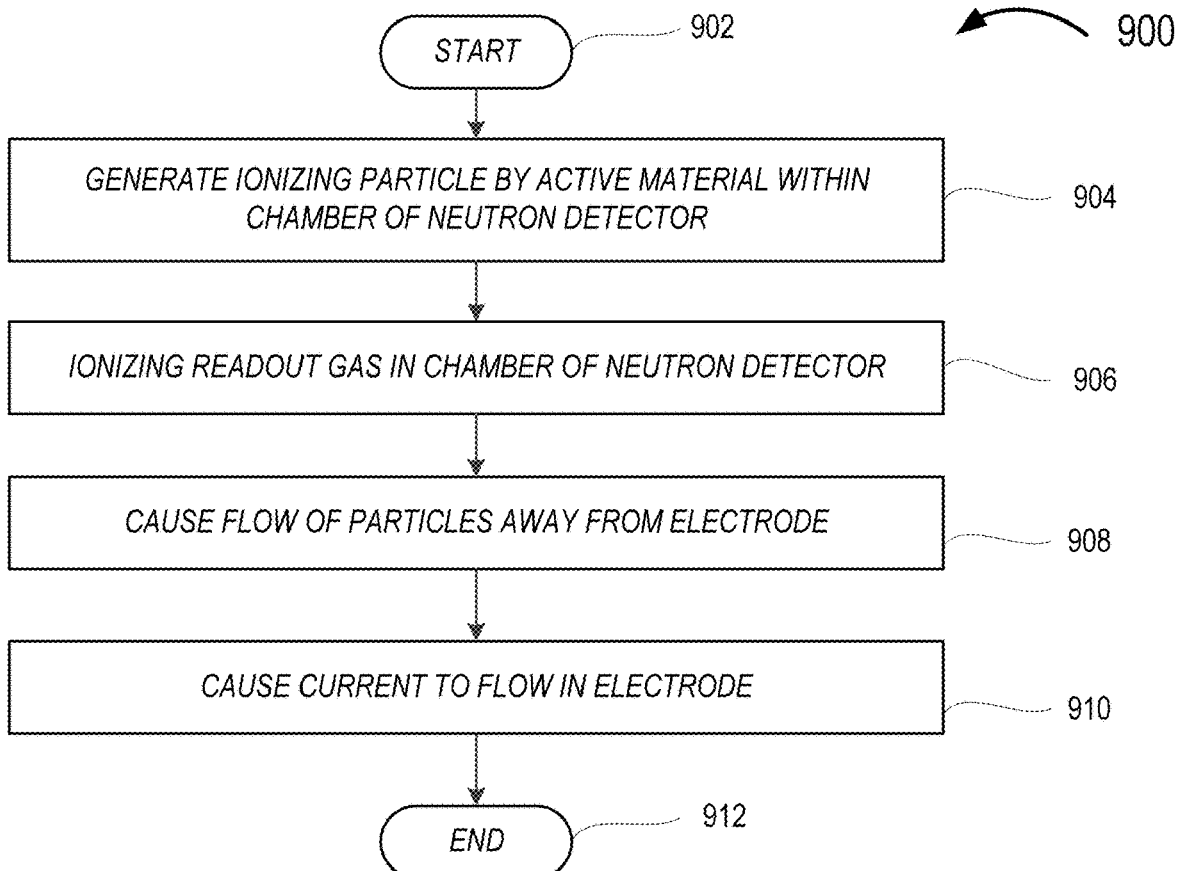
FIG. 9 is a high-level flow diagram of a method of detecting fissile neutrons using a fissile neutron detector that includes at least one active material in the form of a solid sheet or layer, in accordance with at least one embodiment of the present disclosure.

FIG. 9 is a high-level flow diagram of a method 900 for generating a current in a neutron detector 102, 600, 700 in response to the impact of the thermal neutron 162 on an active material such as $^6$Li or $^{10}$B disposed in the chamber 105 of the neutron detector 102, 600, 700, in accordance with at least one embodiment of the present disclosure. The interaction of the charged particles, such as the triton 168, generated by the impact of the thermal neutron 162 on the active material 112, with a readout gas 170 disposed in the chamber 105 can cause a current to flow on an electrode 116 placed in the chamber 105. The electrode 116 may be maintained at a potential that differs from the potential of the active material 112. The method 900 commences at 902.

At 904, one or more charged particles may be generated by the capture of the thermal neutron 162 by the active material 112. In implementations using $^6$Li, these charged particles may include an alpha-particle 166 (two protons and two neutrons) and a triton 168 (one proton and two neutrons). In implementations, the triton 168 may travel a distance of up to 135 µm through a $^6$Li sheet of active material 112. Thus, within neutron detectors 102, 600, 700 using a $^6$Li active materials, the thickness of a $^6$Li sheet of active material 112 may be maintained at less than 135 µm to increase the probability that the triton 168 will escape the active sheet 112.

In implementations using $^{10}$B, these charged particles may include an alpha particle and a $^7$Li ion. About 78% of the time either of the alpha particle or the $^7$Li ion may escape a 1 µm thick layer of $^{10}$B. Thus, within detectors 102, 600, 700 using $^{10}$B active materials, the $^{10}$B is typically applied as a coating or layer to all or a portion of the interior surfaces of the chamber 105.

At 906, the charged particles escaping the active material 112 ionize at least a portion of a readout gas 170 disposed within the chamber 105. In some implementations, the readout gas 170 may include an elemental gas, a gas mixture, a gas combination, a gas compound, or any other combination of gases. In some implementations, the readout gas 170 may include one or more noble gases, such as argon (Ar). In $^6$Li implementations, at least a portion of the alpha particles 166 and/or at least a portion of the tritons 168 may ionize a portion of the readout gas 170, generating drift electrons 172 and a positively charged readout gas ion. In $^{10}$B implementations, at least a portion of the alpha particles 166 and/or at least a portion of the $^7$Li particles may ionize a portion of the readout gas 170, generating drift electrons 172 and a positively charged readout gas ion.

At 908, an electrode 116 placed in the chamber 105 may be maintained at a potential that differs from the potential of the active material 112. In some instances, the electrode 116 may be maintained at a potential that is positive (e.g., +100 V) measured with respect to the potential of the active material 112 (e.g., grounded or 0 V). The electric field created within the chamber 105 may cause drift electrons 172 to drift or travel towards the electrode 116. The electric field created within the chamber 105 may also cause the positively charged readout gas ions to drift or travel towards the active material 112. As the drift electrons 172 travel and/or accelerate toward the electrode 116, additional ionization of the readout gas 170 may occur. This "chain reaction" of ionization of the readout gas 170 may, in turn, cause an avalanche of electros 174 within an amplification region 176 about the electrode 116.

At 910, the combined flow of positively charged readout gas ions toward the active material 112 and the flow of drift electrons 172 toward the electrode 116 causes an overall charge flow within the chamber 105. This flow of charges within the chamber 105 may induce a current in the electrode 116. In some instances, the magnitude of the current in the electrode may be indicative of the number of thermal neutrons 162 that impact the active material 112 and/or the rate at which thermal neutrons 162 impact the active material 112. The method 900 concludes at 910.

Figure 10:
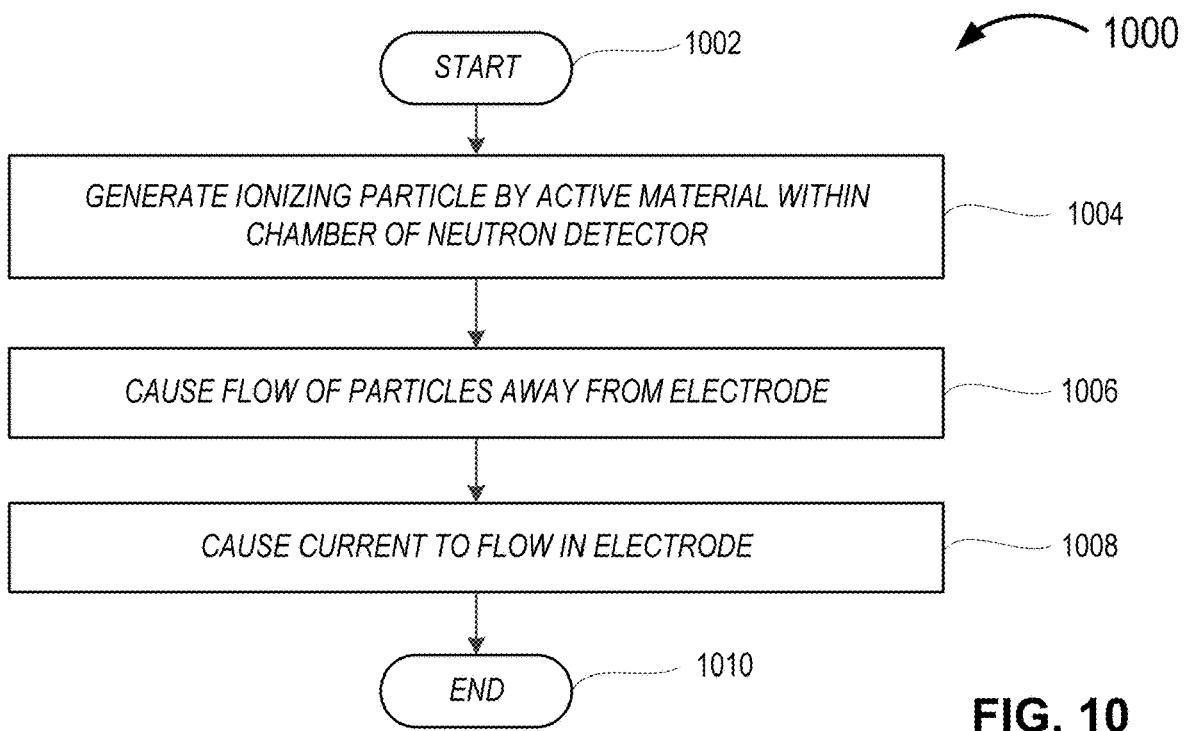
FIG. 10 is a high-level flow diagram of a method of detecting fissile neutrons using a fissile neutron detector that includes at least one active material in the form of a gas, in accordance with at least one embodiment of the present disclosure.

FIG. 10 is a high-level flow diagram of a method 1000 for generating a current in a neutron detector 102, 600, 700 in response to the impact of the thermal neutron 162 on an active material such as $^3$He or boron trifluoride ($BF_3$) disposed in the chamber 105 of the neutron detector 102, 600, 700, in accordance with at least one embodiment of the present disclosure. The interaction of the charged particles generated by the interaction between a thermal neutron 162 and a gaseous active material 112 such as $^3$He disposed in the chamber 105 may cause a current to flow on an electrode 116 disposed within the chamber 105. In some instances, the electrode 116 may be maintained at a potential that differs from the potential elsewhere in the chamber 105 and different from the potential of the gaseous active material 112. The method 1000 commences at 1002.

At 1004, one or more charged particles may be generated by the capture of the thermal neutron 162 by the active material 112. In implementations using $^3$He, these charged particles may include a protium (a hydrogen isotope containing a single proton) and tritium (a hydrogen isotope containing a single proton and two neutrons).

At 1006, an electrode 116 placed in the chamber 105 may be maintained at a potential that differs from the potential of the active material 112. In some instances, the electrode 116 may be maintained at a potential that is positive (e.g., +100 V) measured with respect to the potential of the active material 112 (e.g., grounded or 0 V). The electric field created within the chamber 105 may cause the charged particles to drift or travel towards the electrode 116.

At 1008, the flow of charged particles toward the electrode 116 causes an overall charge flow within the chamber 105. This flow of charges within the chamber 105 may induce a current in the electrode 116. In some instances, the magnitude of the current in the electrode may be indicative of the number of thermal neutrons 162 that impact the active material 112 and/or the rate at which thermal neutrons 162 impact the active material 112. The method 1000 concludes at 1010.

Figure 11A:
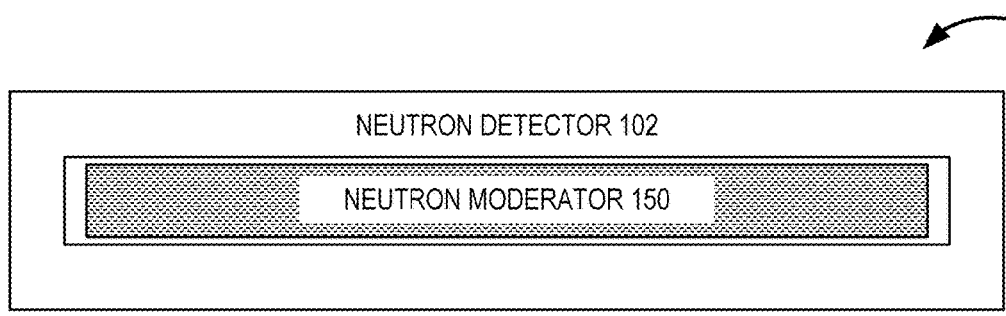
FIG. 11A is a cross sectional view of an illustrative neutron detector and neutron moderator arrangement that may be used in one implementation of a fissile neutron detection system, in accordance with at least one embodiment of the present disclosure.

FIG. 11A depicts a cross-sectional elevation of an illustrative neutron detector 102 and neutron moderator 150 arrangement 1100 that may be used in one implementation of a fissile neutron detection system 100, in accordance with at least one embodiment of the present disclosure. In the implementation depicted in FIG. 11A, the neutron detector 102 is formed into a ring-like structure that at least partially surrounds the neutron moderator 150. In such an arrangement, the incident high-energy fissile neutrons 160 may pass through the neutron detector 102 and impinge upon the neutron moderator 150. Within the neutron moderator 150, the energy level of at least some of the fissile neutrons 160 may be reduced to an energy level of a thermal neutron 162. At least a portion of the thermal neutrons 162 may exit the neutron moderator 150 and enter the neutron detector 102.

Figure 11B:
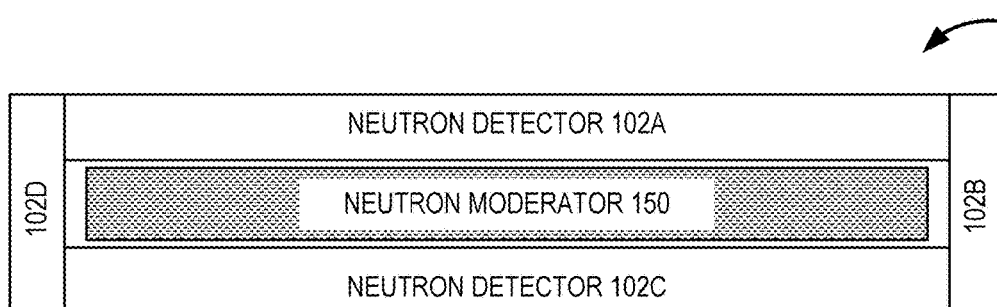
FIG. 11B is a cross sectional view of another illustrative neutron detector and neutron moderator arrangement that may be used in one implementation of a fissile neutron detection system, in accordance with at least one embodiment of the present disclosure.

FIG. 11B depicts a cross-sectional elevation of an illustrative neutron detector 102 and neutron moderator 150 arrangement 1100 that may be used in one implementation of a fissile neutron detection system 100, in accordance with at least one embodiment of the present disclosure. In the implementation depicted in FIG. 11B, a number of neutron detectors 102A-102D at least partially surround an exterior surface of the neutron moderator 150. In such an arrangement, the incident high-energy fissile neutrons 160 may pass through one of the number of neutron detectors 102A-102D and impinge upon the neutron moderator 150. Within the neutron moderator 150, the energy level of at least some of the fissile neutrons 160 may be reduced to an energy level of a thermal neutron 162. At least a portion of the thermal neutrons 162 may exit the neutron moderator 150 and enter one of the number of neutron detectors 102A-102D.

Figure 11C:
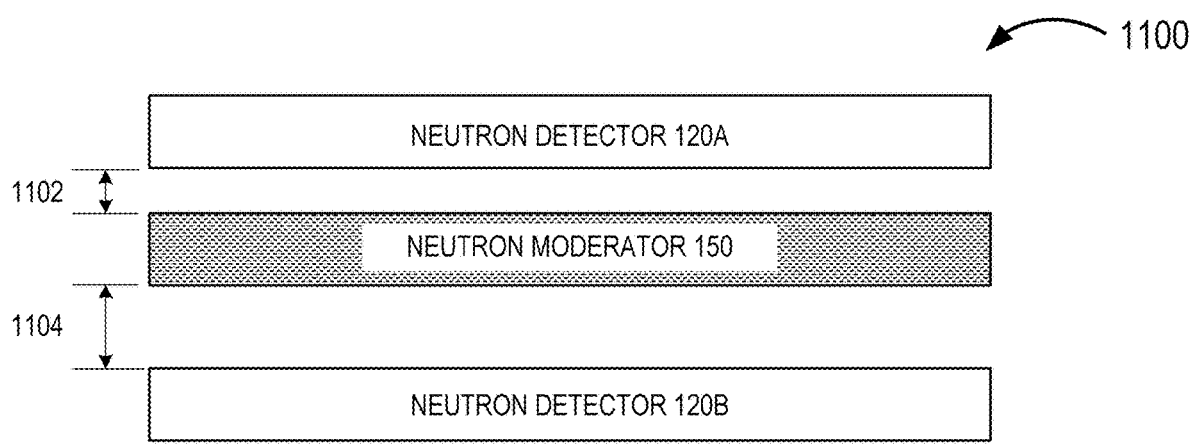
FIG. 11C is a cross sectional view of another illustrative neutron detector and neutron moderator arrangement that may be used in one implementation of a fissile neutron detection system, in accordance with at least one embodiment of the present disclosure.

FIG. 11C depicts a cross-sectional elevation of an illustrative neutron detector 102 and neutron moderator 150 arrangement 1100 that may be used in one implementation of a fissile neutron detection system 100, in accordance with at least one embodiment of the present disclosure. In the implementation depicted in FIG. 11C, a number of neutron detectors 102A-102B at least partially surround an exterior surface of the neutron moderator 150. Although depicted as a planar body, in such an arrangement, each of the neutron detectors 102 may include a planar body, a curved body, or an angular body. As depicted in FIG. 11C, a first neutron detector 102A may be spaced a first distance 1102 from at least a portion of an exterior surface of the neutron moderator 150 and a second neutron detector 102B may be spaced a second distance 1104 from at least a portion of the exterior surface of the neutron moderator 150.

Figure 11D:
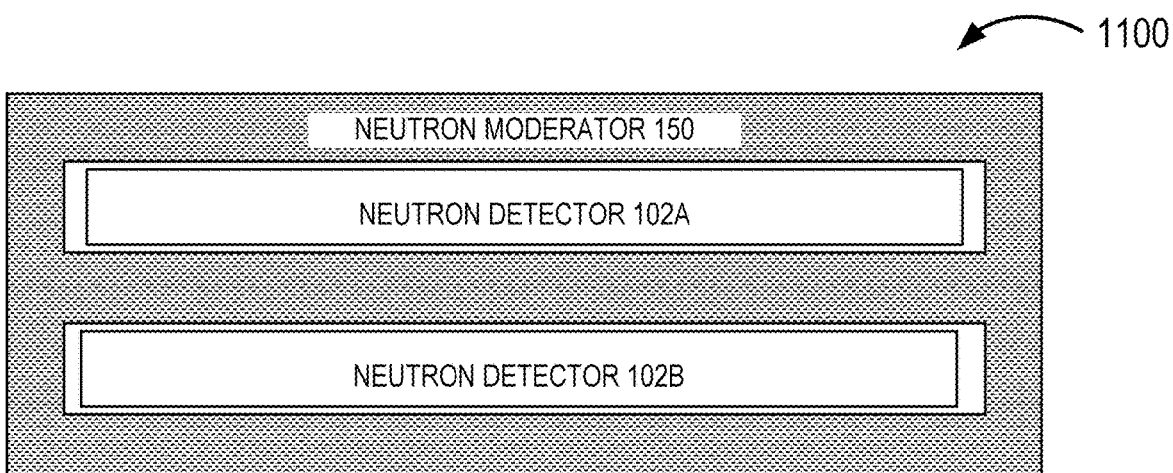
FIG. 11D is a cross sectional view of another illustrative neutron detector and neutron moderator arrangement that may be used in one implementation of a fissile neutron detection system, in accordance with at least one embodiment of the present disclosure.

FIG. 11D depicts a cross-sectional elevation of an illustrative neutron detector 102 and neutron moderator 150 arrangement 1100 that may be used in one implementation of a fissile neutron detection system 100, in accordance with at least one embodiment of the present disclosure. In the implementation depicted in FIG. 11D, a neutron moderator 150 at least partially surrounds at least a portion of an exterior surface of a first neutron detector 102A and an exterior surface of a second neutron detector 102B.

Figure 11E:
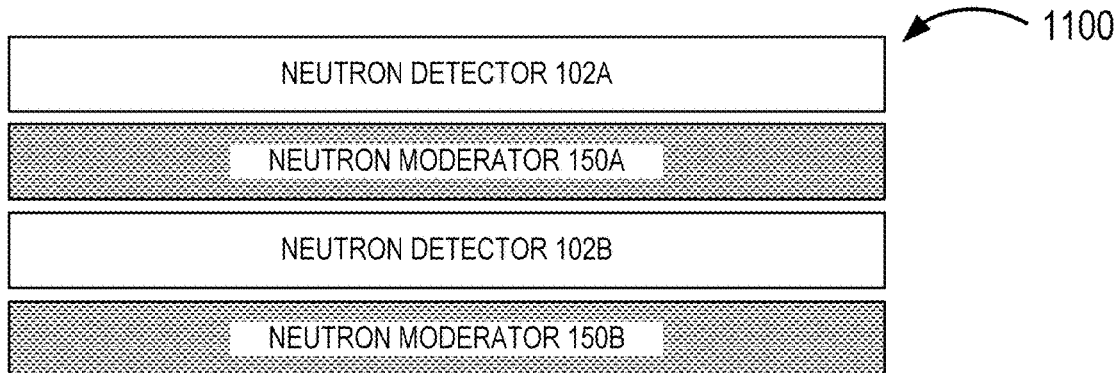
FIG. 11E is a cross sectional view of another illustrative neutron detector and neutron moderator arrangement that may be used in one implementation of a fissile neutron detection system, in accordance with at least one embodiment of the present disclosure.

FIG. 11E depicts a cross-sectional elevation of an illustrative neutron detector 102 and neutron moderator 150 arrangement 1100 that may be used in one implementation of a fissile neutron detection system 100, in accordance with at least one embodiment of the present disclosure. In the implementation depicted in FIG. 11E, a first neutron detector 102A and a second neutron detector 102B are disposed in an alternating or "sandwich" arrangement with a first neutron moderator 150A and a second neutron moderator 150B. As depicted in FIG. 11E, at least a portion of the surface of the first neutron detector 102A may be exposed, while a similar portion of the surface of the second neutron detector 102B is disposed proximate the second neutron moderator 150B.

Figure 11F:
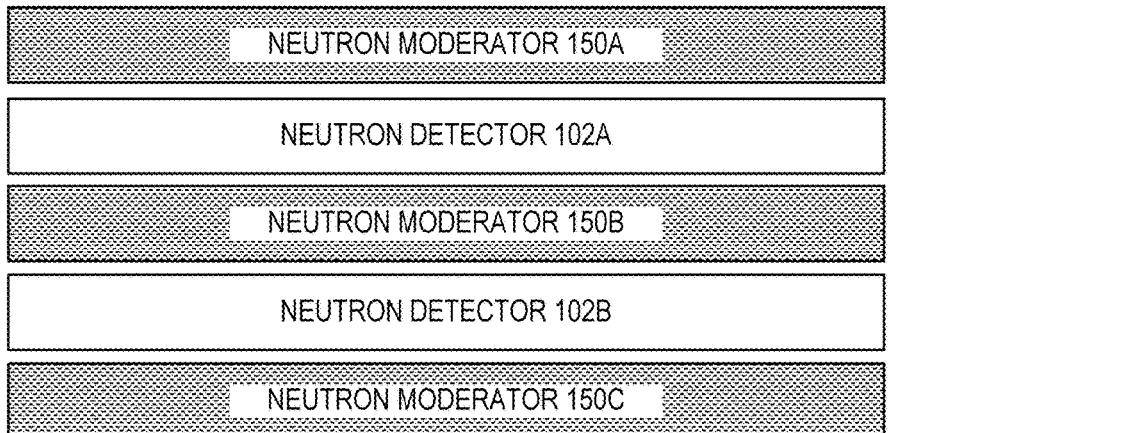
FIG. 11F is a cross sectional view of another illustrative neutron detector and neutron moderator arrangement that may be used in one implementation of a fissile neutron detection system, in accordance with at least one embodiment of the present disclosure.

FIG. 11F depicts a cross-sectional elevation of an illustrative neutron detector 102 and neutron moderator 150 arrangement 1100 that may be used in one implementation of a fissile neutron detection system 100, in accordance with at least one embodiment of the present disclosure. In the implementation depicted in FIG. 11F, a first neutron detector 102A and a second neutron detector 102B are disposed in an alternating or "sandwich" arrangement with a first neutron moderator 150A, a second neutron moderator 150B, and a third neutron moderator 150C.

Figure 11G:
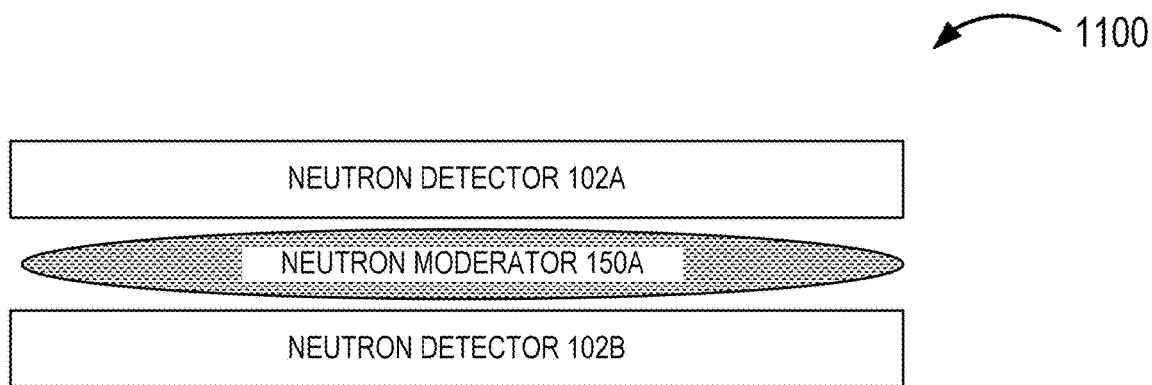
FIG. 11G is a cross sectional view of another illustrative neutron detector and neutron moderator arrangement that may be used in one implementation of a fissile neutron detection system, in accordance with at least one embodiment of the present disclosure.

FIG. 11G depicts a cross-sectional elevation of an illustrative neutron detector 102 and neutron moderator 150 arrangement 1100 that may be used in one implementation of a fissile neutron detection system 100, in accordance with at least one embodiment of the present disclosure. In the implementation depicted in FIG. 11G, a first neutron detector 102A and a second neutron detector 102B are disposed in an alternating or "sandwich" arrangement with a non-planar neutron moderator 150. In such an embodiment, the neutron moderator 150 may have any shape, geometry, or physical form.

Figure 11H:
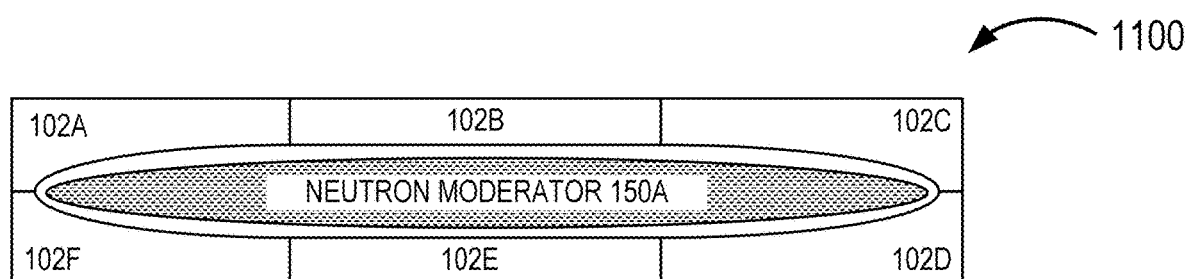
FIG. 11H is a cross sectional view of another illustrative neutron detector and neutron moderator arrangement that may be used in one implementation of a fissile neutron detection system, in accordance with at least one embodiment of the present disclosure.

FIG. 11H depicts a cross-sectional elevation of an illustrative neutron detector 102 and neutron moderator 150 arrangement 1100 that may be used in one implementation of a fissile neutron detection system 100, in accordance with at least one embodiment of the present disclosure. In the implementation depicted in FIG. 11H, six neutron detectors 102A—are disposed about at least a portion of an exterior surface of a non-planar neutron moderator 150. In such an arrangement, some or all of the neutron detectors 102 may have a contoured body configured to closely approximate the surface contour of at least a portion of the exterior surface of the non-planar neutron moderator 150.

Figure 11I:
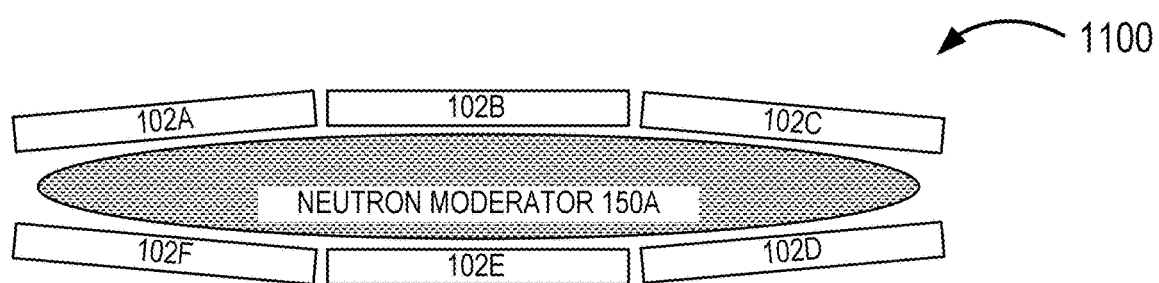
FIG. 11I is a cross sectional view of another illustrative neutron detector and neutron moderator arrangement that may be used in one implementation of a fissile neutron detection system, in accordance with at least one embodiment of the present disclosure.

FIG. 11I depicts a cross-sectional elevation of an illustrative neutron detector 102 and neutron moderator 150 arrangement 1100 that may be used in one implementation of a fissile neutron detection system 100, in accordance with at least one embodiment of the present disclosure. In the implementation depicted in FIG. 11I, six neutron detectors 102A—are disposed about at least a portion of an exterior surface of a non-planar neutron moderator 150. In such an arrangement, some or all of the neutron detectors 102 may have a planar body disposed about at least a portion of the exterior surface of the non-planar neutron moderator 150.

Figure 11J:
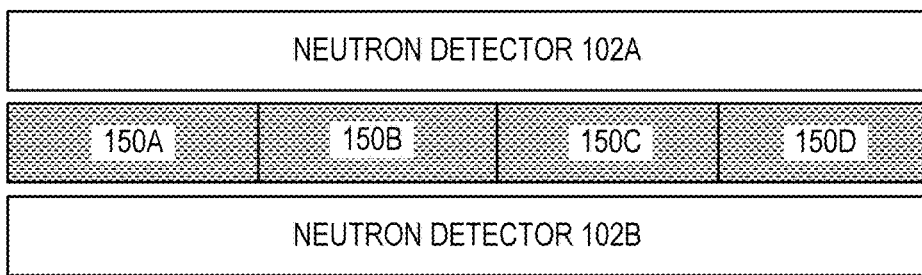
FIG. 11J is a cross sectional view of another illustrative neutron detector and neutron moderator arrangement that may be used in one implementation of a fissile neutron detection system, in accordance with at least one embodiment of the present disclosure.

FIG. 11J depicts a cross-sectional elevation of an illustrative neutron detector 102 and neutron moderator 150 arrangement 1100 that may be used in one implementation of a fissile neutron detection system 100, in accordance with at least one embodiment of the present disclosure. In the implementation depicted in FIG. 11J, a number of neutron detectors 102A-102B at least partially surround an exterior surface of a plurality of neutron moderators 150A-150D. Although depicted as a planar body, in such an arrangement, each of the neutron detectors 102 may include a planar body, a curved body, or an angular body.

Figure 11K:
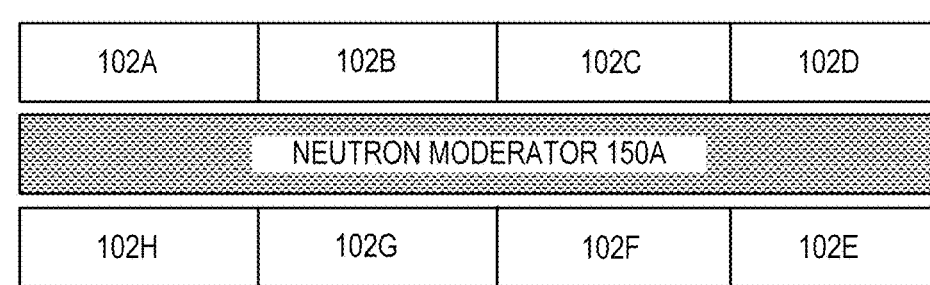
FIG. 11K is a cross sectional view of another illustrative neutron detector and neutron moderator arrangement that may be used in one implementation of a fissile neutron detection system, in accordance with at least one embodiment of the present disclosure.

FIG. 11K depicts a cross-sectional elevation of an illustrative neutron detector 102 and neutron moderator 150 arrangement 1100 that may be used in one implementation of a fissile neutron detection system 100, in accordance with at least one embodiment of the present disclosure. In the implementation depicted in FIG. 11K, a number of neutron detectors 102A-102H at least partially surround an exterior surface of a neutron moderator 150. Although depicted as a planar body, in such an arrangement, each of the neutron detectors 102A-102H may include a planar body, a curved body, or an angular body.

It is noted that the configurations depicted in FIGS. 11A-11K employing a neutron detector arrangement in which the neutron detector 102, 600, 700 generally surrounds the neutron moderator 150 may provide significant advantages over prior neutron detector designs. Such prior neutron detector designs may be classified as either TYPE I arrangements in which the moderator surrounds the detector and TYPE II arrangements in which the moderator is interspersed among an array of detectors that are separated from each other by substantial amounts along various directions.

With regard to TYPE I arrangements, back scattered neutrons that initially strike the moderator may be directed away from the inner detector such that the backscattered neutrons are lost to detection. With respect to the configurations disclosed herein, it is noted that the great majority of such backscattered neutrons may be collected by the neutron detectors 102, 600, 700 as a consequence of the manner in which the detector arrangement may directly surround the moderator in almost all directions.

With regard to TYPE II arrangements, it is noted that the disclosed embodiments advantageously reduce the distance that backscattered neutrons travel prior to impacting a neutron detector. In contrast, even optimized TYPE II arrangements may be handicapped by the distances backscattered neutrons must travel prior to detection. While TYPE II systems may allow for an increasing number of neutron detectors as a way of increasing overall system efficiency, such additional detectors generally push the system as a whole toward a heavier, bulkier, and more expensive solution than the embodiments described herein. The system geometries disclosed herein offer significant improvements in space, weight and cost when compared to traditional TYPE II systems.

In reference to FIGS. 11A-11K, for purposes of descriptive clarity, attention is directed to several aspects of performance as delineated from prior technical discussions. The detector systems of the present disclosure are arranged such that a neutron moderator 150 is surrounded by a neutron detector 102, 600, 700 arrangement such that incoming fissile neutrons 160 generally pass through the neutron detector 102, 600, 700 before striking the neutron moderator 150, and the vast majority (>60%) of all thermal neutrons 162 scattered by the neutron moderator 150 (including back scattered as well as forward scattered thermal neutrons) will be collected by the at least one neutron detector 102, 600, 700. Furthermore, in any of the described embodiments, the moderator may, in some implementations, define a generally planar geometry (not necessarily a flat plane) having a large area (anywhere from 0.5 m² to 100 m²) and a thickness that is small compared with any given lateral extent thereof, and the at least one neutron detector 102, 600, 700 surrounds the neutron moderator 150 in close proximity especially over the major planar surfaces. Thus the fissile neutron detection system 100 may be considered as a layered arrangement that provides for advantages over prior neutron detection systems.

Both forward and backward scattered neutrons both travel only short distances before impinging on the neutron detectors 102, 600, 700. This detector characteristic—that of short scattering to detection paths—helps insure that forward and backwards scattered thermal neutrons 162 tend not to be absorbed by intervening materials and thus can be entirely lost to detection. Furthermore, at least one further benefit of the short path is that it takes up less linear space that a long path would require. Applicants appreciate that at least in the cases of forward and backward scattering, the short path between scattering and detection provides for fissile neutron detector systems that have lower extent (at least in the direction of initial neutron trajectory) as compared to conventional detectors. It is to be noted that the terms forward and backward scattering as employed herein can be considered as any scattering event where the scattered neutron deviates from its initial incoming trajectory by more than approximately 60 degrees. While the benefits of the described approaches are clearly not limited to planar embodiment, applicants are unaware of any conventional system that uses solid neutron conversion materials that achieves as comparably high efficiency (50% detection of fissile material) within thickness ranges that are so short as compared to lateral extent, without increasing by 25% or more the amount of lithium or boron that is used in the system. In other words, conventional approaches require detector systems of significantly greater thickness or neutron conversion material (such as lithium or boron) as compared to those disclosed herein. In the context of commercial applications wherein size, weight and cost are paramount, this advantage represents a significant improvement.

Summarizing with respect to overall operation of various embodiment described above, a moderator arrangement, composed of a moderator material, can be surrounded by a detector arrangement such that at least 60% scattered neutrons that exit the moderator travel only a short distance before they strike an active area (for example lithium foil) of the detector arrangement.

In some embodiments the moderator defines a generally planer shape having a thickness that is short compared with any lateral extent thereof. It is noted that in the context of this disclosure there is no requirement that these planar geometries be flat, and it should be appreciated that the planar geometries described herein could be curved in a variety of ways just as any piece of sheet metal or paper can be curved and bent in a variety of ways and yet still regarded as being generally planar. At least in the case of generally planar moderator and detector geometries, the overall collection efficiency tends to exceed that which can be obtained in conventional systems such as the TYPE I and TYPE II systems for the same amount of conversion material used in the detector. In additional to higher absolute efficiencies, the relative efficiency, and reduction of weight, cost, and/or thickness tends to exceed that of conventional detector systems such as the TYPE I and TYPE II conventional systems described above. This aspect can be readily appreciated by comparing the described planar embodiment with conventional detectors constrained to occupy and be contained within the same or similar spatial envelope as Applicant's systems. For example a detector system such as that of FIG. 1 occupies a spatial area of 1 m² and a thickness of 0.15 meters. A conventional TYPE I detector of similar shape could readily lose between 25% and 40% of efficiency as compared to a similar sized unit that is constructed based on this disclosure. Similarly, a TYPE II system of similar area may require a thickness of 0.2 meters or more and need 200% or more lithium or boron material and would thus be at least 25% times heavier and far more expensive.

With continued focus on generally planar embodiments, Applicants note that certain ones of the above configurations can include an outer moderator (proximate to and not surrounded by the detector) and an inner moderator that is almost entirely surrounded by the detector arrangement. In this context, Applicants consider a distinguishing feature of some of the embodiments disclosed herein that only incoming neutrons entering from extremely shallow sideways angles (for example in some embodiments only neutrons entering sideways with less than 20 degrees from plane defined by the planar modulator) can strike the inner moderator without first passing through a detector. (Since the detectors are generally not intended to have high efficiency for sideways incident neutrons these neutrons may be of little consequence at least in many intended applications.) While this feature by itself does not directly result in the dislodged efficiency improvements, it is to be noted that insofar as all or most impinging high energy neutrons cannot enter the inner moderator without passing through the detector, it is conversely the case that all or most scattered low energy neutrons cannot exit and pass away from the moderator without passing through the detectors. This latter consideration clearly results sweeping advantages compared to the conventional systems, including but not limited to Type 1 and Type two systems, and to whatever extent the former consideration results in and/or is related to these benefits, it is considered by Applicants at the very least to be of general interest.

Of the many benefits of the disclosed systems, it is again of particular interest that the scattered neutrons can be collected with a relatively small amount of intervening structure at least as compared with conventional arrangements in which large distances and substantial amounts of material may be present in the intervening spatial extent lying between a given moderator and an associated detector. One implication of this unusual feature is that in many embodiments, the designer is free to surround the moderator in very close proximity. For example, for a moderator of a given thickness, in many cases the disclosed embodiments allow for the detector to surround the moderator with gap spacing therebetween that are much smaller than the moderator thickness. This is of benefit at least for the reason that such close moderator detector spacing, over the great majority of the moderator surface, affords very little opportunity of escape for scattered neutrons. In other words the lose moderator detector spacing, over almost the entirety of the moderator, prevents most scattered neutrons from escaping the detector system without impinging on some part of the detector. Applicants are simply unaware of any conventional systems that can reasonably be regarded as sharing this important feature. Summarizing with respect to the foregoing paragraph, many of the described detector arrangements surround their associated inner moderator with moderator-detector spacing that are small as compared with moderator thickness.

Figure 12A:
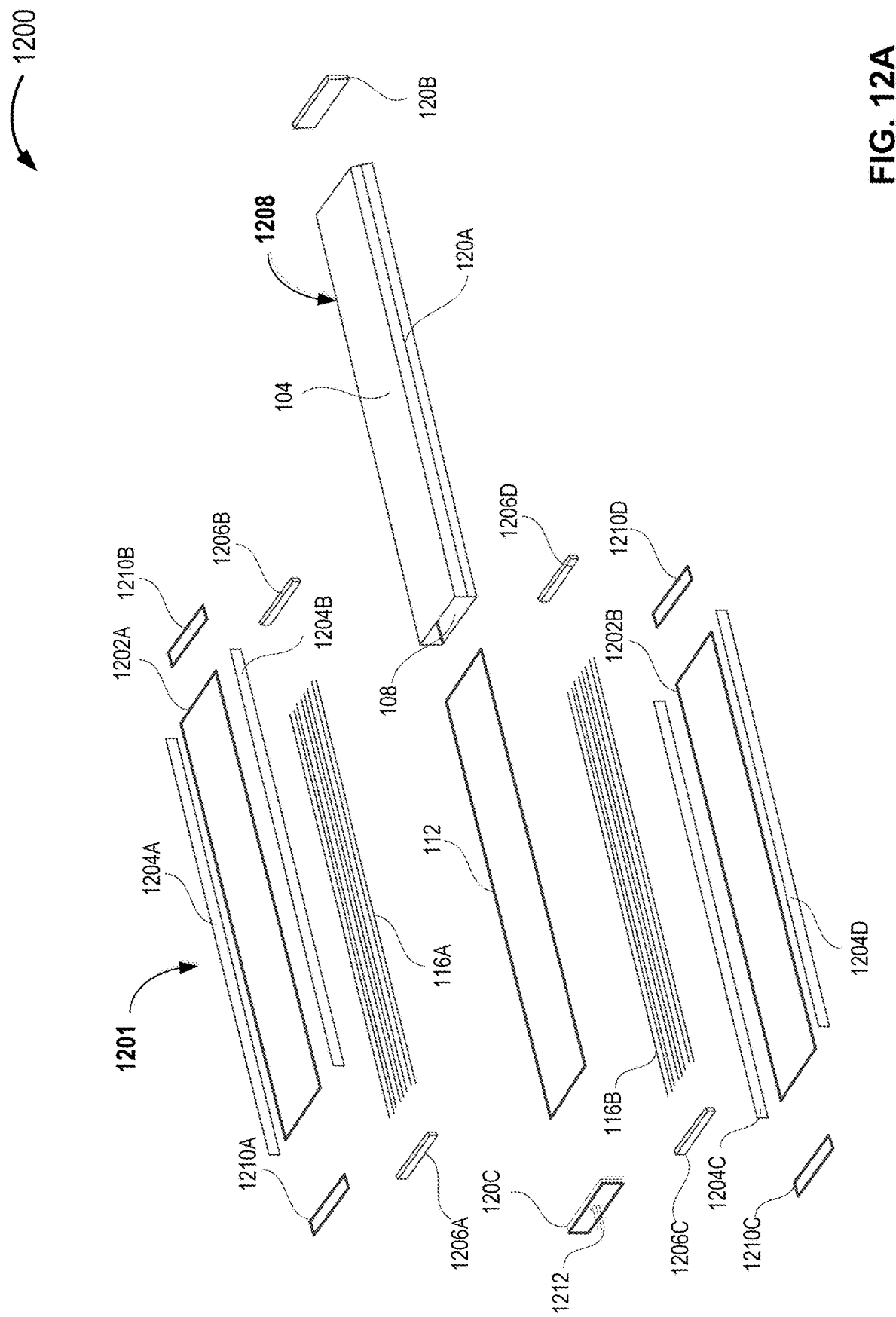
FIG. 12A is an exploded view of another illustrative neutron detector that may be used in one or more implementations of a fissile neutron detection system, in accordance with at least one embodiment of the present disclosure.

FIG. 12A depicts an exploded view of another illustrative neutron detector 1200 that may be used alone or in combination in the fissile neutron detection systems 100, 600, 700, in accordance with at least one embodiment described herein. The neutron detector uses a modular assembly 1201 in which components such as a first ground plate 1202A, a first set of electrodes 116A, the active material 112 (and any support 106—not shown) a second set of electrodes 116B, and a second ground plate 1202B may be preassembled prior to disposal in a housing 1208 that includes the top cover 104, the bottom cover 108 and at least a portion of the sidewalls 120.

In some implementations, the first ground plate 1202A, a first set of electrodes 116A, the active material 112 a second set of electrodes 116B, and a second ground plate 1202B may be preassembled using a number of internal spacers to provide clearance between the electrodes 116, the active material 112, and the ground plates 1202. The internal spacers may include a number of side spacers 1204A-1204D (collectively, "side spacers 1204") and a number of end spacers 1206A-1206D (collectively, "end spacers 1206") that, when assembled provide sufficient clearance and electrical isolation of the various components within the within the modular assembly.

As used herein terms such as "side" and "end" denote locations relative to each other and do not represent absolute references. Thus, an "end object" may function as a "side object" when the object is rotated through an angle such as 90 degrees. Similarly, a "side object" may function as an "end object" when the object is rotated through an angle such as 90 degrees.

The ground plates 1202 can include one or more electrically conductive materials. Such materials may include one or more metals such as aluminum, copper, or alloys containing various quantities of aluminum or copper. In some implementations, the ground plates 1202 may include a conductive mesh material to permit the passage of the readout gas 170 through all or a portion of the ground plates 1202. In some implementations, the ground plates 1202 may include one or more electrically insulative materials disposed on all or a portion of the exterior surface of the ground plate 1202 proximate the housing 1208.

The side spacers 1204 may include any number or combination of devices or components capable of maintaining a desired separation between the active material 112 and a ground plate 1204. The side spacers 1204 may have any shape, and thus although shown as straight members in FIG. 12A, the side spacers 1204 may be curved, arced, angular or any other shape needed to maintain the desired separation or distance between the active material 112 and the ground plate 1202.

The electrodes 116 are terminated on a number of ganging boards or buses 1210A-1210D (collectively "buses 1210"). The buses 1210 advantageously provide distribution of electric power and collection of current signals via a limited number of penetrations through the neutron detector 1200. For example, as depicted in FIG. 12A, the buses 1210 permit the ganging of electrode power and beneficially route all electrical connections through one or more couplers 1212. In some instances the one or more couplers 1212 may include a modular plug or similar device that simplifies and speeds electrical connection of the respective fissile neutron detection system 1200. In embodiments, the one or more couplers 1212 may include a number of conductors for powering the electrodes 116 within the fissile neutron detection system 1200. In embodiments, the one or more couplers 1212 may include a number of signal conductors for communicating fissile neutron detection signals to one or more external devices, such as a count readout device and/or alarm device.

The use of one or more couplers 1212 may greatly reduce the number of penetrations through the housing 1208. Reducing the number of penetrations through the neutron detector housing reduces the likelihood of egress of the readout gas 170 from the chamber 105 and also reduces the likelihood of ingress of environmental contaminants into the chamber 105.

The housing 1208 may include all or a portion of the top cover 104, the bottom cover 108, and at least a portion of one or more sidewalls 120A. Advantageously, the housing 1208 may be cast, extruded or similarly formed using a single component, thereby limiting the number of joints in the neutron detector 1200. Minimizing the number of joints within the neutron detector 1200 beneficially reduces the likelihood of egress of the readout gas 170 from the chamber 105 and also reduces the likelihood of ingress of environmental contaminants into the chamber 105. In some implementations, the end plates 120B and 120C may be attached to the housing 1208 using one or more joints having a sealant 124 disposed therein. In some implementations, the end plates 120B and 120C may be attached to the housing 1208 via welding or brazing. In other embodiments, the end plates 120B and 120C may be attached to the housing 1208 via one or more fasteners, such as one or more screws or similar.

Figure 12B:
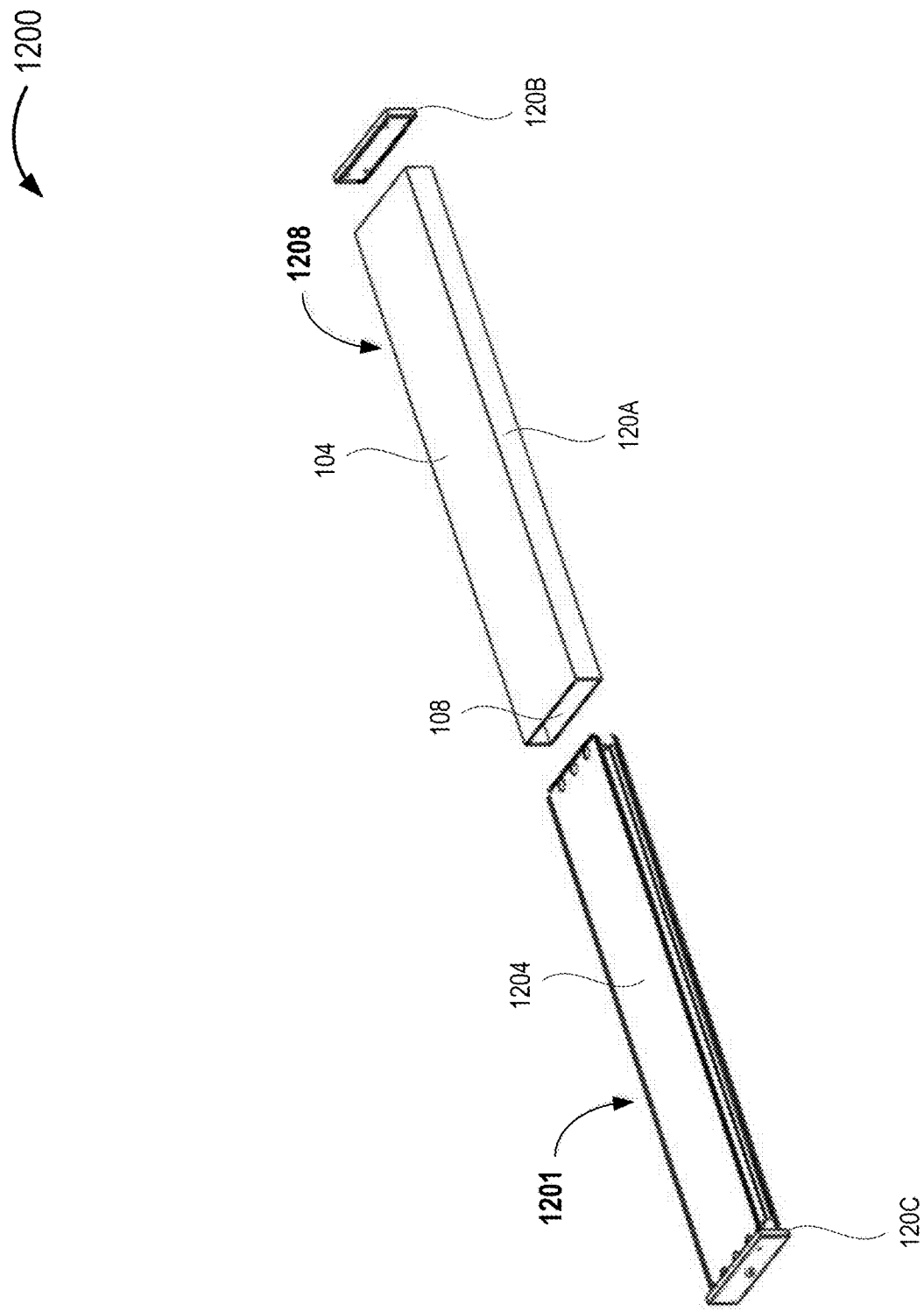
FIG. 12B is an assembly drawing of the illustrative neutron detector depicted in FIG. 12A, in accordance with at least one embodiment of the present disclosure.

FIG. 12C is a detail drawing depicting an electrode connection device 1250 for use with the illustrative neutron detector 1200 depicted in FIGS. 12A and 12B, in accordance with at least one embodiment of the present disclosure. In at least some implementations the electrodes 116 may electrically conductively couple to a bus ganging structure or bus 1210. One or more conductors or pins 1256 may pass through a sealing plate 1258 that is affixed to the housing 1208, for example to the top cover 104 of the housing 1208. One or more seals 1260, for example one or more polyisobutylene seals 1260 may be disposed between the sealing plate 1258 to provide a hermetically sealed chamber 105. In some instances a member or standoff 1252 may separate and, in some instances, electrically isolate the bus 1210 from the sealing plate 1258. In the embodiment depicted in FIG. 12C, a conductive bolt 1254 penetrates the sealing plate 1258 and at least partially surrounds the pin 1256. A second polyisobutylene seal 1262 may be disposed between the conductive bolt 1254 and the sealing plate 1258.

FIG. 12D is a detail drawing depicting another electrode connection device 1250 for use with the illustrative neutron detector 1200 depicted in FIGS. 12A and 12B, in accordance with at least one embodiment of the present disclosure. In at least some implementations, some or all of the electrodes 116 may electrically conductively couple to a bus ganging structure or bus 1210. One or more conductors or pins 1256 pass through a sealing plate 1258 that is affixed to the housing 1208, for example to the top cover 104 of the housing 1208. One or more seals 1260, for example one or more polyisobutylene seals 1260 may be disposed between the sealing plate 1258 to provide a hermetically sealed chamber 105. In some instances a member or standoff 1252 may separate and, in some instances, electrically isolate the bus 1210 from the sealing plate 1258. In the embodiment depicted in FIG. 12D, a sealing member 1270, such as an epoxy sealing member, penetrates the sealing plate 1258 and at least partially surrounds the pin 1256.

FIG. 12E is a detail drawing depicting another electrode connection device 1250 for use with the illustrative neutron detector 1200 depicted in FIGS. 12A and 12B, in accordance with at least one embodiment of the present disclosure. In at least some implementations, some or all of the electrodes 116 may electrically conductively couple to a bus ganging structure or bus 1210. One or more conductors or pins 1256 pass through an aperture in the housing 1208, for example to the top cover 104 of the housing 1208. One or more a weld or O-ring seal may be disposed to seal at least a portion of the aperture in the housing 1208. In some instances, a plug 1286 such as a metal or polymeric plug may be disposed proximate the aperture in the housing 1208. A glass or epoxy seal 1284 may at least partially surround the pins 1256 extending from the bus 1210. A member or standoff 1252 may separate and, in some instances, electrically isolate the bus 1210 from the sealing plate 1258. In the embodiment depicted in FIG. 12E, the combination of the weld or O-ring seal 1280, the metal or polymeric plug 1286, and the glass or epoxy seal 1284 at least partially surrounds the pin 1256 and provides a hermetic seal for the chamber 105.

FIG. 12F is a close up perspective view of the electrode connection device 1250 depicted in FIG. 12C, in accordance with at least one embodiment of the present disclosure. FIG. 12G is a close up plan view of the electrode connection device 1250 depicted in FIG. 12C, in accordance with at least one embodiment of the present disclosure.

Figure 13A:
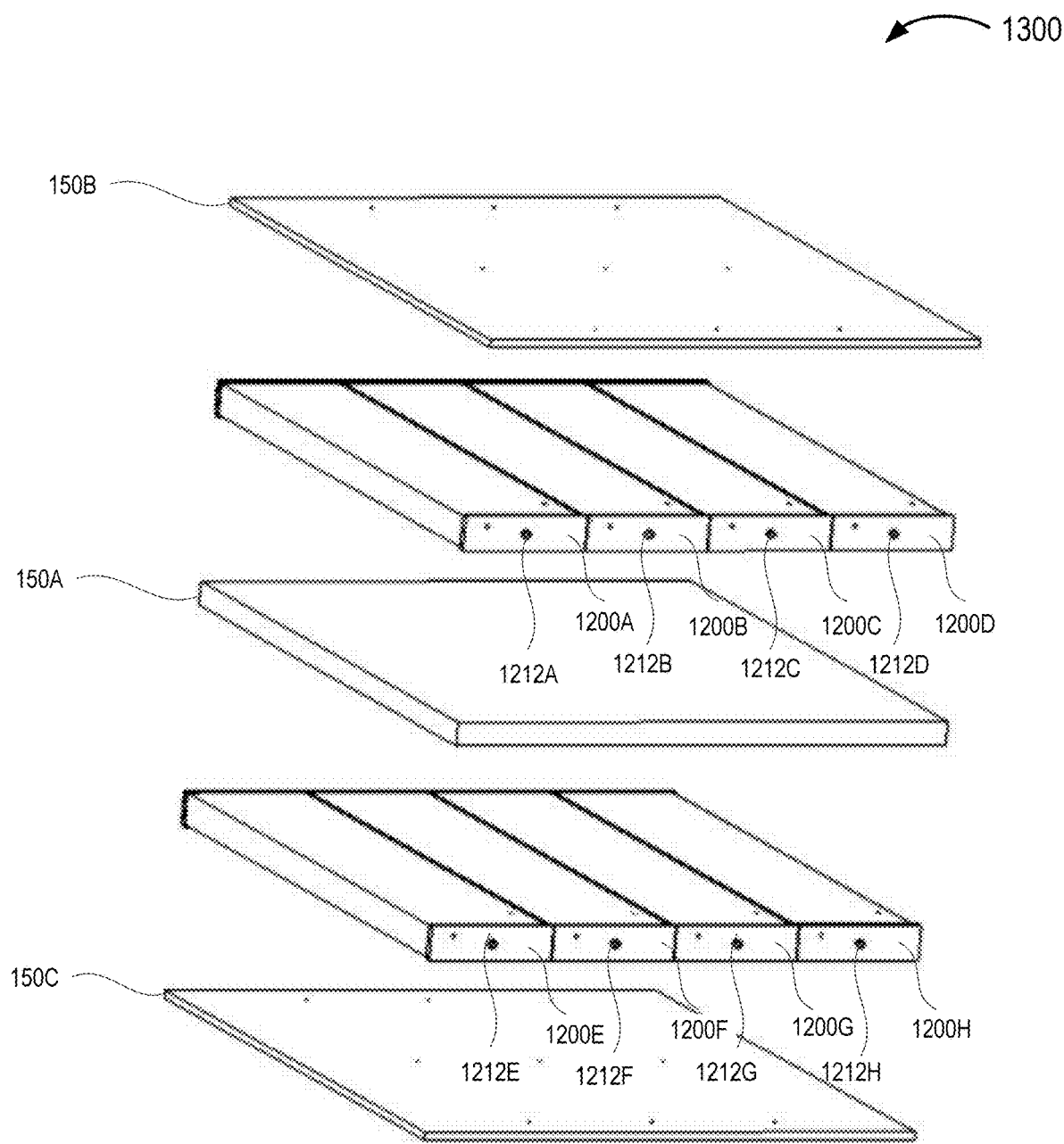
FIG. 13A is an exploded view of an illustrative fissile neutron detection system that uses three neutron moderators and eight neutron detectors, in accordance with at least one embodiment of the present disclosure.
Figure 13B:
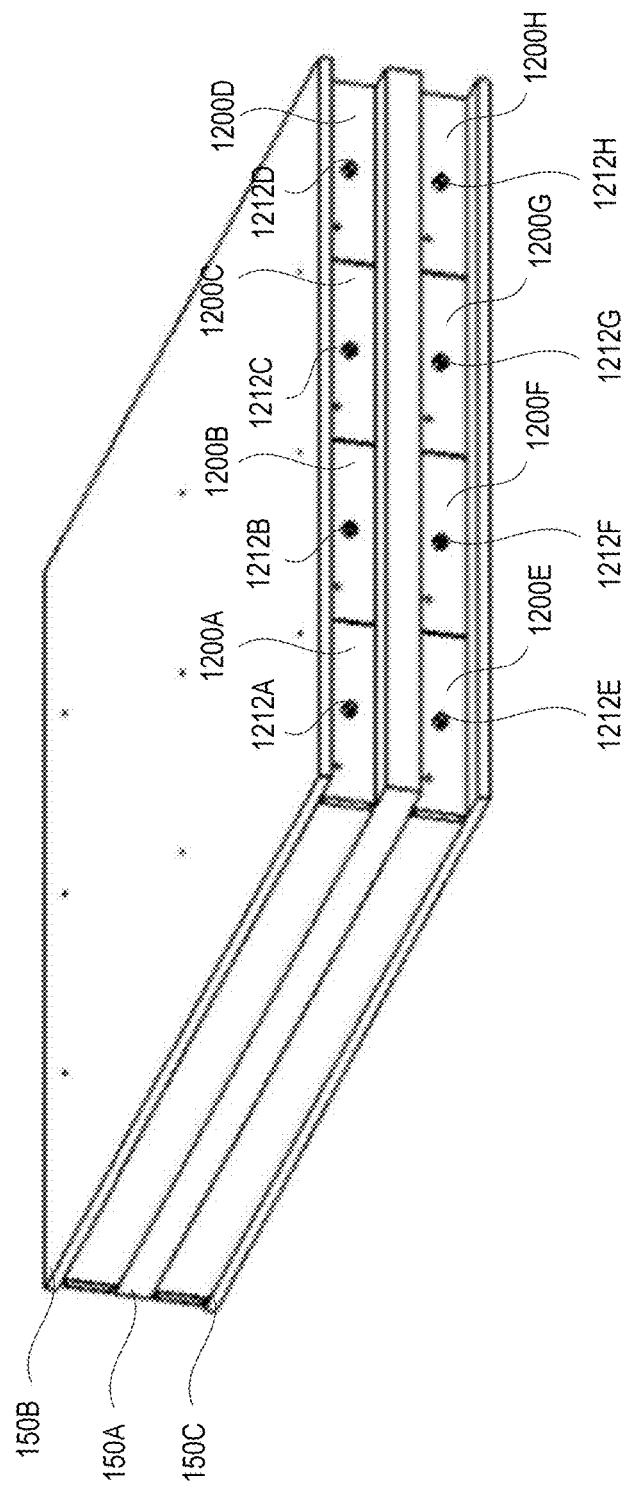
FIG. 13B is an assembled view of the illustrative fissile neutron detection system depicted in FIG. 13A, in accordance with at least one embodiment of the present disclosure.

FIG. 13A is an exploded view of an illustrative fissile neutron detection system 1300 that uses three neutron moderators 150A-150C and eight neutron detectors 1200 such as depicted in FIGS. 12A-12F, in accordance with at least one embodiment of the present disclosure. FIG. 13B is an assembled view of the illustrative fissile neutron detection system 1300 depicted in FIG. 13A, in accordance with at least one embodiment of the present disclosure. The modular construction of the fissile neutron detection system 1200 beneficially permits positioning of any number of systems 1200 in a variety of configurations. Such may, for example, facilitate the use of a single fissile neutron detection system 1200 within a relatively compact, portable, handheld device and the combination of a number of fissile neutron detection system 1200 into a stationary roadside monitoring array. As depicted in FIGS. 13A and 13B, a neutron moderator 150A is disposed between eight fissile neutron detection systems 1200A-1200H arranged in two rows of four detectors. The majority of the surface area of the neutron moderator 150A is therefore disposed proximate one or more neutron detectors 1200. External neutron moderators 150B and 150C are disposed proximate the surfaces of the fissile neutron detectors 1200A-1200H that are opposite neutron detector 150A. As depicted in FIGS. 13A and 13B the fissile neutron detection systems 1200 may be arranged such that the one or more couplers 1212A-1212H for each of the systems 1200A-1200H, respectively, exits the assembly from a single end. Such an arrangement may facilitate the connection of each of the fissile neutron detection systems 1200 to a communications bus a power distribution bus, or any combination thereof.

In embodiments, the chamber 105 of the neutron detector 1200 may have a length, measured along a first axis, of about 10 centimeters (cm) or greater; about 20 cm or greater; about 30 cm or greater; about 50 cm or greater; about 75 cm or greater; about 100 cm or greater; about 200 cm or greater; about 500 cm or greater; about 700 cm or greater; or about 1000 cm or greater. In embodiments, the chamber 105 may have a height, measured along a second axis orthogonal to the first axis, of about 0.5 centimeters (cm) or less; about 1 cm or less; about 1.5 cm or less; about 2 cm or less; about 2.5 cm or less; about 3 cm or less; about 3.5 cm or less; about 4 cm or less; about 4.5 cm or less; or about 5 cm or less. In embodiments, the chamber 105 may have a width, measured along a third axis orthogonal to the first axis and the second axis, of about 10 centimeters (cm) or less; about 15 cm or less; about 20 cm or less; about 25 cm or less; about 30 cm or less; about 35 cm or less; about 40 cm or less; about 45 cm or less; about 50 cm or less; or about 100 cm or less.

In some implementations, the physical configuration of the one or more neutron moderators 150 and the one or more neutron detectors 1200 may be such at a minimum of about 50% or more; about 55% or more; about 60% or more; about 65% or more; about 70% or more; about 75% or more; about 80% or more; about 85% or more; or about 90% or more of the thermal neutrons 162 exiting the one or more neutron moderators 150 impinge upon, strike, or otherwise enter the one or more neutron detectors 1200.

Although not depicted in FIGS. 13A and 13B, the entire fissile neutron detection system 1300 may be disposed partially or completely within an external housing. Such may facilitate the installation of the fissile neutron detection system 1300 in an outdoor environment such as a checkpoint, port-of-entry, or similar locations where screening for fissile nuclear material may be beneficial.

The following examples pertain to embodiments that employ some or all of the described fissile neutron detection apparatuses, systems, and methods described herein. The enclosed examples should not be considered exhaustive, nor should the enclosed examples be construed to exclude other combinations of the systems, methods, and apparatuses disclosed herein and which are not specifically enumerated herein.

According to example 1 there is provided a fissile neutron detection system. The fissile neutron detection system may include at least one neutron detector. Each neutron detector may further include a body having a length, a width, and a height defining a closed chamber, the length and the width of the chamber greater than the height of the chamber. Each neutron detector may further include at least one active material that emits at least one ionizing particle upon exposure to thermal neutrons, the active material disposed within the chamber; and at least one electrode. The fissile neutron detection system also includes at least one neutron moderator disposed proximate the at least one neutron detector, the at least one neutron moderator including a material that transitions at least a portion of high-energy incident fissile neutrons to low-energy thermal neutrons, wherein at least 50% of the low-energy thermal neutrons exiting the moderator enter the at least one detector.

Example 2 may include elements of example 1 where the chamber formed by the body of each neutron detector may include a single, continuous, chamber.

Example 3 may include elements of example 2 where the chamber formed by the body of each neutron detector may include a hermetically sealed chamber.

Example 4 may include elements of example 1 where the at least one neutron detector may include a plurality of neutron detectors.

Example 5 may include elements of example 1 where the at least one neutron moderator may include a plurality of neutron moderators.

Example 6 may include elements of example 1 where the at least one neutron moderator may include a material that includes a minimum of 40 weight percent hydrogen.

Example 7 may include elements of example 6 where the at least one neutron moderator may include high-density polyethylene (HDPE) member.

Example 8 may include elements of example 7 where the at least one neutron moderator may include a HDPE member having a uniform thickness of from about 0.5 centimeters (cm) to about 10 cm.

Example 9 may include elements of example 1 where the at least one neutron moderator comprises a number of members, each of the members having a uniform thickness.

Example 10 may include elements of example 1 and may additionally include a voltage source conductively coupled to the at least one electrode in the at least one neutron detector.

Example 11 may include elements of example 1 and may additionally include a number of support members disposed at intervals along at least a portion of a length of the at least one electrode.

Example 12 may include elements of example 1 where the at least one neutron detector may include an exterior surface having a top cover and a bottom cover separated by a sidewall having a height.

Example 13 may include elements of example 12 where the sidewall comprises a multi-piece sidewall.

Example 14 may include elements of example 12 where the at least one neutron detector may include a first neutron detector and a second neutron detector; where the at least one neutron moderator may be disposed proximate at least a portion of the exterior surface of the first neutron detector and at least a portion of the exterior surface of the second neutron detector; and where at least a portion of the at least one neutron moderator may be disposed in a space bordered by the portion of the exterior surface of the first neutron detector and the portion of the exterior surface of the second neutron detector.

Example 15 may include elements of example 14 where the first neutron detector may include a planar body having a planar top cover and a planar bottom cover; where the second neutron detector may include a planar body having a planar top cover and a planar bottom cover; and where the neutron moderator may include a planar member disposed proximate the top cover of the first neutron detector and the top cover of the second neutron detector.

Example 16 may include elements of example 15 where the planar top cover of the first neutron detector may have a length of from about 10 centimeters (cm) to about 500 centimeters and a width of from about 10 cm to about 500 cm; where the planar bottom cover of the first neutron detector may have length of from about 10 cm to about 500 cm and a width of from about 10 cm to about 500 cm; where the sidewall of the first neutron detector may have a height of from about 0.5 cm to about 5 cm; where the planar top cover of the second neutron detector may have a length of from about 10 centimeters (cm) to about 500 centimeters and a width of from about 10 cm to about 500 cm; where the planar bottom cover of the second neutron detector may have length of from about 10 cm to about 500 cm and a width of from about 10 cm to about 500 cm; and where the sidewall of the second neutron detector may have a height of from about 0.5 cm to about 5 cm.

Example 17 may include elements of example 14 where the first neutron detector may include an arcuate body having an arcuate top cover and an arcuate bottom cover; where the second neutron detector may include an arcuate body having an arcuate top cover and an arcuate bottom cover; and where the neutron moderator may include a constant thickness planar member disposed proximate the top cover of the first neutron detector and the top cover of the second neutron detector.

Example 18 may include elements of example 14 where the first neutron detector may include an angular body having an angular top cover and an angular bottom cover; where the second neutron detector may include an angular body having an angular top cover and an angular bottom cover; and where the neutron moderator may include a constant thickness planar member disposed proximate the top cover of the first neutron detector and the top cover of the second neutron detector.

Example 19 may include elements of example 1 where the at least one neutron moderator may include at least one member having an exterior surface; and where the at least one neutron detector may be disposed proximate at least a portion of the exterior surface of the member of the at least one neutron moderator.

Example 20 may include elements of example 1 where the at least one neutron detector body may include a body having an exterior surface; and where the at least one neutron moderator may include at least one external neutron moderator disposed proximate at least a portion of the exterior surface of the body of the at least one neutron detector.

Example 21 may include elements of example 3 where the at least one neutron detector may include an ionizable readout gas disposed within the hermetically sealed chamber.

Example 22 may include elements of example 21 where the ionizable readout gas may include at least one noble gas.

Example 23 may include elements of example 22 where the at least one noble gas may include argon (Ar).

Example 24 may include elements of any of examples 1 through 23 where the at least one active material may include at least one sheet of solid active material.

Example 25 may include elements of example 24 where the at least one sheet of active material may include at least one lithium 6 ($^6$Li) sheet.

Example 26 may include elements of example 25 where each $^6$Li sheet may include a $^6$Li sheet having a thickness of from about 50 micrometers (μm) to about 120 μm.

Example 27 may include elements of example 26 where each $^6$Li sheet may include a $^6$Li sheet having a length and a width that exceed the thickness of the $^6$Li sheet.

Example 28 may include elements of example 27 and may additionally include a support structure disposed proximate each $^6$Li sheet, the support structure disposed at an intermediate location within the chamber.

Example 29 may include elements of example 27 where the at least one $^6$Li sheet may be disposed proximate at least a portion of at least one surface forming an interior of the chamber.

Example 30 may include elements of any of examples 1 through 23 where the at least one active material may include at least one layer of active material.

Example 31 may include elements of example 30 where the at least one layer of active material may include at least one layer containing boron 10 ($^{10}$B).

Example 32 may include elements of example 31 where the at least one layer containing $^{10}$B may include at least one layer of $^{10}$B disposed on at least a portion of at least one interior surface of the chamber in the respective neutron detector.

Example 33 may include elements of any of examples 1 through 20 where the at least one active material comprises an active gas disposed within the chamber.

Example 34 may include elements of example 33 where the active gas disposed within the chamber may include at least one gas containing helium 3 ($^3$He). According to example 35, there is provided a fissile neutron detection method. The fissile neutron detection method may include transitioning at least some incident fissile neutrons to thermal neutrons by passing the incident fissile neutrons through at least one neutron moderator disposed proximate at least one neutron detector. The at least one neutron detector may include: a body having a length, a width, and a height defining a closed chamber; the length and the width of the chamber greater than the height of the chamber; at least one active material that emits at least one ionizing particle upon exposure to thermal neutrons, the active material disposed within the chamber; and at least one electrode. The method may also include impinging at least 60% of the thermal neutrons exiting the neutron moderator on the at least one active material disposed in the chamber of the at least one neutron detector. The method may further include generating, by the at least one neutron detector, a current at the at least one electrode, the current proportional to the number of thermal neutrons impinging on the at least one active material in the at least one neutron detector.

Example 36 may include elements of example 35 where transitioning at least some incident fissile neutrons to thermal neutrons by passing the incident fissile neutrons through at least one neutron moderator disposed proximate at least one neutron detector may include transitioning at least some incident fissile neutrons to thermal neutrons by passing the incident fissile neutrons through at least one neutron moderator proximate a plurality of neutron detectors disposed proximate at least a portion on an exterior surface of the at least one neutron moderator.

Example 37 may include elements of example 35 where transitioning at least some incident fissile neutrons to thermal neutrons by passing the incident fissile neutrons through at least one neutron moderator disposed proximate at least one neutron detector may include transitioning at least some incident fissile neutrons to thermal neutrons by passing the incident fissile neutrons through at least one of a plurality of neutron moderators disposed proximate at least a portion on an exterior surface of the at least one neutron detector.

Example 38 may include elements of example 35 where impinging at least 60% of the thermal neutrons exiting the neutron moderator on the at least one active material disposed in the chamber of the at least one neutron detector may include impinging at least 60% of the thermal neutrons exiting the at least one neutron moderator on at least one active material disposed in a hermetically sealed chamber of the at least one neutron detector.

Example 39 may include elements of example 35 and may additionally include generating, at least one signal proportional to at least one of: the number of thermal neutrons impinging on the at least one active material in the at least one neutron detector or the rate of thermal neutron impingements on the at least one active material in the at least one neutron detector.

Example 40 may include elements of example 35 where transitioning at least some incident fissile neutrons to thermal neutrons by passing the incident fissile neutrons through at least one neutron moderator disposed proximate at least one neutron detector may include transitioning at least some incident fissile neutrons to thermal neutrons by passing the incident fissile neutrons through at least one neutron moderator that includes a minimum of 40 weight percent hydrogen.

Example 41 may include elements of example 40 where transitioning at least some incident fissile neutrons to thermal neutrons by passing the incident fissile neutrons through at least one neutron moderator that includes a minimum of 40 weight percent hydrogen may include transitioning at least some incident fissile neutrons to thermal neutrons by passing the incident fissile neutrons through at least one neutron moderator that includes a material containing a high density polyethylene (HDPE).

Example 42 may include elements of example 41 where transitioning at least some incident fissile neutrons to thermal neutrons by passing the incident fissile neutrons through at least one neutron moderator that includes a material containing a high density polyethylene (HDPE) may include transitioning at least some incident fissile neutrons to thermal neutrons by passing the incident fissile neutrons through at least one neutron moderator that includes HDPE having a thickness of from about 0.5 centimeters (cm) to about 10 cm.

Example 43 may include elements of example 35 and may additionally include at least partially encapsulating at least a portion of the at least one neutron detector and at least a portion of the at least one neutron moderator in an external neutron moderator.

Example 44 may include elements of example 43 where at least partially encapsulating at least a portion of the at least one neutron detector and at least a portion of the at least one neutron moderator in an external neutron moderator may include at least partially encapsulating at least a portion of the at least one neutron detector and at least a portion of the at least one neutron moderator in a material that includes a minimum of 40 weight percent hydrogen.

Example 45 may include elements of example 44 where at least partially encapsulating at least a portion of the at least one neutron detector and at least a portion of the at least one neutron moderator in a material that includes a minimum of 40 weight percent hydrogen may include at least partially encapsulating at least a portion of the at least one neutron detector and at least a portion of the at least one neutron moderator in a material that includes high-density polyethylene (HDPE).

Example 46 may include elements of any of examples 35 through 45, where generating, by the at least one neutron detector, a current at the at least one electrode, the current proportional to the number of thermal neutrons impinging on the at least one active material in the at least one neutron detector may include, for each thermal neutron impinging on the at least one active material in the at least one neutron detector, generating at least one ionizing particle by at least one sheet of active material; ionizing, by the at least one ionizing particle, a readout gas disposed within the chamber of the at least one neutron detector; maintaining the at least one electrode disposed in the chamber of the at least one neutron detector at a voltage that differs from a voltage of the at least one sheet of active material; causing, by the ionized readout gas, a flow of charged particles away from the at least one electrode; and causing a current at the electrode by the flow of charged particles, the current proportional to the number of thermal neutrons impinging on the at least one sheet of active material disposed in the chamber of the at least one neutron detector.

Example 47 may include elements of example 46 where ionizing a readout gas disposed within the chamber of the at least one neutron detector may include ionizing, by the at least one ionizing particle, a noble readout gas disposed within the chamber of the at least one neutron detector.

Example 48 may include elements of example 46 where maintaining the at least one electrode disposed in the chamber of the at least one neutron detector at a voltage that differs from a voltage of the at least one sheet of active material may include biasing the at least one electrode to a potential of at least +100 volts (V) measured with respect to the potential of the at least one sheet of active material.

Example 49 may include elements of example 46 where generating at least one ionizing particle by at least one sheet of active material may include generating the at least one ionizing particle by at least one solid sheet of active material disposed within the chamber of the at least one neutron detector.

Example 50 may include elements of example 49 where generating the at least one ionizing particle by at least one solid sheet of active material disposed within the chamber of the at least one neutron detector may include generating at least one ionizing particle by at least one solid sheet of active material comprising at least one lithium 6 ($^6$Li) sheet disposed within the chamber of the at least one neutron detector.

Example 51 may include elements of example 50 where generating at least one ionizing particle by at least one solid sheet of active material comprising at least one lithium 6 ($^6$Li) sheet disposed within the chamber of the at least one neutron detector may include generating at least one ionizing particle by at least one solid sheet of active material comprising at least one $^6$Li sheet having a thickness of from about 50 micrometers to about 100 micrometers disposed within the chamber of the at least one neutron detector.

Example 52 may include elements of example 51 where generating at least one ionizing particle by at least one solid sheet of active material comprising at least one 6Li sheet having a thickness of from about 50 micrometers to about 100 micrometers disposed within the chamber of the at least one neutron detector may include generating at least one ionizing particle by at least one solid sheet of active material comprising at least one $^6$Li sheet disposed within the chamber of the at least one neutron detector, the at least one sheet of $^6$Li comprising at least one of: a single $^6$Li sheet proximate a support structure and positioned at an intermediate point within the chamber of the at least one neutron detector; at least one $^6$Li sheet disposed proximate at least a portion of at least one wall forming at least a portion of the chamber of the at least one neutron detector; or a number of spaced $^6$Li sheets proximate a support structure and positioned at an intermediate point within the chamber of the at least one neutron detector.

Example 53 may include elements of any of examples 35 through 45 where generating, by the at least one neutron detector, a current at the at least one electrode, the current proportional to the number of thermal neutrons impinging on the at least one active material in the at least one neutron detector may include, for each thermal neutron impinging on the at least one active material in the at least one neutron detector, generating at least one ionizing particle by at least one layer of active material disposed within the chamber of the at least one neutron detector; ionizing, by the at least one ionizing particle, a readout gas disposed within the chamber of the at least one neutron detector; maintaining the at least one electrode disposed in the chamber of the at least one neutron detector at a voltage that differs from a voltage of the at least one layer of active material; causing, by the ionized readout gas, a flow of charged particles away from the at least one electrode; and causing a current at the electrode by the flow of charged particles, the current proportional to the number of thermal neutrons impinging on the at least one layer of active material disposed in the chamber of the at least one neutron detector.

Example 54 may include elements of example 53 where generating at least one ionizing particle by at least one layer of active material disposed within the chamber of the at least one neutron detector may include generating at least one ionizing particle by at least one layer of active material comprising at least one layer containing $^{10}$B disposed within the chamber of the at least one neutron detector.

Example 55 may include elements of example 54 where generating at least one ionizing particle by at least one layer of active material comprising at least one layer containing $^{10}$B disposed within the chamber of the at least one neutron detector may include generating at least one ionizing particle by at least one layer of active material comprising at least one layer containing $^{10}$B disposed proximate at least a portion of at least one wall forming at least a portion of the chamber of the at least one neutron detector.

Example 56 may include elements of example 53 where ionizing a readout gas disposed within the chamber of the at least one neutron detector may include ionizing, by the at least one ionizing particle, a noble readout gas disposed within the chamber of the at least one neutron detector.

Example 57 may include elements of examples 35 through 45 where generating, by the at least one neutron detector, a current at the at least one electrode, the current proportional to the number of thermal neutrons impinging on the at least one active material in the at least one neutron detector may include, for each thermal neutron impinging on the at least one active material in the at least one neutron detector, generating at least one ionizing particle by at least one active gas disposed within the chamber of the at least one neutron detector; maintaining the at least one electrode disposed in the chamber of the at least one neutron detector at a potential greater than the at least one active gas; causing, by the ionized readout gas, a flow of charged particles away from the at least one electrode; and causing a current at the electrode by the flow of charged particles, the current proportional to the number of thermal neutrons impinging on the at least one layer of active material disposed in the chamber of the at least one neutron detector.

Example 58 may include elements of example 57 where generating at least one ionizing particle by at least one active gas disposed within the chamber of the at least one neutron detector may include generating the at least one ionizing particle by at least one active gas that includes helium 3 ($^3$He), the at least one active gas disposed within the chamber of the at least one neutron detector.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A fissile neutron detection system for detecting incident fissile neutrons, said fissile neutron detection system, comprising:
   an ionizing thermal neutron detector arrangement including an inner peripheral shape that at least substantially surrounds a moderator region for detecting thermal neutrons that exit the moderator region but is at least generally transparent to the incident fissile neutrons; and
   a moderator arrangement disposed within the moderator region for converting the incident fissile neutrons in the moderator region to thermal neutrons which exit the moderator region to then enter the thermal neutron detector arrangement for detection of at least some of the thermal neutrons to produce an electrical current as a detector output with the moderator arrangement having an outer peripheral shape that is at least generally complementary to said inner peripheral shape and the moderator arrangement includes lateral extents such that any given dimension that bisects the lateral extents includes a length that is greater than any thickness of the moderator arrangement transverse to the lateral extents.

2. The fissile neutron detection system of claim 1 wherein the thickness of the moderator arrangement is in a range from 1 cm to 5 cm.

3. The fissile neutron detection system of claim 1 wherein the lateral extents are at least generally rectangular with a widthwise dimension and a lengthwise dimension and the thickness of the moderator arrangement is less than the widthwise dimension and the lengthwise dimension.

4. The fissile neutron detection system of claim 1 wherein the lateral extents define a symmetrical edge configuration.

5. The fissile neutron detection system of claim 1 wherein the moderator arrangement includes a pair of opposing major sides that cooperatively define the lateral extents.

6. The fissile neutron detection system of claim 1 wherein the thermal neutron detector arrangement sealingly contains a readout gas and supports an active sheet layer arrangement that is in gaseous communication with the readout gas and the active sheet layer arrangement spans at least a majority of said lateral extents such that (i) a majority of the incident fissile neutrons pass through the active sheet layer arrangement prior to impinging on said moderator arrangement, and (ii) a majority of thermal neutrons impinge on the active sheet layer arrangement after exiting the moderator arrangement, wherein the active sheet layer arrangement emits ionizing particles responsive to said thermal neutrons, and the ionizing particles initiate an avalanche of ions, within said readout gas, to produce said electrical current.

7. The fissile neutron detection system of claim 6 wherein the thermal neutron detector arrangement includes a first electrode arrangement and a second electrode arrangement in a spaced apart relationship with said active sheet layer arrangement supported therebetween such that each electrode is in operative communication with said readout gas, and the electrodes of each of the first and second arrangements of electrodes are spaced apart proximate to the majority of the lateral extents.

8. The fissile neutron detection system of claim 1 wherein the moderator arrangement includes at least one moderator sheet material having a pair of opposing major sides that are spaced apart by said thickness.

9. The fissile neutron detection system of claim 8 wherein said thermal neutron detector arrangement includes at least first and second thermal neutron detectors in a spaced apart confronting relationship with said moderator arrangement disposed therebetween.

10. The fissile neutron detection system of claim 9 wherein each thermal neutron detector supports an active sheet layer that spans at least said majority of said lateral extents, and each of said thermal neutron detectors includes first and second arrangements of electrodes with the electrodes of the first arrangement of electrodes laterally spaced apart proximate to one of a pair of opposing major surfaces of the active sheet layer and the electrodes of the second arrangement of electrodes laterally spaced apart proximate to the other, opposite one of the opposing pair of major surfaces such that a projection of each of the first and second arrangements of electrodes onto the active sheet layer defines an area that substantially covers one of the major surfaces of the active sheet layer and each electrode is in operative communication with said readout gas.

11. The fissile neutron detection system of claim 10 wherein one major surface of the first thermal neutron detector confronts one of said major sides of said moderator arrangement, and a major surface of said second thermal neutron detector confronts the other one of said major sides of said moderator arrangement, and said first and second thermal neutron detectors with said moderator arrangement forming an at least generally planar layered structure such that each one of a majority of the incident fissile neutrons passes through one of said first and second thermal neutron detectors before impinging on said moderator arrangement.

12. The fissile neutron detection system of claim 11 wherein said major surfaces of said thermal neutron detectors cooperatively define said moderator region therebetween having a volume and the moderator arrangement substantially fills said volume.

13. The fissile neutron detection system of claim 12 wherein the moderator arrangement fills at least 60 percent of the volume of the moderator region.

14. The fissile neutron detection system of claim 1 wherein said thickness is an at least approximately uniform thickness.

15. The fissile neutron detection system of claim 1 wherein said thermal neutron detector arrangement includes at least one group of thermal neutron detectors with the thermal neutron detectors of each group in a side-by-side relationship.

16. The fissile neutron detection system of claim 15 wherein each thermal neutron detector sealingly contains a readout gas and each thermal neutron detector supports an active sheet material layer in gaseous communication with the readout gas for detecting thermal neutrons that are incident on the active sheet material layer and the active sheet material layers of the group of thermal neutron detectors cooperate to form an arrangement of active sheet material layers that spans at least a majority of said lateral extents of the moderator arrangement such that a majority of the thermal neutrons that exit the moderator arrangement thereafter impinge on the arrangement of active sheet material layers to cause the active sheet material layer arrangement to emit ionizing particles responsive to the thermal neutrons that initiates an avalanche of ions in the readout gas to produce said electrical current.

17. The fissile neutron detection system of claim 16 wherein each thermal neutron detector of said group includes a first set of electrodes and a second set of electrodes with the electrodes of the first set of electrodes laterally spaced apart proximate to one of a pair of opposing major surfaces of the active sheet material layer and the electrodes of the second set of electrodes laterally spaced apart proximate to the other, opposite one of the opposing pair of major surfaces such that a projection of each of the first and second sets of electrodes onto the active sheet material layer defines an area that substantially covers one of the major surfaces of the active sheet material layer.

18. The fissile neutron detection system of claim 16 wherein the thermal neutron detectors are in physical contact in the side-by-side relationship.

19. The fissile neutron detection system of claim 15 wherein said thermal neutron detector arrangement includes at least two groups of thermal neutron detectors.

20. The fissile neutron detection system of claim 19 wherein the moderator arrangement defines first and second opposing major surfaces with a first one of the two groups of thermal neutron detectors adjacent to one of the major surfaces and a second one of the two groups of thermal neutron detectors adjacent to the other one of the major surfaces.

21. The fissile neutron detector arrangement of claim 15 wherein said major surfaces of said thermal neutron detectors cooperatively define said moderator region therebetween having a volume and the moderator arrangement substantially fills said volume.

22. The fissile neutron detector arrangement of claim 21 wherein the moderator arrangement fills at least 60 percent of the volume of the moderator region.

23. The fissile neutron detection system of claim 16 wherein the thermal neutron detectors are spaced apart in the side-by-side relationship to form a gap between adjacent ones of the thermal neutron detectors.

24. The fissile neutron detection system of claim 1 wherein the thermal neutron detector arrangement and the moderator arrangement cooperate to form a layered structural relationship that defines a pair of opposing major receiving directions for bidirectionally receiving the incident fissile neutrons from the opposing major receiving directions.

\* \* \* \* \*

UNITED STATES PATENT AND TRADEMARK OFFICE
CERTIFICATE OF CORRECTION

| | | |
|---|---|---|
| PATENT NO. | : 10,809,397 B2 | Page 1 of 1 |
| APPLICATION NO. | : 16/379682 | |
| DATED | : October 20, 2020 | |
| INVENTOR(S) | : Inglis et al. | |

It is certified that error appears in the above-identified patent and that said Letters Patent is hereby corrected as shown below:

In the Specification

On Column 1, Line 12, before the "TECHNICAL FIELD" and after the "RELATED APPLICATIONS" paragraph, please insert the following heading and paragraph:
--STATEMENT REGARDING FEDERALLY SPONSORED RESEARCH OR DEVELOPMENT
This invention was made with Government support under HR0011-14-C-0098 awarded by the Defense Advanced Research Projects Agency. The Government has certain rights in the invention.--

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*